United States Patent
Matyjaszewski et al.

(10) Patent No.: US 6,407,187 B1
(45) Date of Patent: *Jun. 18, 2002

(54) (CO)POLYMERS AND A NOVEL POLYMERIZATION PROCESS BASED ON ATOM (OR GROUP) TRANSFER RADICAL POLYMERIZATION

(75) Inventors: Krzysztof Matyjaszewski; Jin-Shan Wang, both of Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/034,187

(22) Filed: Mar. 3, 1998

Related U.S. Application Data

(62) Division of application No. 08/414,415, filed on Mar. 31, 1995, now Pat. No. 5,763,548.

(51) Int. Cl.$^7$ .................................................. C08F 2/38
(52) U.S. Cl. ...................... 526/89; 526/328; 526/329.2; 526/329.7; 526/347; 526/227; 526/225; 526/231; 526/346; 526/319; 526/341; 526/335
(58) Field of Search ........................ 526/89, 328, 329.2, 526/329.7, 347, 227, 225, 231, 346, 319, 341, 335

(56) References Cited

U.S. PATENT DOCUMENTS 3,862,978 A    1/1975   Decker et al.

(List continued on next page.)

FOREIGN PATENT DOCUMENTS

| CN | 1165828 A | 11/1997 |
|----|-----------|---------|
| EP | 0 265 091 A1 | 4/1988 |
| EP | 0 789 036 A2 | 8/1997 |
| EP | 0 816 385 A1 | 1/1998 |
| EP | 0 824 110 A1 | 2/1998 |
| EP | 0 824 111 A1 | 2/1998 |
| EP | 0 826 698 A1 | 3/1998 |
| EP | 0 832 902 A2 | 4/1998 |
| WO | WO 97/47661 | 12/1997 |
| WO | WO 98/06758 | 2/1998 |
| WO | WO 98/20050 | 5/1998 |

OTHER PUBLICATIONS

Odian, G., Principles of Polymerization, Third Edition, John Wiley & Sons, p. 206, 1991.*

(List continued on next page.)

*Primary Examiner*—David W. Wu
*Assistant Examiner*—William K Cheung
(74) *Attorney, Agent, or Firm*—Kirkpatrick & Lockhart LLP

(57) ABSTRACT

A new polymerization process (atom transfer radical polymerization, or ATRP) based on a redox reaction between a transition metal (e.g., Cu(I)/Cu(II), provides "living" or controlled radical polymerization of styrene, (meth)acrylates, and other radically polymerizable monomers. Using various simple organic halides as model halogen atom transfer precursors (initiators) and transition metal complexes as a model halogen atom transfer promoters (catalysts), a "living" radical polymerization affords (co) polymers having the predetermined number average molecular weight by $\Delta[M]/[I]_0$ (up to $M_n>10^5$) and a surprisingly narrow molecular weight distribution ($M_w/M_n$), as low as 1.15. The participation of free radical intermediates in ATRP is supported by end-group analysis and stereochemistry of the polymerization. In addition, polymers with various topologies (e.g., block, random, star, end-functional and in-chain functional copolymers [for example, of styrene and methyl (meth)acrylate]) have been synthesized using the present process. The polymeric products encompassed by the present invention can be widely used as plastics, elastomers, adhesives, emulsifiers, thermoplastic elastomers, etc.

44 Claims, 14 Drawing Sheets

U.S. PATENT DOCUMENTS

| | | | |
|---|---|---|---|
| 4,145,486 A | | 3/1979 | Haag et al. |
| 4,581,429 A | | 4/1986 | Solomon et al. |
| 4,728,706 A | | 3/1988 | Farnham et al. |
| 4,940,760 A | | 7/1990 | Boettcher et al. |
| 5,169,914 A | | 12/1992 | Kaszas et al. |
| 5,312,871 A | | 5/1994 | Mardare et al. |
| 5,405,913 A | | 4/1995 | Harwood et al. |
| 5,451,647 A | | 9/1995 | Faust et al. |
| 5,470,928 A | | 11/1995 | Harwood et al. |
| 5,610,250 A | * | 3/1997 | Veregin et al. .......... 526/219.3 |
| 5,708,102 A | | 1/1998 | Fryd et al. |
| 5,763,548 A | | 6/1998 | Matyjaszewski et al. |
| 5,767,210 A | | 6/1998 | Lecomte et al. |
| 5,773,538 A | | 6/1998 | Feiring |
| 5,789,487 A | * | 8/1998 | Matyjaszewski et al. ... 525/301 |
| 5,807,937 A | | 9/1998 | Matyjaszewski et al. |
| 5,811,500 A | | 9/1998 | Dubois et al. |
| 5,854,364 A | | 12/1998 | Senninger et al. |

OTHER PUBLICATIONS

Odian, George, Principles of Polymerization, John Wiley & Sons, pp. 205–233, 1991.*

Polymer Letters, vol. 5, pp. 697–701, 1967, New Initiator Systems for Radical Polymerization of Vinyl Monomers, Takayuki Otsu et al.

Science, vol. 272, pp. 866–868, May 10, 1996, Polymers with very low Polydispersities from Atom Transfer Radical Polymerization, Timothy E. Patten et al.

Macromolecules, vol. 31, No. 12, 1998, pp. 4053–4056, Self–Regulated Phase Transfer of $Cu_2O$/bpy, Cu(0)/bpy, and $Cu_2O$/Cu(0)/bpy Catalyzed "Living" Radical Polymerization Initiated with Sulfonyl Chlorides, V. Percec et al.

J. Chem. Soc. (B), pp. 255–259, Redox–Transfer, Part VI, Determination of Hammet's ρ–Constant for the Oxidation of Cuprous Chloride by Aromatic Sulphonyl Chlorides, A. Orochov et al.

Asscher and Vofsi, pp. 4962–4971, Chlorine–Activation by Redox–Transfer, Part IV. The Addition of Sulphonyl Chlorides to Vinylic Monomers and Other Olefins, M. Asscher et al.

J. Chem. Soc. Perkin Trans, 1991, pp. 627–633, Novel Perfluoroalkylation of Alkenes with Perfluoroalkanesulphonyl Chlorides Catalysed by a Ruthenium (II) Complex, Nobumasa Kamigata et al.

Macromolecules, vol. 28, No. 23, 1995, pp. 7970–7972, "Living" Radical Polymerization of Styrene Initiated by Arenesulfonyl Chlorides and $Cu^1(bpy)_nCl$, Virgil Percec et al.

Macromolecules, vol. 29, No. 10, 1996, pp. 3665–3668, Metal–Catalyzed "Living" Radical Polymerization of Styrene Initiated with Arenesulfonyl Chlorides. From Heterogeneous to Homogeneous Catalysis, Virgil Percec et al.

Chemical Abstracts, vol. 85, 1976, pp. 20.

Science, vol. 25, Feb. 22, 1991, pp. 887–893, Living Polymerization Methods, Owen W. Webster.

Journal of Polymer Science: Part A: Polymer Chemistry, vol. 36, 1417–1424, 1998, Polymerization of Acrylates by Atom Transfer Radical Polymerization. Homopolymerization of 2–Hydroxyethyl Acrylate, Simion Coca et al.

Macromolecules, vol. 29, No. 27, 1996, 8576–8582, Controlled Radical Polymerization of Methacrylic Monomers in the Presence of Bis(Ortho–Chelated) Arylnickel(II) Complex and Different Activated Alkyl Halides, C. Granel, et al.

Macromolecules, vol. 30, No. 23, 1997, 7348–7350, Zerovalent Metals in Controlled/"Living" Radical Polymerization, Krzysztof Maty Jaszewski et al.

Macromolecules, vol. 31, No. 12, 1998, 4041–4044, Nitroxide Mediated Living Radical Polymerization of Styrene in Emulsion, Catherine Marestin et al.

Macromolecules, vol. 30, No. 25, 1997, 7692–7696, Controlled/"Living" Radical Polymerization. Homogeneous Reverse Atom Transfer Radical Polymerization using Aibn as the Initiator, Jianhui Xia et al.

Macromolecules, vol. 30, No. 2, 1997, 324–326, Controlled Radical Polymerization in Emulsion, Stefan A.F. Bon et al.

Macromolecules, vol. 30, No. 8, 1997, 2244–2248, Evidence for Living Radical Polymerization of Methyl Methacrylate with Ruthenium Complex: Effects of Protic and Radical Compounds and Reinitiation from the Recovered Polymers, Tomotaka Nishikawa et al.

Controlled Atom Transfer Radical Polymerizations of Methyl Methacrylate Under Micellar Conditions, Takayuki Makino et al., pp. 288–289.

Part 2, Controlled "Living" Emulsion Polymerization of Methyl Methacrylate by Atom Transfer Radical Polymerization, pp. 90–134.

O.W. Webster, Science, 251, 887 (1991).

Greszta et al., Macromolecules, 27, 638 (1994).

Georges et al, Macromolecules, 26, 1987 (1993).

Wayland et al., J. Am. Chem. Soc., 116, 7943 (1994).

Mardare et al., Macromolecules, 27, 645, (1994).

Lee et al., J. Chem. Soc. Trans. Faraday Soc. I, 74, 1726 (1978).

Otsu et al., Chem. Express 5 (19), 801 (1990).

Kato et al., Macromolecules, 27, 1721 (1995).

Bamford, Comprehensive Polymer Science (First Supplement), Pergamon: Oxford vol. 3., p. 123 (1991).

Curran, D., Comprehensive Organic Synthesis, Pergamon: Oxford, vol. 4, p. 715 (1991).

Curran et al., J. Am Chem. Soc., 116, 4279 (1994).

Curran et al., J. Org. Chem., 54, 3140 (1989).

Igbal et al., Chem. Rev., 94, 519 (1994).

Hirao et al., J. Synth. Org. Chem. (Japan), 52(3), 197, (1994).

Hirao et al., Syn. Lett., 217 (1990).

Hayes et al., J. Am. Chem. Soc. 110, 5533 (1988).

Nagashima et al., J. Org. Chem. 57, 1682 (1992).

Seijas et al., Tetrahedron, 48(9), 1637 (1992).

Udding et al., J. Org. Chem. 59, 1993 (1994).

Nagashima et al., J. org. Chem. 58, 464 (1993).

Bellus, D., Pure & Appl. Chem. 57, 1827 (1985).

Curran, D., Synthesis, 489 (1988).

Mardare et al., Polym. Prep. (ACS), 36(1) 700–701 (1995).

Orochov et al., J. Chem. Soc., Perkin II, 1000 (1973).

Mitani et al., J. Am. Chem. Soc., 105, 6719 (1983).

Cohen et al., Inorg. Chem., 13, 2434 (1974).

Otsu et al., Macromolecules, 25, 5554 (1992).

Bledzki et al., Makromol. Chem. 184, 745 (1983).

Druliner, Macromolecules, 24, 6079 (1991).

Gaynor et al., Polym. Prep. (Am. Chem. Soc., Polym. Chem. Div.), 36(1) 467 (1995).

* cited by examiner

INITIATION:

$$R-X + M_t^n \rightleftharpoons [R^\bullet + M_t^{n+1}X]$$

$$\xrightarrow{+M} \quad \Big\downarrow k_i \Big| +M$$

$$R-M-X + M_t^n \rightleftharpoons [R-M^\bullet + M_t^{n+1}X]$$

PROPAGATION:

$$M_n-X + M_t^n \rightleftharpoons [M_n^\bullet + M_t^{n+1}X]$$

INITIATION:

PROPAGATION:

INITIATION:

PROPAGATION:

(CO)POLYMERS AND A NOVEL POLYMERIZATION PROCESS BASED ON ATOM (OR GROUP) TRANSFER RADICAL POLYMERIZATION

This application is a Division of application Ser. No. 08/414,415, filed on Mar. 31, 1995, now U.S. Pat. No. 5,763,548, now allowed.

BACKGROUND OF THE INVENTION

1. Field of the Invention

The present invention concerns novel (co)polymers and a novel radical polymerization process based on transition metal-mediated atom or group transfer polymerization ("atom transfer radical polymerization").

2. Discussion of the Background

Living polymerization renders unique possibilities of preparing a multitude of polymers which are well-defined in terms of molecular dimension, polydispersity, topology, composition, functionalization and microstructure. Many living systems based on anionic, cationic and several other types of initiators have been developed over the past 40 years (see O. W. Webster, Science, 251, 887 (1991)).

However, in comparison to other living systems, living radical polymerization represented a poorly answered challenge prior to the present invention. It was difficult to control the molecular weight and the polydispersity to achieve a highly uniform product of desired structure by prior radical polymerization processes.

On the other hand, radical polymerization offers the advantages of being applicable to polymerization of a wide variety of commercially important monomers, many of which cannot be polymerized by other polymerization processes. Moreover, it is easier to make random copolymers by radical polymerization than by other (e.g., ionic) polymerization processes. Certain block copolymers cannot be made by other polymerization processes. Further, radical polymerization processes can be conducted in bulk, in solution, in suspension or in an emulsion, in contrast to other polymerization processes.

Thus, a need is strongly felt for a radical polymerization process which provides (co)polymers having a predetermined molecular weight, a narrow molecular weight distribution (low "polydispersity"), various topologies and controlled, uniform structures.

Three approaches to preparation of controlled polymers in a "living" radical process have been described (Greszta et al, Macromolecules, 27, 638 (1994)). The first approach involves the situation where growing radicals react reversibly with scavenging radicals to form covalent species. The second approach involves the situation where growing radicals react reversibly with covalent species to produce persistent radicals. The third approach involves the situation where growing radicals participate in a degenerative transfer reaction which regenerates the same type of radicals.

There are some patents and articles on living/controlled radical polymerization. Some of the best-controlled polymers obtained by "living" radical polymerization are prepared with preformed alkoxyamines or are those prepared in situ (U.S. Pat. No. 4,581,429; Georges et al, Macromolecules, 26, 2987 (1993)). A Co-containing complex has been used to prepare "living" polyacrylates (Wayland, B. B., Pszmik, G., Mukerjee, S. L., Fryd, M. J. Am. Chem. Soc., 116, 7943 (1994)). A "living" poly(vinyl acetate) can be prepared using an Al(i-Bu)$_3$: Bpy:TEMPO initiating system (Mardare et al, Macromolecules, 27, 645 (1994)). An initiating system based on benzoyl peroxide and chromium acetate has been used to conduct the controlled radical polymerization of methyl methacrylate and vinyl acetate (Lee et al, J. Chem. Soc. Trans. Faraday Soc. I, 74, 1726 (1978); Mardare et al, Polym. Prep. (ACS), 36(1) (1995)).

However, none of these "living" polymerization systems include an atom transfer process based on a redox reaction with a transition metal compound.

One paper describes a redox iniferter system based on Ni(O) and benzyl halides. However, a very broad and bimodal molecular weight distribution was obtained, and the initiator efficiency based on benzyl halides used was<1% (T. Otsu, T. Tashingri, M. Yoshioka, Chem. Express 1990, 5(10), 801).

Another paper describes the polymerization of methyl methacrylate, initiated by CCl$_4$ in the presence of RuCl$_2$(PPh$_3$)$_3$. However, the reaction does not occur without methylaluminum bis(2,6-di-tert-butylphenoxide), added as an activator (see M. Kato, M. Kamigaito, M. Sawamoto, T. Higashimura, Macromolecules, 28, 1721 (1995)). This system is similar to the redox initiators developed early (Bamford, in Comprehensive Polymer Science (First Supplement), Allen, G., Aggarwal, S. L., Russo, S., eds., Pergamon: Oxford, 1991, vol. 3, p. 123), in which the small amount of initiating radicals were generated by redox reaction between (1) RCHX$_2$ or RCX$_3$ (where X=Br, Cl) and (2) Ni(O) and other transition metals. The reversible deactivation of initiating radicals by oxidized Ni is very slow in comparison with propagation, resulting in very low initiator efficiency and a very broad and bimodal molecular weight distribution.

Atom transfer radical addition, ATRA, is a well-known method for carbon-carbon bond formation in organic synthesis. (For reviews of atom transfer methods in organic synthesis, see (a) Curran, D. P. Synthesis, 1988, 489; (b) Curran, D. P. in Free Radicals in Synthesis and Biology, Minisci, F., ed., Kluwer: Dordrecht, 1989, p. 37; and (c) Curran, D. P. in Comprehensive Organic Synthesis, Trost, B. M., Fleming, I., eds., Pergamon; Oxford, 1991, Vol. 4, p. 715.) In a very broad class of ATRA, two types of atom transfer methods have been largely developed. One of them is known as atom abstraction or homolytic substitution (see (a) Curran et al, J. Org. Chem., 1989, 54, 3140; and (b) Curran et al, J. Am. Chem. Soc., 1994, 116, 4279), in which a univalent atom (typically a halogen) or a group (such as SPh or SePh) is transferred from a neutral molecule to a radical to form a new σ-bond and a new radical in accordance with Scheme 1 below:

Scheme 1

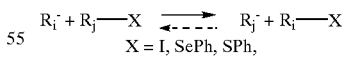

X = I, SePh, SPh,

In this respect, iodine atom and the SePh group were found to work very well, due to the presence of very weak C—I and C—SePh bonds towards the reactive radicals, (Curran et al, J. Org. Chem. and J. Am. Chem. Soc., supra). In earlier work, the present inventors have discovered that alkyl iodides may induce the degenerative transfer process in radical polymerization, leading to a controlled radical polymerization of several alkenes. This is consistent with the fact that alkyl iodides are outstanding iodine atom donors that can undergo a fast and reversible transfer in an initiation step and degenerative transfer in a propagation step (see Gaynor et al, *Polym. Prep.* (Am. Chem. Soc., Polym. Chem. Div.), 1995, 36(1), 467; Wang et al, *Polym. Prep.* (Am. Chem. Soc., Polym. Chem. Div.), 1995, 36(1), 465).

Another atom transfer method is promoted by a transition metal species (see (a) Bellus, D. *Pure & Appl. Chem.* 1985, 57, 1827; (b) Nagashima, H.; Ozaki, N.; Ishii, M.; Seki, K.; Washiyama, M.; Itoh, K. *J. Org. Chem.* 1993, 58, 464; (c) Udding, J. H.; Tuijp, K. J. M.; van Zanden, M. N. A.; Hiemstra, H.; Speckamp, W. N. *J. Org. Chem.* 1994, 59, 1993; (c) Seijas et al, *Tetrahedron* 1992, 48(9), 1637; (d) Nagashima, H.; Wakamatsu, H.; Ozaki, N.; Ishii, T.; Watanabe, M.; Tajima, T.; Itoh, K. *J. Org. Chem.* 1992, 57, 1682; (e) Hayes, T. K.; Villani, R.; Weinreb, S. M. *J. Am. Chem. Soc.* 1988, 110, 5533; (f) Hirao et al, *Syn. Lett.,* 1990, 217; and (g) Hirao et al, *J. Synth. Org. Chem.* (Japan), 1994, 52(3), 197; (h) Iqbal, J; Bhatia, B.; Nayyar, N. K. *Chem. Rev.,* 94, 519 (1994)). In these reactions, a catalytic amount of transition metal compound acts as a carrier of the halogen atom in a redox process, in accordance with FIG. 1.

Initially, the transition metal species, $M_t^n$, abstracts halogen atom X from the organic halide, R—X, to form the oxidized species, $M_t^{n+1}X$, and the carbon-centered radical R*. In the subsequent step, the radical, R*, reacts with alkene, M, with the formation of the intermediate radical species, R—M*. The reaction between $M_t^{n+1}X$ and R—M results in the target product, R—M—X, and regenerates the reduced transition metal species, $M_t^n$, which further reacts with R-X and promotes a new redox process.

The high efficiency of transition metal-catalyzed atom transfer reactions in producing the target product, R—M—X, in good to excellent yields (often>90%) may suggest that the presence of an $M_t^n/M_t^{n+1}$ cycle-based redox process can effectively compete with the bimolecular termination reactions between radicals (see Curran, *Synthesis,* in *Free Radicals in Synthesis and Biology,* and in *Comprehensive Organic Synthesis,* supra).

It is difficult to control the molecular weight and the polydispersity (molecular weight distribution) of polymers produced by radical polymerization. Thus, it is often difficult to achieve a highly uniform and well-defined product. It is also often difficult to control radical polymerization processes with the degree of certainty necessary in specialized applications, such as in the preparation of end functional polymers, block copolymers, star (co)polymers, etc. Further, although several initiating systems have been reported for "living"/controlled polymerization, no general pathway or process for "living"/controlled polymerization has been discovered.

Thus, a need is strongly felt for a radical polymerization process which provides (co)polymers having a predictable molecular weight and a narrow molecular weight distribution (low "polydispersity"). A further need is strongly felt for a radical polymerization process which is sufficiently flexible to provide a wide variety of products, but which can be controlled to the degree necessary to provide highly uniform products with a controlled structure (i.e., controllable topology, composition, stereoregularity, etc.), many of which are suitable for highly specialized uses (such as thermoplastic elastomers, end-functional polymers for chain-extended polyurethanes, polyesters and polyamides, dispersants for polymer blends, etc.).

SUMMARY OF THE INVENTION

Accordingly, one object of the present invention is to provide a novel method for radical polymerization of alkenes based on atom transfer radical polymerization (ATRP), which provides a high degree of control over the polymerization process.

A further object of the present invention is to provide a novel method for radical polymerization of alkenes based on atom transfer radical polymerization (ATRP), which leads to more uniform and more highly controllable products (which are now obtainable only by living ionic polymerization methods).

A further object of the present invention is to provide a broad variety of novel (co)polymers having more uniform properties than those obtained by conventional radical polymerization.

These and other objects of the present invention, which will be readily understood in the context of the following detailed description of the preferred embodiments, have been provided in part by a novel process of atom (or group) radical transfer polymerization, which comprises the steps of:

polymerizing one or more radically polymerizable monomers in the presence of an initiator having a radically transferable atom or group, a transition metal compound and a ligand to form a (co)polymer, the transition metal compound having a formula $M_t^{n+}X'_n$, and the ligand being any N-, O-, P- or S-containing compound which can coordinate in a σ-bond or any carbon-containing compound which can coordinate in a π-bond to the transition metal, such that direct (i.e., covalent) bonds between the transition metal and growing polymer radicals are not formed, and isolating the formed (co)polymer; and, in part, by novel (co)polymers prepared by atom (or group) radical transfer polymerization.

BRIEF DESCRIPTION OF THE FIGURES

FIG. 10) and when X=X'=Br ("Br ATRP"; FIG. 11);

DESCRIPTION OF THE PREFERRED EMBODIMENTS

Figure 2A:
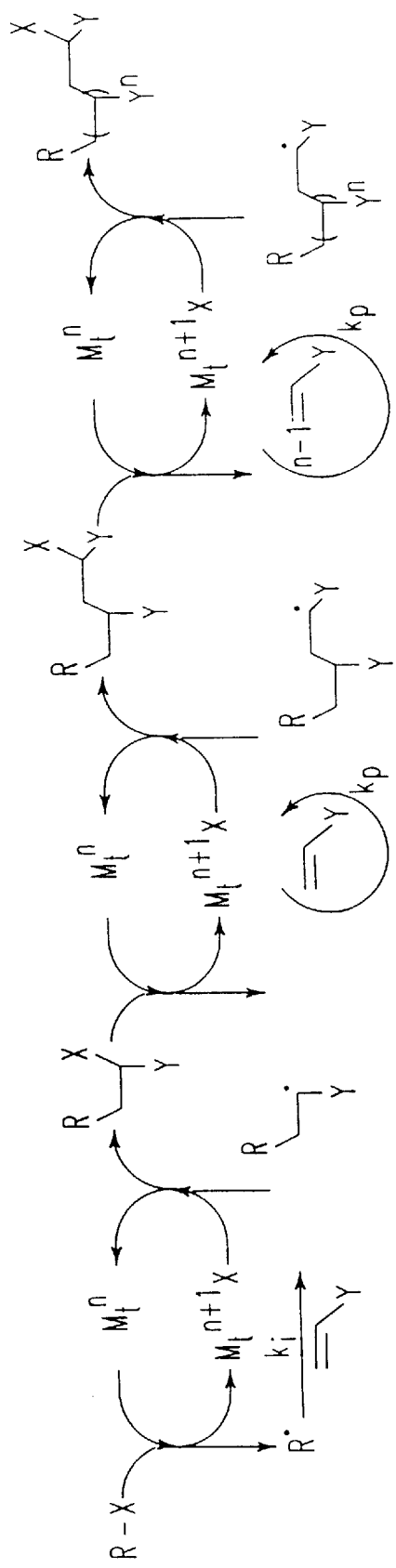
FIG. 2 shows a scheme for "living"/controlled radical polymerization based on a succession of atom transfer radical additions.
Figure 2B:
Figure 2C:

The present inventors conceptualized that if (1) the organic halide R—$M_t$—X resulting from an ATRA reaction is sufficiently reactive towards the transition metal $M_t^n$ and (2) the alkene monomer is in excess, a number or sequence of atom transfer radical additions (i.e., a possible "living"/controlled radical polymerization) may occur, as is shown in FIG. 2.

By analogy to ATRA, the present inventors have termed this new class of radical polymerization "atom (or group) transfer radical polymerization" (or "ATRP"), which describes the involvement of (1) the atom or group transfer pathway and (2) a radical intermediate.

Living/controlled polymerization (i.e., when chain breaking reactions such as transfer and termination are substantially absent) enables control of various parameters of macromolecular structure such as molecular weight, molecular weight distribution and terminal functionalities. It also allows the preparation of various copolymers, including block and star copolymers. Living/controlled radical polymerization requires a low stationary concentration of radicals, in equilibrium with various dormant species.

The present invention describes use of novel initiating systems leading to living/controlled radical polymerization. The initiation system is based on the reversible formation of growing radicals in a redox reaction between various transition metal compounds and an initiator, exemplified by (but not limited to) alkyl halides, aralkyl halides or haloalkyl esters. Using 1-phenylethyl chloride (1-PECl) as a model initiator, CuCl as a model catalyst and bipyridine (Bpy) as a model ligand, a "living" radical bulk polymerization of styrene at 130° C. affords the predicted molecular weight up to $M_n \approx 10^5$ with a narrow molecular weight distribution (e.g., $M_w/M_n < 1.5$).

A key factor in the present invention is to achieve rapid exchange between growing radicals present at low stationary concentrations (in the range of from $10^{-9}$ mol/L to $10^{-6}$ mol/L, preferably $10^{-8}$ mol/L to $10^{-6}$ mol/L) and dormant chains present at higher concentrations (typically in the range $10^{-4}$ mol/L to 1 mol/L, preferably $10^{-2}$ mol/L to $10^{-1}$ mol/L). It may be desirable to "match" the initiator/catalyst/ligand system and monomer(s) such that these concentration ranges are achieved.

Although these concentration ranges are not essential to conducting polymerization, certain disadvantageous effects may result if the concentration ranges are exceeded. For example, if the concentration of growing radicals exceeds $10^{-6}$ mol/L, there may be too many active species in the reaction, which may lead to an undesirable increase in the rate of side reactions (e.g., radical-radical quenching, radical abstraction from species other than the catalyst system, etc.). If the concentration of growing radicals is less than $10^{-9}$ mol/L, the rate may be undesirably slow.

Similarly, if the concentration of dormant chains is less than $10^{-4}$ mol/L, the molecular weight of the product polymer may increase dramatically, thus leading to a potential loss of control of the polydispersity of the product. On the other hand, if the concentration of dormant species is greater than 1 mol/L, the molecular weight of the product may become too small, and the properties of the product may more closely resemble the properties of oligomers. For example, in bulk, a concentration of dormant chains of about 10–2 mol/L provides product having a molecular weight of about 100,000 g/mol. However, a concentration of dormant chains exceeding 1 M leads to formation of (roughly) decameric products.

The various initiating systems of the present invention work for any radically polymerizable alkene, including (meth)acrylates, styrenes and dienes. It also provides various controlled copolymers, including block, random, gradient, star, graft or "comb," hyperbranched and dendritic (co)polymers. (In the present application, "(co)polymer" refers to a homopolymer, copolymer, or mixture thereof.) Similar systems have been used previously in organic synthesis, but have not been used for the preparation of well-defined macromolecular compounds.

In the present invention, any radically polymerizable alkene can serve as a monomer for polymerization. However, monomers suitable for polymerization in the present method include those of the formula:

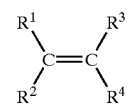

wherein $R^1$ and $R^2$ are independently selected from the group consisting of H, halogen, CN, $CF_3$, straight or branched alkyl of from 1 to 20 carbon atoms (preferably from 1 to 6 carbon atoms, more preferably from 1 to 4 carbon atoms), α,β-unsaturated straight or branched alkenyl or alkynyl of 2 to 10 carbon atoms (preferably from 2 to 6 carbon atoms, more preferably from 2 to 4 carbon atoms), α,β-unsaturated straight or branched alkenyl of 2 to 6 carbon atoms (preferably vinyl) substituted (preferably at the α-position) with a halogen (preferably chlorine), $C_3$–$C_8$ cycloalkyl, hetercyclyl, $C(=Y)R^5$, $C(=Y)NR^6R^7$ and $YC(=Y)R^8$, where Y may be $NR^8$ or O (preferably O), $R^5$ is alkyl of from 1 to 20 carbon atoms, alkoxy of from 1 to 20 carbon atoms, aryloxy or heterocyclyloxy, $R^6$ and $R^7$ are independently H or alkyl of from 1 to 20 carbon atoms, or $R^6$ and $R^7$ may be joined together to form an alkylene group of from 2 to 5 carbon atoms, thus forming a 3- to 6-membered ring, and $R^8$ is H, straight or branched $C_1$–$C_{20}$ alkyl or aryl; and $R^3$ and $R^4$ are independently selected from the group consisting of H, halogen (preferably fluorine or chlorine), $C_1$–$C_6$ (preferably $C_1$) alkyl and $COOR^9$ (where $R^9$ is H, an alkali metal, or a $C_1$–$C_6$ alkyl group); or $R^1$ and $R^3$ may be joined to form a group of the formula $(CH_2)_{n'}$ (which may be substituted with from 1 to 2n' halogen atoms or $C_1$–$C_4$ alkyl groups) or C(=O)—Y—C(=O), where n' is from 2 to 6 (preferably 3 or 4) and Y is as defined above; and at least two of $R^1$, $R^2$, $R^3$ and $R^4$ are H or halogen.

In the context of the present application, the terms "alkyl", "alkenyl" and "alkynyl" refer to straight-chain or branched groups (except for $C_1$ and $C_2$ groups).

Furthermore, in the present application, "aryl" refers to phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl and perylenyl (preferably phenyl and naphthyl), in which each hydrogen atom may be replaced with alkyl of from 1 to 20 carbon atoms (preferably from 1 to 6 carbon atoms and more preferably methyl), alkyl of from 1 to 20 carbon atoms (preferably from 1 to 6 carbon atoms and more preferably methyl) in which each of the hydrogen atoms is independently replaced by a halide (preferably a fluoride or a chloride), alkenyl of from 2 to 20 carbon atoms, alkynyl of from 1 to 20 carbon atoms, alkoxy of from 1 to 6 carbon atoms, alkylthio of from 1 to 6 carbon atoms, $C_3$–$C_8$ cycloalkyl, phenyl, halogen, $NH_2$, $C_1$–$C_6$-alkylamino, $C_1$–$C_6$-dialkylamino, and phenyl which may be substituted with from 1 to 5 halogen atoms and/or $C_1$–$C_4$ alkyl groups. (This definition of "aryl" also applies to the aryl groups in "aryloxy" and "aralkyl.") Thus, phenyl may be substituted from 1 to 5 times and naphthyl may be substituted from 1 to 7 times (preferably, any aryl group, if substituted, is substituted from 1 to 3 times) with one of the above substituents. More preferably, "aryl" refers to phenyl, naphthyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl, tolyl and methoxyphenyl.

In the context of the present invention, "heterocyclyl" refers to pyridyl, furyl, pyrrolyl, thienyl, imidazolyl, pyrazolyl, pyrazinyl, pyrimidinyl, pyridazinyl, pyranyl, indolyl, isoindolyl, indazolyl, benzofuryl, isobenzofuryl, benzothienyl, isobenzothienyl, chromenyl, xanthenyl, purinyl, pteridinyl, quinolyl, isoquinolyl, phthalazinyl, quinazolinyl, quinoxalinyl, naphthyridinyl, phenoxathiinyl, carbazolyl, cinnolinyl, phenanthridinyl, acridinyl, 1,10-phenanthrolinyl, phenazinyl, phenoxazinyl, phenothiazinyl, oxazolyl, thiazolyl, isoxazolyl, isothiazolyl, and hydrogenated forms thereof known to those in the art. Preferred heterocyclyl groups include pyridyl, furyl, pyrrolyl, thienyl, imidazolyl, pyrazolyl, pyrazinyl, pyrimidinyl, pyridazinyl, pyranyl and indolyl, the most preferred heterocyclyl group being pyridyl. Accordingly, suitable vinyl heterocycles to be used as a monomer in the present invention include 2-vinyl pyridine, 6-vinyl pyridine, 2-vinyl pyrrole, 5-vinyl pyrrole, 2-vinyl oxazole, 5-vinyl oxazole, 2-vinyl thiazole, 5-vinyl thiazole, 2-vinyl imidazole, 5-vinyl imidazole, 3-vinyl pyrazole, 5-vinyl pyrazole, 3-vinyl pyridazine, 6-vinyl pyridazine, 3-vinyl isoxazole, 3-vinyl isothiazoles, 2-vinyl pyrimidine, 4-vinyl pyrimidine, 6-vinyl pyrimidine, and any vinyl pyrazine, the most preferred being 2-vinyl pyridine. The vinyl heterocycles mentioned above may bear one or more (preferably 1 or 2) $C_1$–$C_6$ alkyl or alkoxy groups, cyano groups, ester groups or halogen atoms, either on the vinyl group or the heterocyclyl group, but preferably on the heterocyclyl group. Further, those vinyl heterocycles which, when unsubstituted, contain an N—H group may be protected at that position with a conventional blocking or protecting group, such as a $C_1$–$C_6$ alkyl group, a tris-$C_1$–$C_6$ alkylsilyl group, an acyl group of the formula $R^{10}CO$ (where $R^{10}$ is alkyl of from 1 to 20 carbon atoms, in which each of the hydrogen atoms may be independently replaced by halide [preferably fluoride or chloride]), alkenyl of from 2 to 20 carbon atoms (preferably vinyl), alkynyl of from 2 to 10 carbon atoms (preferably acetylenyl), phenyl which may be substituted with from 1 to 5 halogen atoms or alkyl groups of from 1 to 4 carbon atoms, or aralkyl (aryl-substituted alkyl, in which the aryl group is phenyl or substituted phenyl and the alkyl group is from 1 to 6 carbon atoms), etc. (This definition of "heterocyclyl" also applies to the heterocyclyl groups in "heterocyclyloxy" and "heterocyclic ring.")

More specifically, preferred monomers include (meth)acrylate esters of $C_1$–$C_{20}$ alcohols, acrylonitrile, cyanoacrylate esters of $C_1$–$C_{20}$ alcohols, didehydromalonate diesters of $C_1$–$C_6$ alcohols, vinyl pyridines, vinyl N—$C_1$–$C_6$-alkylpyrroles, vinyl oxazoles, vinyl thiazoles, vinyl pyrimidines and vinyl imidazoles, vinyl ketones in which the α-carbon atom of the alkyl group does not bear a hydrogen atom (e.g., vinyl $C_1$–$C_6$-alkyl ketones in which both α-hydrogens are replaced with $C_1$–$C_4$ alkyl, halogen, etc., or a vinyl phenyl ketone in which the phenyl may be substituted with from 1 to 5 $C_1$–$C_6$-alkyl groups and/or halogen atoms), and styrenes which may bear a $C_1$–$C_6$-alkyl group on the vinyl moiety (preferably at the α-carbon atom) and from 1 to 5 (preferably from 1 to 3) substituents on the phenyl ring selected from the group consisting of $C_1$–$C_6$-alkyl, $C_1$–$C_6$-alkenyl (preferably vinyl), $C_1$–$C_6$-alkynyl (preferably acetylenyl), $C_1$–$C_6$-alkoxy, halogen, nitro, carboxy, $C_1$–$C_6$-alkoxycarbonyl, hydroxy protected with a $C_1$–$C_6$ acyl, cyano and phenyl. The most preferred monomers are methyl acrylate (MA), methyl methacrylate (MMA), butyl acrylate (BA), 2-ethylhexyl acrylate (EHA), acrylonitrile (AN) and styrene.

Suitable initiators include those of the formula:

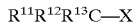

$R^{11}R^{12}R^{13}C$—X where:

X is selected from the group consisting of Cl, Br, I, $OR^{10}$ (as defined above), $SR^{14}$, $SeR^{14}$, $OC(=O)R^{14}$, $OP(=O)R^{14}$, $OP(=O)(OR^{14})_2$, $OP(=O)OR^{14}$, O—N$(R^{14})_2$ and S—C(=S)N$(R^{14})_2$, where $R^{14}$ is aryl or a straight or branched $C_1$–$C_{20}$ (preferably $C_1$–$C_{10}$) alkyl group, or where an N$(R^{14})_2$ group is present, the two $R^{14}$ groups may be joined to form a 5-, 6- or 7-membered heterocyclic ring (in accordance with the definition of "heterocyclyl" above); and $R^{11}$, $R^{12}$ and $R^{13}$ are each independently selected from the group consisting of H, halogen, $C_1$–$C_{20}$ alkyl (preferably $C_1$–$C_{10}$ alkyl and more preferably $C_1$–$C_6$ alkyl), $C_3$–$C_8$ cycloalkyl, $C(=Y)R^5$, $C((=Y)NR^6R^7$ (where $R^5$–$R^7$ are as defined above), COCl, OH (preferably only one of $R^{11}$, $R^{12}$ and $R^{13}$ is OH), CN, $C_2$–$C_{20}$ alkenyl or alkynyl (preferably $C_2$–$C_6$ alkenyl or alkynyl, and more preferably vinyl), oxiranyl, glycidyl, aryl, heterocyclyl, aralkyl, aralkenyl (aryl-substituted alkenyl, where aryl is as defined above, and alkenyl is vinyl which may be substituted with one or two $C_1$–$C_6$ alkyl groups and/or halogen atoms [preferably chlorine]), $C_1$–$C_6$ alkyl in which from 1 to all of the hydrogen atoms (preferably 1) are replaced with halogen (preferably fluorine or chlorine where 1 or more hydrogen atoms are replaced, and preferably fluorine, chlorine or bromine where 1 hydrogen atom is replaced) and $C_1$–$C_6$ alkyl substituted with from 1 to 3 substituents (preferably 1) selected from the group consisting of $C_1$–$C_4$ alkoxy, aryl, heterocyclyl, C(=Y)$R^5$ (where $R^5$ is as defined above), C(=Y)$NR^6R^7$ (where $R^6$ and $R^7$ are as defined above), oxiranyl and glycidyl;

such that no more than two of $R^{11}$, $R^{12}$ and $R^{13}$ are H (preferably no more than one of $R^{11}$, $R^{12}$ and $R^{13}$ is H)

In the present initiator, X is preferably Cl or Br. Cl-containing initiators generally provide (1) a slower reaction rate and (2) higher product polydispersity than the corresponding Br-containing initiators. Thus, a Br-containing initiator is most preferred.

When an alkyl, cycloalkyl, or alkyl-substituted aryl group is selected for one of $R^{11}$, $R^{12}$ and $R^{13}$, the alkyl group may be further substituted with an X group as defined above. Thus, it is possible for the initiator to serve as a starting molecule for branch or star (co)polymers. One example of such an initiator is a 2,2-bis(halomethyl)-1,3-dihalopropane (e.g., 2,2-bis(chloromethyl)-1,3-dichloropropane, 2,2-bis(bromomethyl)-1,3-dibromopropane), and a preferred example is where one of $R^{11}$, $R^{12}$ and $R^{13}$ is phenyl substituted with from one to five $C_1$–$C_6$ alkyl substituents, each of which may independently be further substituted with a X group (e.g., α,α'-dibromoxylene, hexakis(α-chloro- or α-bromomethyl)benzene).

Preferred initiators include 1-phenylethyl chloride and 1-phenylethyl bromide (e.g., where $R^{11}$=Ph, $R^{12}$=$CH_3$, $R^{13}$=H and X=Cl or Br), chloroform, carbon tetrachloride, 2-chloropropionitrile, $C_1$–$C_6$-alkyl esters of a 2-halo-$C_1$–$C_6$-carboxylic acid (such as 2-chloropropionic acid, 2-bromopropionic acid, 2-chloroisobutyric acid, 2-bromoisobutyric acid, etc.) and compounds of the formula $C_6H_x(CH_2Y')_y$, where Y' is Cl or Br, x+y=6 and y≧1. More preferred initiators include 1-phenylethyl chloride, 1-phenylethyl bromide, methyl 2-chloropropionate, ethyl 2-chloropropionate, methyl 2-bromopropionate, ethyl 2-bromoisobutyrate, α,α'-dichloroxylene, α,α'-dibromoxylene and hexakis(α-bromomethyl)benzene.

Any transition metal compound which can participate in a redox cycle with the initiator and dormant polymer chain, but which does not form a direct carbon-metal bond with the polymer chain, is suitable for use in the present invention. Preferred transition metal compounds are those of the formula $M_t^{n+}X'_n$, where:

$M_t^{n+}$ may be selected from the group consisting of $Cu^{1+}$, $Cu^{2+}$, $Fe^{2+}$, $Fe^{3+}$, $Ru^{2+}$, $Ru^{3+}$, $Cr^{2+}$, $Cr^{3+}$, $Mo^0$, $Mo^+$, $Mo^{2+}$, $Mo^{3+}$, $W^{2+}$, $W^{3+}$, $Rh^{3+}$, $Rh^{4+}$, $Co^+$, $Co^{2+}$, $Re^{2+}$, $Re^{3+}$, $Ni^0$, $Ni^+$, $Mn^{3+}$, $Mn^{4+}$, $V^{2+}$, $V^{3+}$, $Zn^{30}$, $Zn^{2+}$, $Au^+$, $Au^{2+}$, $Ag^+$ and $Ag^{2+}$;

X' is selected from the group consisting of halogen, $C_1$–$C_6$-alkoxy, $(SO_4)_{1/2}$, $(PO_4)_{1/3}$, $(HPO_4)_{1/2}$, $(H_2PO_4)$, triflate, hexafluorophosphate, methanesulfonate, arylsulfonate (preferably benzenesulfonate or toluenesulfonate), $SeR^{14}$, CN and $R^{15}CO_2$, where $R^{14}$ is as defined above and $R^{15}$ is H or a straight or branched $C_1$–$C_6$ alkyl group (preferably methyl) which may be substituted from 1 to 5 times with a halogen (preferably 1 to 3 times with fluorine or chlorine); and n is the formal charge on the metal (e.g., 0≦n≦7).

Suitable ligands for use in the present invention include ligands having one or more nitrogen, oxygen, phosphorus and/or sulfur atoms which can coordinate to the transition metal through a σ-bond, ligands containing two or more carbon atoms which can coordinate to the transition metal through a π-bond, and ligands which can coordinate to the transition metal through a μ-bond or a η-bond. However, preferred N-, O-, P- and S-containing ligands may have one of the following formulas:

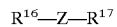

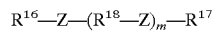

where:

$R^{16}$ and $R^{17}$ are independently selected from the group consisting of H, $C_1$–$C_{20}$ alkyl, aryl, heterocyclyl, and $C_1$–$C_6$ alkyl substituted with $C_1$–$C_6$ alkoxy, $C_1$–$C_4$ dialkylamino, C(=Y)$R^5$, C(=Y)$R^6R^7$ and YC(=Y)$R^8$, where Y, $R^5$, $R^6$, $R^7$ and $R^8$ are as defined above; or $R^{16}$ and $R^{17}$ can be joined to form a saturated, unsaturated or heterocyclic ring as described above for the "heterocyclyl" group;

Z is O, S, $NR^{19}$ or $PR^{19}$, where $R^{19}$ is selected from the game group as $R^{16}$ and $R^{17}$, each $R^{18}$ is independently a divalent group selected from the group consisting of $C_2$–$C_4$ alkylene (alkanediyl) and $C_2$–$C_4$ alkenylene where the covalent bonds to each Z are at vicinal positions (e.g., in a 1,2-arrangement) or at β-positions (e.g., in a 1,3-arrangement), and from $C_3$–$C_8$ cycloalkanediyl, $C_3$–$C_8$ cycloalkenediyl, arenediyl and heterocyclylene where the covalent bonds to each Z are at vicinal positions; and m is from 1 to 6.

In addition to the above ligands, each of $R^{16}$—Z and $R^{17}$—Z can form a ring with the $R^{16}$ group to which the Z is bound to form a linked or fused heterocyclic ring system (such as is described above for "heterocyclyl"). Alternatively, when $R^{16}$ and/or $R^{17}$ are heterocyclyl, Z can be a covalent bond (which may be single or double), $CH_2$ or a 4- to 7-membered ring fused to $R^{16}$ and/or $R^{17}$, in addition to the definitions given above for Z. Exemplary ring systems for the present ligand include bipyridine, bipyrrole, 1,10-phenanthroline, a cryptand, a crown ether, etc.

Where Z is $PR^{19}$, $R^{19}$ can also be $C_1$–$C_{20}$-alkoxy.

Also included as suitable ligands in the present invention are CO (carbon monoxide), porphyrins and porphycenes, the latter two of which may be substituted with from 1 to 6 (preferably from 1 to 4) halogen atoms, $C_1$–$C_6$ alkyl groups, $C_1$–$C_6$-alkoxy groups, $C_1$–$C_6$ alkoxycarbonyl, aryl groups, heterocyclyl groups, and $C_1$–$C_6$ alkyl groups further substituted with from 1 to 3 halogens.

Further ligands suitable for use in the present invention include compounds of the formula $R^{20}R^{21}C(C(=Y)R^5)_2$, where Y and $R^5$ are as defined above, and each of $R^{20}$ and $R^{21}$ is independently selected from the group consisting of H, halogen, $C_1$–$C_{20}$ alkyl, aryl and heterocyclyl, and $R^{20}$ and $R^{21}$ may be joined to form a $C_3$–$C_8$ cycloalkyl ring or a hydrogenated (i.e., reduced, non-aromatic or partially or fully saturated) aromatic or heterocyclic ring (consistent with the definitions of "aryl" and "heterocyclyl" above), any of which (except for H and halogen) may be further substituted with 1 to 5 and preferably 1 to 3 $C_1$–$C_6$ alkyl groups, $C_1$–$C_6$ alkoxy groups, halogen atoms and/or aryl groups. Preferably, one of $R^{20}$ and $R^{21}$ is H or a negative charge.

Additional suitable ligands include, for example, ethylenediamine and propylenediamine, both of which may be substituted from one to four times on the amino nitrogen atom with a $C_1$–$C_4$ alkyl group or a carboxymethyl group; aminoethanol and aminopropanol, both of which may be substituted from one to three times on the oxygen and/or nitrogen atom with a $C_1$–$C_4$ alkyl group; ethylene glycol and propylene glycol, both of which may be substituted one or two times on the oxygen atoms with a $C_1$–$C_4$ alkyl group; diglyme, triglyme, tetraglyme, etc.

Suitable carbon-based ligands include arenes (as described above for the "aryl" group) and the cyclopentadienyl ligand. Preferred carbon-based ligands include benzene (which may be substituted with from one to six $C_1$–$C_4$ alkyl groups [e.g., methyl]) and cyclopentadienyl (which may be substituted with from one to five methyl groups, or which may be linked through an ethylene or propylene chain to a second cyclopentadienyl ligand). Where the cyclopentadienyl ligand is used, it may not be necessary to include a counteranion (X') in the transition metal compound.

Preferred ligands include unsubstituted and substituted pyridines and bipyridines (where the substituted pyridines and bipyridines are as described above for "heterocyclyl"), acetonitrile, $(R^{10}O)_3P$, $PR^{10}_3$, 1,10-phenanthroline, porphyrin, cryptands such as $K_{222}$ and crown ethers such as 18-crown-6. The most preferred ligands are bipyridine and $(R^{10}O)_3P$.

In the present polymerization, the amounts and relative proportions of initiator, transition metal compound and ligand are those effective to conduct ATRP. Initiator efficiencies with the present initiator/transition metal compound/ligand system are generally very good (at least 50%, preferably ≧80%, more preferably ≧90%). Accordingly, the amount of initiator can be selected such that the initiator concentration is from $10^{-4}$ M to 1 M, preferably $10^{-3}$–$10^{-1}$ M. Alternatively, the initiator can be present in a molar ratio of from $10^{-4}$:1 to $10^{-1}$:1, preferably from $10^{-3}$:1 to $5 \times 10^{-2}$:1, relative to monomer. An initiator concentration of 0.1–1 M is particularly useful for preparing end-functional polymers.

The molar proportion of transition metal compound relative to initiator is generally that which is effective to polymerize the selected monomer(s), but may be from 0.0001:1 to 10:1, preferably from 0.1:1 to 5:1, more preferably from 0.3:1 to 2:1, and most preferably from 0.9:1 to 1.1:1. Conducting the polymerization in a homogeneous system may permit reducing the concentration of transition metal and ligand such that the molar proportion of transition metal compound to initiator is as low as 0.001:1.

Similarly, the molar proportion of ligand relative to transition metal compound is generally that which is effective to polymerize the selected monomer(s), but can depend upon the number of coordination sites on the transition metal compound which the selected ligand will occupy. (One of ordinary skill understands the number of coordination sites on a given transition metal compound which a selected ligand will occupy.) The amount of ligand may be selected such that the ratio of (a) coordination sites on the transition metal compound to (b) coordination sites which the ligand will occupy is from 0.1:1 to 100:1, preferably from 0.2:1 to 10:1, more preferably from 0.5:1 to 3:1, and most preferably from 0.8:1 to 2:1. However, as is also known in the art, it is possible for a solvent or for a monomer to act as a ligand. For the purposes of this application, a monomer is treated as being (a) distinct from and (b) not included within the scope of the ligand.

The present polymerization may be conducted in the absence of solvent ("bulk" polymerization). However, when a solvent is used, suitable solvents include ethers, cyclic ethers, $C_5$–$C_{10}$ alkanes, $C_5$–$C_8$ cycloalkanes which may be substituted with from 1 to 3 $C_1$–$C_4$ alkyl groups, aromatic hydrocarbon solvents, halogenated hydrocarbon solvents, acetonitrile, dimethylformamide, mixtures of such solvents, and supercritical solvents (such as $CO_2$, $C_1$–$C_4$ alkanes in which any H may be replaced with F, etc.). The present polymerization may also be conducted in accordance with known suspension, emulsion and precipitation polymerization processes.

Suitable ethers include compounds of the formula $R^{22}R^{23}$, in which each of $R^{22}$ and $R^{23}$ is independently an alkyl group of from 1 to 6 carbon atoms which may be further substituted with a $C_1$–$C_4$-alkoxy group. Preferably, when one of $R^{22}$ and $R^{23}$ is methyl, the other of $R^{22}$ and $R^{23}$ is alkyl of from 4 to 6 carbon atoms or $C_1$–$C_4$-alkoxyethyl. Examples include diethyl ether, ethyl propyl ether, dipropyl ether, methyl t-butyl ether, di-t-butyl ether, glyme (dimethoxyethane), diglyme (diethylene glycol dimethyl ether), etc.

Suitable cyclic ethers include THF and dioxane. Suitable aromatic hydrocarbon solvents include benzene, toluene, o-xylene, m-xylene, p-xylene and any isomer or mixture of isomers of cumene. Suitable halogenated hydrocarbon solvents include $CH_2Cl_2$, 1,2-dichloroethane and benzene substituted from 1 to 6 times with fluorine and/or chlorine, although one should ensure that the selected halogenated hydrocarbon solvent(s) does not act as an initiator under the reaction conditions.

Keys to controlling the polymerization reaction may include (1) matching the reactivity of the groups in the initiator ($R^{11}$, $R^{12}$ and $R^{13}$) with the group(s) on the monomer ($R^1$–$R^4$), and (2) matching the energetics of bond breaking and bond forming in dormant species (e.g., dormant polymer chains) and transition metal species (as discussed elsewhere in the specification). Matching the reactivities of the initiator with the monomer depends to some degree on the radical stabilizing effects of the substituents. Thus, where the monomer is a simple alkene or halogenated alkene (e.g., ethylene, propylene, vinyl chloride, etc.), one may select an alkyl halide initiator (e.g., where two or three of $R^{11}$, $R^{12}$ and $R^{13}$ are $C_1$–$C_6$ alkyl). On the other hand, if one wishes to polymerize an arene- or ester-stabilized monomer (e.g., a (meth)acrylate, acrylonitrile or styrene), one may select an initiator which is stabilized by a similar group (wherein one of $R^{11}$, $R^{12}$ and $R^{13}$ is aryl, heterocyclyl, alkoxycarbonyl, CN, carboxyamido [C(=O)$NR^6R^7$], etc.). Such "matching" of substituents on the initiator and monomer provides a beneficial balance of the relative reactivities of the initiator and monomer.

Preferably, the monomer, initiator, transition metal compound and ligand are selected such that the rate of initiation is not less than 1,000 times (preferably not less than 100 times) slower than the rate of propagation and/or transfer of the X group to the polymer radical. (In the present application, "propagation" refers to the reaction of a polymer radical with a monomer to form a polymer-monomer adduct radical.)

The present polymerization may be conducted in bulk, in the gas phase (e.g., by passing the monomer in the gas phase over a bed of the catalyst which has been previously contacted with the initiator and ligand), in a sealed vessel or in an autoclave. Polymerizing may be conducted at a temperature of from −78° to 200°, preferably from 0° to 160° and most preferably from 80° to 140°. The reaction should be conducted for a length of time sufficient to convert at least 10% (preferably at least 50%, more preferably at least 75% and most preferably at least 90%) of the monomer to polymer. Typically, the reaction time will be from several minutes to 5 days, preferably from 30 minutes to 3 days, and most preferably from 1 to 24 hours. Polymerizing may be conducted at a pressure of from 0.1 to 100 atmospheres, preferably from 1 to 50 atmospheres and most preferably from 1 to 10 atmospheres (although the pressure may not be measurable directly if conducted in a sealed vessel).

One may also conduct a "reverse" ATRP, in which the transition metal compound is in its oxidized state, and the polymerization is initiated by, for example, a radical initiator such as azobis(isobutyronitrile) ("AIBN"), a peroxide such as benzoyl peroxide (BPO) or a peroxy acid such as peroxyacetic acid or peroxybenzoic acid. The radical initiator is believed to initiate "reverse" ATRP in the following fashion:

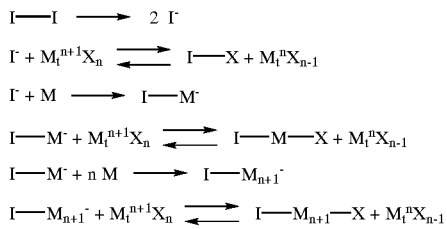

where "I" is the initiator, $M_t^n X_{n-1}$ is the transition metal compound, M is the monomer, and I–M–X and $M_t^n X_{n-1}$ participate in "conventional" or "forward" ATRP in the manner described above.

After the polymerizing step is complete, the formed polymer is isolated. The isolating step of the present process is conducted by known procedures, and may comprise precipitating in a suitable solvent, filtering the precipitated polymer, washing the polymer and drying the polymer.

Precipitation can be typically conducted using a suitable $C_5-C_8$-alkane or $C_5-C_8$-cycloalkane solvent, such as pentane, hexane, heptane, cyclohexane or mineral spirits, or using a $C_1-C_6$-alcohol, such as methanol, ethanol or isopropanol, or any mixture of suitable solvents. Preferably, the solvent for precipitating is hexane, mixtures of hexanes, or methanol.

The precipitated (co)polymer can be filtered by gravity or by vacuum filtration, in accordance with known methods (e.g., using a Buchner funnel and an aspirator). The polymer can then be washed with the solvent used to precipitate the polymer, if desired. The steps of precipitating, filtering and washing may be repeated, as desired.

Once isolated, the (co)polymer may be dried by drawing air through the (co)polymer, by vacuum, etc., in accordance with known methods (preferably by vacuum). The present (co)polymer may be analyzed and/or characterized by size exclusion chromatography, in accordance with known procedures.

Polymers produced by the present process may be useful in general as molding materials (e.g., polystyrene containers) and as barrier or surface materials (e.g., poly (methyl methacrylate), or PMMA, is well-known in this regard as PLEXIGLAS™). However, the polymers produced by the present process, which typically will have more uniform properties than polymers produced by conventional radical polymerization, will be most suitable for use in specialized applications.

For example, block copolymers of polystyrene and polyacrylate (e.g., PSt-PA-PSt triblock copolymers) are useful thermoplastic elastomers. Poly(methyl methacrylate)-polyacrylate triblock copolymers (e.g., PMMA-PA-PMMA) are useful, fully acrylic thermoplastic elastomers. Homo- and copolymers of styrene, (meth)acrylates and/or acrylonitrile are useful plastics, elastomers and adhesives. Either block or random copolymers of styrene and a (meth)acrylate or acrylonitrile may be useful thermoplastic elastomers having high solvent resistance.

Furthermore, block copolymers in which the blocks alternate between polar monomers and non-polar monomers produced by the present invention are useful amphiphilic surfactants or dispersants for making highly uniform polymer blends. Star polymers produced by the present process are useful high-impact (co)polymers. (For example, STYROLUX™, and anionically-polymerized styrene-butadiene star block copolymer, is a known, useful high-impact copolymer.)

The (co)polymers of the present invention may have a number average molecular weight of from 1,000 to 500,000 g/mol, preferably of from 2,000 to 250,000 g/mol, and more preferably of from 3,000 to 200,000 g/mol. When produced in bulk, the number average molecular weight may be up to 1,000,000 (with the same minimum weights as mentioned above). The number average molecular weight may be determined by size exclusion chromatography (SEC) or, when the initiator has a group which can be easily distinguished from the monomer(s) by NMR spectroscopy (e.g., when 1-phenylethyl chloride is the initiator and methyl methacrylate is the monomer).

Thus, the present invention also encompasses novel block, multi-block, star, gradient, random hyperbranched and dendritic copolymers, as well as graft or "comb" copolymers. Each of the these different types of copolymers will be described hereunder.

Because ATRP is a "living" polymerization, it can be started and stopped, practically at will. Further, the polymer product retains the functional group "X" necessary to initiate a further polymerization. Thus, in one embodiment, once the first monomer is consumed in the initial polymerizing step, a second monomer can then be added to form a second block on the growing polymer chain in a second polymerizing step. Additional polymerizations with the same or different monomer(s) can be performed to prepare multi-block copolymers.

Furthermore, since ATRP is radical polymerization, blocks can be prepared in essentially any order. One is not necessarily limited to preparing block copolymers where the sequential polymerizing steps must flow from the least stabilized polymer intermediate to the most stabilized polymer intermediate, such as is necessary in ionic polymerization. (However, as is described throughout the application, certain advantageous reaction design choices will become apparent. However, one is not limited to those advantageous reaction design choices in the present invention.) Thus, one can prepare a multi-block copolymer in which a polyacrylonitrile or a poly(meth)acrylate block is prepared first, then a styrene or butadiene block is attached thereto, etc.

Furthermore, a linking group is not necessary to join the different blocks of the present block copolymer. One can simply add successive monomers to form successive blocks. Further, it is also possible (and in some cases advantageous) to first isolate a (co)polymer produced by the present ATRP process, then react the polymer with an additional monomer using a different initiator/catalyst system (to "match" the reactivity of the growing polymer chain with the new monomer). In such a case, the product polymer acts as the new initiator for the further polymerization of the additional monomer.

Thus, the present invention also encompasses block copolymers of the formula:

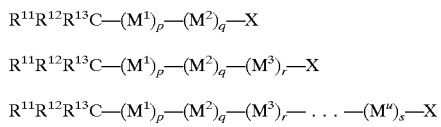

wherein $R^{11}$, $R^{12}$, $R^{13}$ and X are as defined above; $M^1$, $M^2$, $M^3$, ... up to $M''$ are each a radically polymerizable monomer (as defined above) selected such that the monomers in adjacent blocks are not identical (although monomers in non-adjacent blocks may be identical) and p, q, r, ... up to s are independently selected such that the number average molecular weight of each block is from 1,000 to 250,000 g/mol. After an appropriate end group conversion reaction (conducted in accordance with known methods), X may also be, for example, H, OH, $N_3$, $NH_2$, COOH or $CONH_2$.

Where the $R^{11}R^{12}R^{13}C$ group of the initiator contains a second "X" group, the block copolymers may have one of the following formulas:

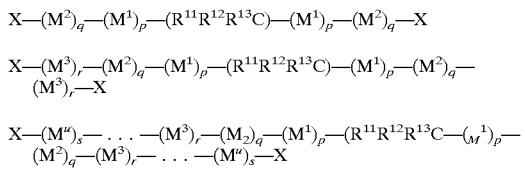

wherein $R^{11}$, $R^{12}$, $R^{13}$, X, $M^1$, $M^2$, $M^3$, ... up to $M''$, and p, q, r, ... up to s are as defined above.

The present invention is also useful for making essentially random copolymers. By "essentially random" copolymers, the copolymers are as close to statistically random as is possible under radical polymerization conditions. The present ATRP process is particularly useful for producing random copolymers where one of the monomers has one or two bulky substituents (e.g., 1,1-diarylethylene, didehydromalonate $C_1$–$C_{20}$ diesters, $C_1$–$C_{20}$ diesters of maleic or fumaric acid, maleic anhydride and/or maleic diimides [where Y is $NR^8$ as defined above], etc.), from which homopolymers may be difficult to prepare, due to steric considerations. Thus, the present invention also concerns a random copolymer of the formula:

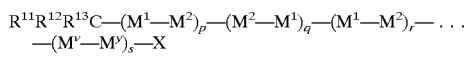

or

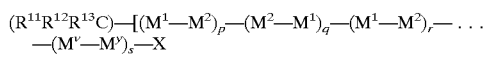

where $R^{11}$, $R^{12}$, $R^{13}$ and X are as defined for the block copolymer above, $M^1$ and $M^2$ are different radically-polymerizable monomers (as defined above), and $M^{y'}$ is one of $M^1$ and $M^2$ and $M^y$ is the other of $M^1$ and $M^2$. However, p, q, r, ... up to s are independently selected such that the number average molecular weight of the copolymer is from 1,000 to 1,000,000 g/mol, preferably from 2,000 to 250,000, and more preferably from 3,000 to 150,000 g/mol. The ratio of (1) the total number of "blocks" of statistically random units to (2) the total number of monomer units is preferably at least 1:5, more preferably at least 1:8, and most preferably at least 1:10. The present random copolymer can also serve as a block in any of the present block copolymers.

Preferably, at least one of $M^1$ and $M^2$ has the formula:

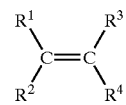

wherein at least one of $R^1$ and $R^2$ is CN, $CF_3$, straight or branched alkyl of from 4 to 20 carbon atoms (preferably from 4 to 10 carbon atoms, more preferably from 4 to 8 carbon atoms), $C_3$–$C_8$ cycloalkyl, aryl, heterocyclyl, C(=Y)$R^5$, C(=Y)$NR^6R^7$ and YC(=Y)$R^8$, where aryl, heterocyclyl, Y, $R^5$, $R^6$, $R^7$ and $R^8$ are as defined above; and $R^3$ and $R^4$ are as defined above; or $R^1$ and $R^3$ are joined to form a group of the formula C(=O)—Y—C(=O), where Y is as defined above.

More preferred monomers for the present include styrene, acrylonitrile, $C_1$–$C_8$ esters of (meth)acrylic acid and 1,1-diphenylethylene.

The present invention is also useful for forming so-called "star" polymers and copolymers. Thus, where the initiator has three or more "X" groups, each of the "X" groups can serve as a polymerization initiation site. Thus, the present invention also encompasses star (co)polymers of the formula:

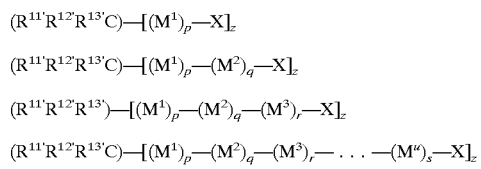

where $R^{11'}$, $R^{12'}$ and $R^{13'}$ are the same as $R^{11}$, $R^{12}$ and $R^{13}$ with the proviso that $R^{11'}$, $R^{12'}$ and $R^{13'}$ combined contain from 2 to 5 X groups; X is as defined for the block copolymer above; $M^1$, $M^2$, $M^3$, ... $M''$ are as defined above for the present block copolymers; and z is from 3 to 6.

Initiator suitable for use in preparing the present star (co)polymers are those in which the $R^{11}R^{12}R^{13}C$ group possesses at least two substituents which can be "X" (as defined above). Preferably, these substituents are identical to "X". Examples of such initiators include chloroform, carbon tetrachloride, [insert examples from above]. Preferred initiators of this type include 2,2-bis(chloromethyl)-1,3-dichloropropane, 2,2-bis(bromomethyl)-1,3-dibromopropane), α,α',α"-trichloro- and α,α',α"-tribromocumene, and hexakis(α-chloro- and α-bromomethyl)benzene), the most preferred being hexakis (α-bromomethyl)benzene.

In the present copolymers, each of the blocks may have a number average molecular weight in accordance with the homopolymers described above. Thus, the present copolymers may have a molecular weight which corresponds to the number of blocks (or in the case of star polymers, the number of branches times the number of blocks) times the number average molecular weight range for each block.

The present invention also encompasses graft or "comb" copolymers, prepared by sequential ATRP's. Thus, a (co) polymer is produced by a first ATRP, in which at least one of the monomers has a $R^1$–$R^4$ substituent which is encompassed by the description of the "X" group above. Preferably this substituent is Cl or Br. Examples of preferred monomers would thus include vinyl chloride, 1- or 2- chloropropene, vinyl bromide, 1,1- or 1,2-dichloro- or dibromoethene, trichloro- or tribromoethylene, tetrachloro- or tetrabromoethylene, chloroprene, 1-chlorobutadiene, 1- or 2-bromodutadiene, etc. More preferred monomers include vinyl chloride, vinyl bromide and chloroprene. It may be necessary to hydrogenate (by known methods) a (co)polymer produced in the first ATRP of chloroprene prior to the second ATRP, using the polymer produced by the first ATRP as the initiator.

Gradient or tapered copolymers can be produced using ATRP by controlling the proportion of two or more monomers being added. For example, one can prepare a first block (or a oligomer) of a first monomer, then a mixture of the first monomer and a second, distinct monomer can be added in proportions of from, for example, 1:1 to 9:1 of first monomer to second monomer. After conversion of all monomer(s) is complete, sequential additions of first monomer-second monomers mixtures can provide subsequent "blocks" in which the proportions of first monomer to second monomer vary. Thus, the present invention also encompasses a copolymer of the formula:

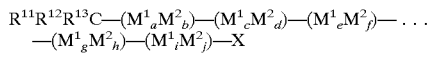

where $R^{11}$, $R^{12}$, $R^{13}$ and X are as defined for the block copolymer above, $M^1$ and $M^2$ are different radically-polymerizable monomers (as defined above), and a, b, c, d, e, f, ... up to g and h are non-negative numbers independently selected such that a+b=c+d=100, and any or all of (e+f), (g+h) and (i+j)=100 or 0, wherein the a:b ratio is from 100:0 to 0:100, the c:d ratio is from 95:5 to 5:95 (preferably from 90:10 to 10:90), such that c<a and d>b, and where applicable, the e:f ratio is from 90:10 to 10:90 (preferably from 80:20 to 20:80), such that e<c and f>d, and depending on the number of blocks, the endpoints of the molar ratio ranges of first monomer to second monomer in successive blocks may progressively decrease or increase by 5 (preferably by 10) such that the e:f ratio is from 5:95 to 95:5 (preferably from 10:90 to 90:10), such that e≠c and f≠d, and the i:j ratio is from 0:100 to 100:0, such that i≠e and j≠f.

Preferably, the proportions of first and second monomers in subsequent "blocks" vary by at least 10% (e.g., c=a±10 and b=d±10), preferably by at least 20%, up to 50%, from the preceding block. In a further embodiment, the relative proportions of first monomer to second monomer can be controlled in a continuous manner, using for example a programmable syringe or feedstock supply pump.

When either the initiator or monomer contains a substituent bearing a remote (i.e., unconjugated) ethylene or acetylene moiety, ATRP can be used to prepare cross-linked polymers and copolymers.

Polymers and copolymers produced by the present process have surprisingly low polydispersity for (co)polymers produced by radical polymerization. Typically, the ratio of the weight average molecular weight to number average molecular weight ("$M_w/M_n$") is $\leq 1.5$, preferably $\leq 1.4$, and can be as low as 1.10 or less.

Because the "living" (co)polymer chains retain an initiator fragment including X or X' as an end group, or in one embodiment, as a substituent in a monomeric unit of the polymer chain, they may be considered end-functional or in-chain functional (co)polymers. Such (co)polymers may be used directly or be converted to other functional groups for further reactions, including crosslinking, chain extension, reactive injection molding (RIM), and preparation of other types of polymers (such as polyurethanes, polyimides, etc.).

The present invention provides the following advantages:

A larger number and wider variety of monomers can be polymerized by radical polymerization, relative to ionic and other chain polymerizations;

Polymers and copolymers produced by the present process exhibit a low polydispersity (e,.g., $M_w/M_n \leq 1.5$, preferably $\leq 1.4$, more preferably $\leq 1.25$, and most preferably, $\leq 1.10$), thus ensuring a greater degree of uniformity in the (co)polymer properties;

One can select an initiator which provides an end group having the same structure as the repeating polymer units (1-phenylethyl chloride as initiator and styrene as monomer);

The present process provides high conversion of monomer and high initiator efficiency;

The present process exhibits excellent "living" character, thus facilitating the preparation of block copolymers which cannot be prepared by ionic processes;

Polymers produced by the present process are well-defined and highly uniform, comparable to polymers produced by living ionic polymerization;

End-functional initiators (e.g., containing COOH, OH, $NO_2$, etc., groups) can be used to provide an end-functional polymer in one pot;

The end functionality of the (co)polymers produced by the present process (e.g., Cl, Br, I, CN, $CO_2R$) can be easily converted to other functional groups (e.g., Cl, Br and I can be converted to OH or $NH_2$ by known processes, and CN or $CO_2R$ can be hydrolyzed to form a carboxylic acid by known processes), thus facilitating their use in chain extension processes (e.g., to form long-chain polyamides, polyurethanes and/or polyesters); and In some cases (e.g., where "X" is Cl, Br and I), the end functionality of the polymers produced by the present process can be reduced by known methods to provide end groups having the same structure as the repeating polymer units.

Hereinbelow, studies conducted by the present inventors on ATRP to investigate the various parameters which affect ATRP will be described. Exemplary experimental protocols will follow.

A number of commercially available alkyl halides, R—X, combined with Cu(I)X'/Bpy, where X=X'=Cl or Br, can be used as efficient model initiator systems for the atom transfer radical polymerization (ATRP) of styrene, (meth)acrylates and other radically polymerizable monomers. The effects of various parameters in ATRP will be discussed hereinbelow to provide guidance as to the efficient control of radical polymerization.

Atom Transfer Radical Polymerization of Styrene and (Meth)acrylates Initiated with an Alkyl Halide, R—X, and in the Presence of CuX', Complexed by 2,2'-Bipyridine Using 1-phenylethyl chloride (hereinafter "1-PECl") as an initiator, one molar equivalent of Cu(I)Cl as a catalyst, and three molar equivalents of 2,2'-bipyridine (hereinafter "Bpy") as a ligand (both equivalents of catalyst and ligand being relative to 1-PECl) in a model system, the so-called atom transfer radical polymerization (ATRP) of styrene (hereinafter "St") proceeds in a "living" fashion at 130° C. Similarly, using various 1:1:3 R—X:CuX':Bpy initiator systems, the atom transfer radical polymerization of styrene and various (meth)acrylates at different temperatures also affords the product polymers with the predicted molecular weight (up to $M_n > 10^5$), having excellent low polydispersity (as low as 1.15; see Table 1 below).

TABLE 1

Characterization Data for ATRP of Styrene and Various (Meth)acrylates Initiated with RX/CuX'/Bpy[a]

| Monomer | RX[b]/CuX' | T (° C.) | $M_{n,th}$[c] | $M_{n,SEC}$ | $M_w/M_n$ |
|---|---|---|---|---|---|
| Styrene | 1-PECl/CuCl | 130 | 120,000 | 110,500 | 1.45 |
|  |  | 100 | 97,000 | 93,300 | 1.50 |
|  | 1-PEBr/CuBr | 80 | 8,300 | 8,000 | 1.25 |
| MA | 2-EPNCl/CuCl | 130 | 30,500 | 31,000 | 1.40 |
|  | 2-EPNBr/CuBr | 80 | 19,100 | 21,500 | 1.25 |
|  | 2-MPNBr/CuBr | 100 | 27,500 | 29,000 | 1.15 |
|  | α,α'-Br$_2$-xylene/CuBr | 100 | 29,500 | 31,000 | 1.25 |
| BuA[d] | 2-MPNBr/CuBr | 130 | 15,000 | 13,500 | 1.50 |
| MMA[d] | 2-EiBBr/CuBr | 100 | 10,000 | 9,800 | 1.40 |

[a]molar ratio of RX/CuX'/Bpy = 1/1/3;
[b]1-PECl: 1-phenylethyl chloride, 1-PEBr: 1-phenylethyl bromide, 2-EPNCl: ethyl 2-chloropropionate, 2-EPNBr: ethyl 2-bromopropionate, 2-MPNBr: methyl 2-bromopropionate, 2-EiBBr: ethyl 2-bromoisobutyrate;
[c]calculated according to eq. 1;
[d]in ethyl acetate solution, 50% by volume.

Figure 3:
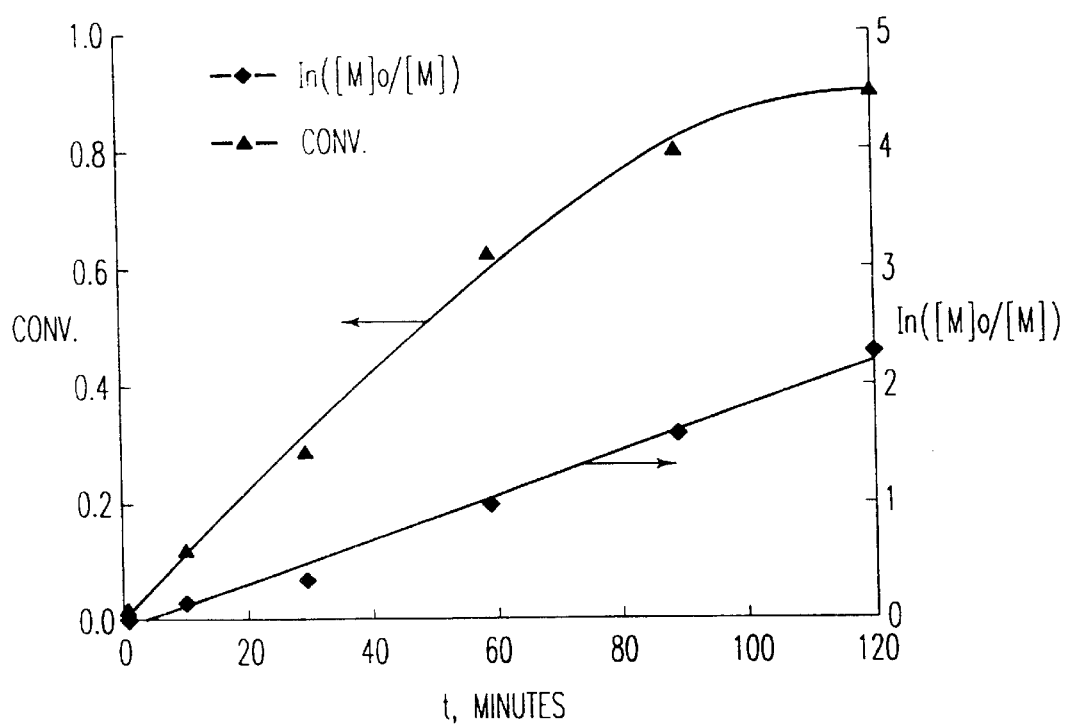
FIG. 3 is a graph of the kinetics of methyl acrylate ("MA") bulk polymerization at 130° C., initiated with 1-phenylethyl chloride in the presence of Cu(I)Cl (1 equiv.) and bipyridine (Bpy; 3 equiv.)

As an illustrative example of the controlled character of the ATRP of (meth)acrylic esters, FIG. 3 presents the kinetics of methyl acrylate ("MA") bulk polymerization at 130° C., initiated with 1-PECl in the presence of Cu(I)Cl (1 equiv.) and Bpy (3 equiv.). The straight semilogarithmic kinetic plot of $\ln([M])_o/[M])$ vs. time ("t", in minutes) indicates that the concentration of growing radicals is constant, and that termination reactions are minimals.

Figure 4:
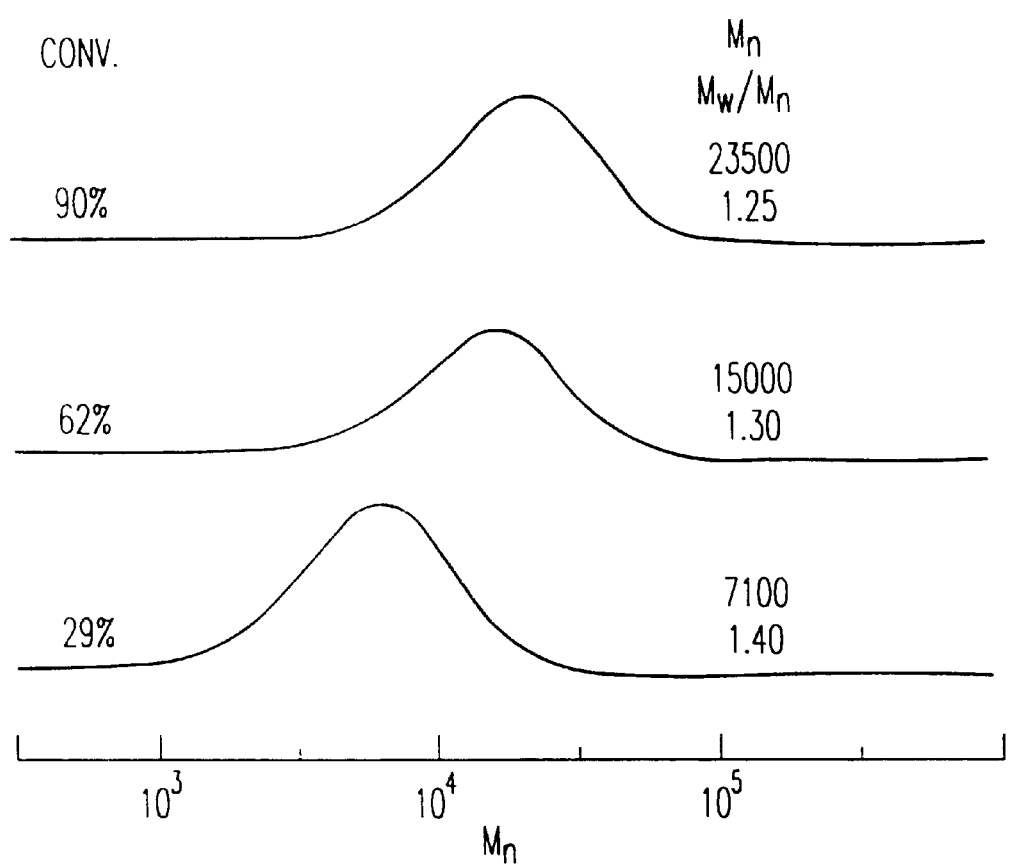
FIG. 4 is a graph showing that the experimental molecular weight, $M_{n,SEC}$, increases with monomer conversion.

Moreover, the experimental molecular weight, $M_{n,SEC}$, increases with monomer conversion (FIG. 4) and matches the theoretical molecular weight, $M_{n,th}$ (FIG. 5), as calculated by eq. 1:

$$M_n = (\Delta[M]/[R-X]_0) \times (MW)_0 \quad (1)$$

where $\Delta[M]$ represents the concentration of consumed monomer MA, $[R-X]_0$ represents the initial concentration of 1-PECl, and $(MW)_0$ represents the molecular weight of MA. These results provide evidence that 1-PECl acts as an efficient initiator, and that the number of active chains remains practically unchanged during the MA polymerization. Thus, termination and transfer side reactions, if they exist, are not significant. Both of these results suggest that the ATRP of MA is a "living" process.

Figure 6:
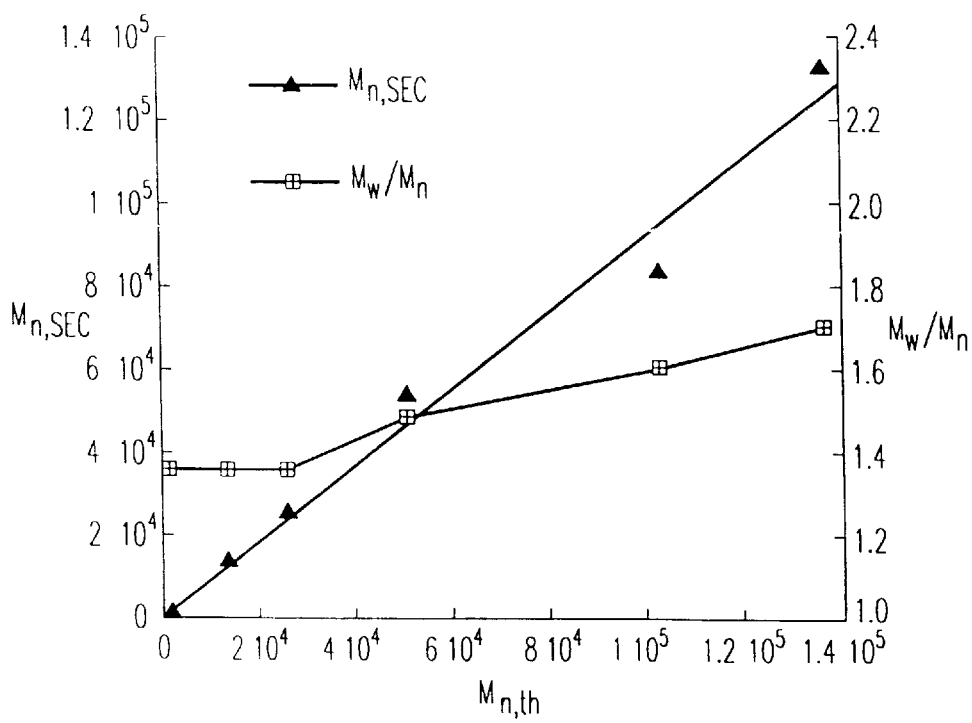
FIG. 6 shows the correlation of the experimental molecular weights, $M_{n,SEC}$, with the theoretical molecular weights, $M_{n,th}$, for a series of bulk ATRP's of MA carried out at 130° C. using various monomer/initiator molar ratios and a constant ligand/catalyst/initiator molar ratio of 3/1/1.

Furthermore, a series of bulk ATRP's of MA was carried out at 130° C., using various monomer/initiator molar ratios, $[MA]_0/[1-PECl]_0$, and a constant ligand/catalyst/initiator molar ratio of 3/1/1. FIG. 6 shows the correlation of the experimental molecular weights, $M_{n,SEC}$, with the theoretical molecular weights, $M_{n,th}$, calculated by eq. (1). A linear plot is obtained in the molecular weight range of from $1.5 \times 10^3$ to $1.35 \times 10^5$. The slope of the straight line is 0.95, thus indicating a high initiator efficiency. These results again support a "living" process of MA polymerization initiated with 1:1:3 1-PECl:CuCl:Bpy.

End Group Analysis of Polymers Obtained by Atom Transfer Radical Polymerization

Figure 7A:
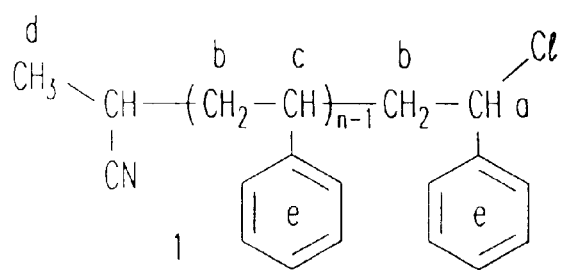
FIGS. 7A and 7B show the $^1H$ NMR spectra of PSt prepared at 130° C. using 2-chloropropionitrile as an initiator, in the presence of 1 molar equiv. of CuCl and 3 molar equiv. of Bpy.
Figure 7B:
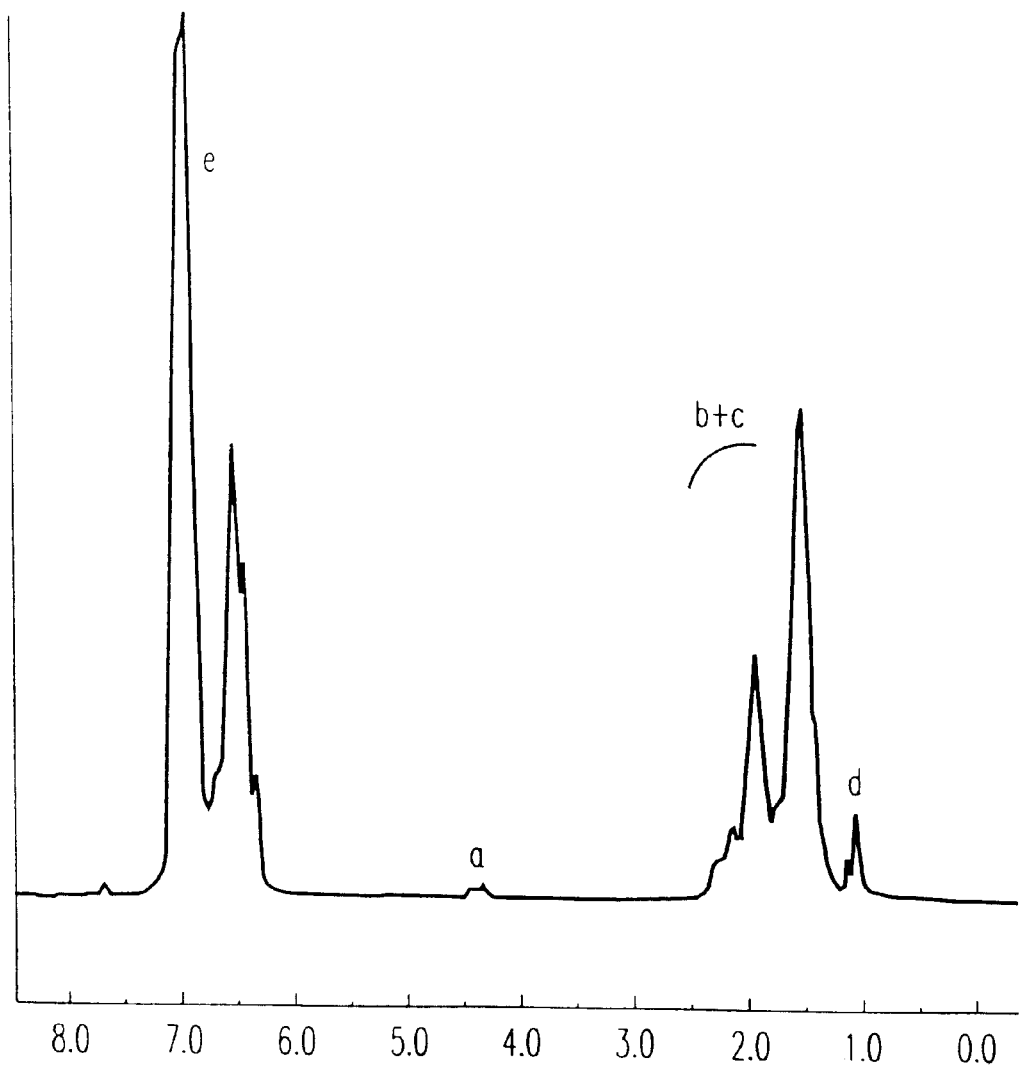

The nature of the chain ends of low molecular weight polystyrene synthesized by the ATRP technique was analyzed by means of $^1$H NMR spectroscopy. FIG. 7 presents the $^1$H NMR spectra of PSt which was prepared at 130° C. using 2-chloropropionitrile as an initiator, in the presence of one molar equiv. of CuCl and 3 molar equiv. of Bpy. Two broad signals at 4.2–4.4 ppm are assigned to two different stereoisomers (m and r) of end group a in the anticipated structure 1. Moreover, two additional broad bands at 0.85 and 0.96 ppm in FIG. 7 represent two stereoisomers (m and r) of the end group d.

Comparison of the integration values for the two end group resonances in the $^1$H NMR spectrum (FIG. 7) shows a 3:1 molar ratio of a and d. This may suggest that the St polymerization was initiated with 2-propionitrile radicals and was efficiently deactivated with an equimolar amount of chlorine atoms (relative to the 1-propionitrile group). Moreover, comparison of the integration of the end groups with phenyl groups, e, at 6.5 ppm to 7.3 ppm, and to other groups, b and c, in the backbone of the polystyrene chain at 1.2 ppm to 2.5 ppm gave a molecular weight similar to the one obtained from the SEC measurement ($M_{n,NMR}$~2000 vs. $M_{n,SEC}$~2100), indicating a quantitative initiation by 2-chloropropionitrile. This result shows a high initiator efficiency in ATRP.

Stereochemistry of Atom Transfer Radical Polymerization

To better understand the mechanism of ATRP, the stereochemistry of MMA polymerization was investigated.

The tacticity of poly(methyl methacrylate), PMMA, was calculated from the $^{13}$C NMR of the C=O group and the quaternary carbon atom, and from the $^1$H NMR of the α-methyl group. The $^{13}$C NMR resonances of the C=O group and the quaternary carbon atom are recorded in the regions 175–179 ppm and 44–46.5 ppm, respectively, with respect to the reference peak of CDCl$_3$ at 77.2 ppm. The assignment of the $^{13}$C signals was performed to Peat and Reynolds (see Bamford, *Reactivity, Mechanism and Structure in Polymer Chemistry*, Jenkins, A. D. and Ledwith, A., eds, John Wiley & Sons, London (1974), p. 52; and Peat et al, *Tetrahedron Lett.*, 1972, 14, 1359).

Figure 8A:
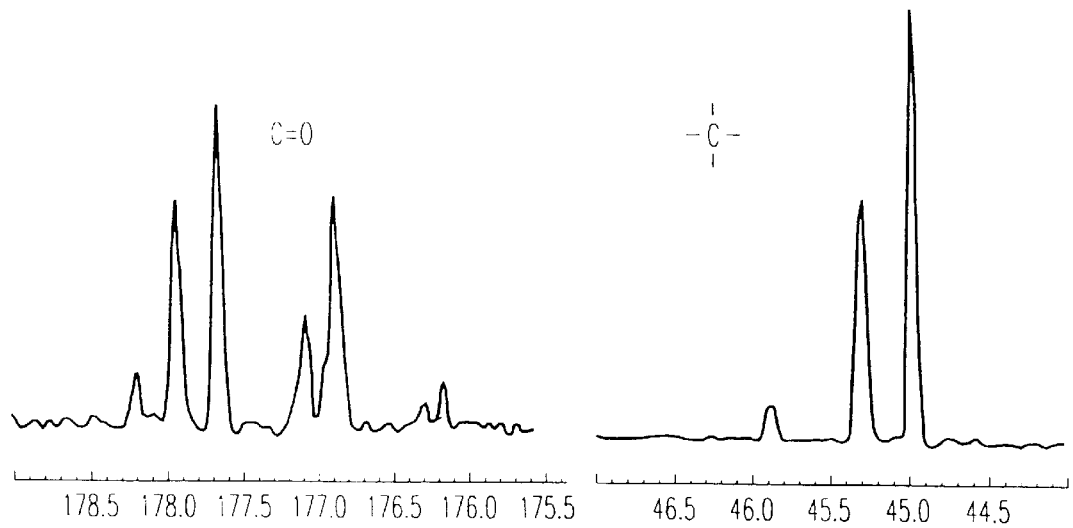
FIGS. 8A and 8B compare the $^{13}C$ NMR spectra of the C=O group and the quaternary carbon atom of PMMA prepared at 100° C. using methyl 2-bromoisobutyrate ("2-MiBBr"), CuBr and Bpy in a 1/1/3 molar ratio (FIG. 8A), and of PMMA prepared using a classic radical initiator, AIBN (FIG. 8B)
Figure 8B:
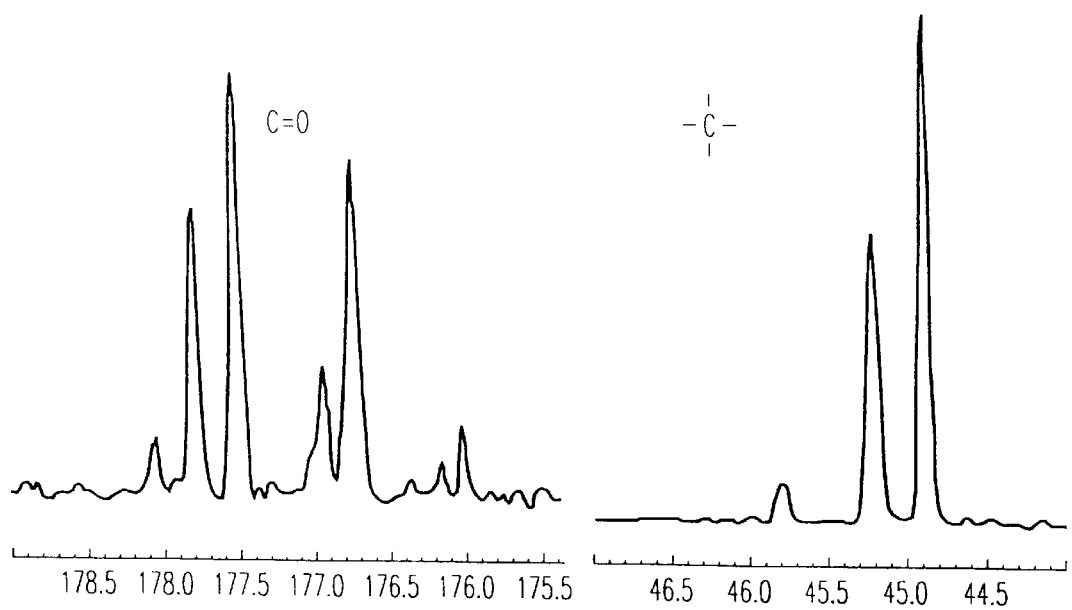

FIG. 8A displays the $^{13}$C NMR spectra of the C=O group and the quaternary carbon atom of PMMA prepared at 100° C. using methyl 2-bromoisobutyrate ("2-MiBBr"), CuBr and Bpy in a 1/1/3 molar ratio, and FIG. 8B displays the $^{13}$C NMR spectra of the C=O group and the quaternary carbon atom of PMMA prepared using a classic radical initiator, AIBN. Both spectra are almost identical. Indeed, up to a pentad sequence, PMMAs prepared using a classic radical initiator such as AIBN or BPO and various ATRP initiator systems have the same compositions, within the limits of experimental error (see Table 2 below). Moreover, the stereochemistry for PMMA prepared by ATRP appears to be consistent with a Bernoullian process, as indicated by a σ value of ~1. These results indicate the presence of the same type of active species in the present Cu(I)X'-catalyzed polymerization and in conventional free radical polymerization. The similarities in stereochemistry and regiochemistry observed in the present results are consistent with the results observed in Bu$_3$SnH-mediated radical cyclizations and in Cu(I)-catalyzed chlorine transfer cyclizations reported by others (see (a) Bellus, D. *Pure & Appl. Chem.* 1985, 57, 1827; (b) Nagashima, H.; Ozaki, N.; Ishii, M.; Seki, K.; Washiyama, M.; Itoh, K. *J. Org. Chem.* 1993, 58, 464; (c) Udding, J. H.; Tuijp, K. J. M.; van Zanden, M. N. A.; Hiemstra, H.; Speckamp, W. N. *J. Org. Chem.* 1994, 59, 1993; (c) Seijas et al, *Tetrahedron,* 1992, 48(9), 1637).

Effect of the Structure of the Initiator on Atom Transfer Radical Polymerization Table 3 reports the data for the ATRP of styrene at 130° C. using various commercially available alkyl chlorides, Cu(I)Cl (1 molar equiv.) and Bpy (3 molar equiv.)

TABLE 2

Comparison of Fractions of Pentads, Triads, and Diads in Poly(methyl methacrylate) (PMMA)
Prepared Using Classic Initiators and Various ATRP Initiator Systems

| T (C. °) | Initiator system | mmmm | mmmr | rmmr | rmrm + mmrm | rmrr + mmrr | mrrm | mrrr | rrrr | mm | mr | rr | m | r | $\rho^a$ |
|---|---|---|---|---|---|---|---|---|---|---|---|---|---|---|---|
| 130 | 1-PECl/CuCl/Bpy[b] | — | — | — | — | — | — | — | — | 0.06 | 0.38 | 0.56 | 0.25 | 0.75 | 0.99 |
|  | BPO[c] | — | — | — | — | — | — | — | — | 0.06 | 0.37 | 0.55 | 0.245 | 0.755 | 1.00 |
| 100 | 2-EiBBr/CuBr/Bpy[d] | 0.01 | 0.03 | 0.04 | 0.11 | 0.26 | 0.06 | 0.22 | 0.27 | 0.05 | 0.36 | 0.59 | 0.23 | 0.77 | 1.04 |
|  | AIBN[e] | 0.02 | 0.03 | 0.04 | 0.11 | 0.27 | 0.04 | 0.21 | 0.28 | 0.06 | 0.34 | 0.60 | 0.23 | 0.77 | 1.04 |
| 60 | 2-EiBBr/CuBr/Bpy[d] | — | — | — | — | — | — | — | — | 0.04 | 0.33 | 0.63 | 0.205 | 0.795 | 0.99 |
|  | AIBN[f] | — | — | — | — | — | — | — | — | 0.03 | 0.35 | 0.62 | 0.205 | 0.795 | 0.94 |

[a]The persistence ratio: $\rho = 2(m)(r)/(mr)$;
[b]Polymerization conditions: $[MMA]_0 = 9.36M$, $[1-PECl]_0 = 0.11M$, $[1-PECl]_0/[CuCl]_0/Bpy]_0 = 1/1/3$;
[c]Polymerization conditions: $[MMA]_0 = 9.36M$, $[BPO] = 0.1M$;
[d]Polymerization conditions: $[2-EiBBr]_0 = 0.055M$, $[1-PECl]_0/[CuCl]_0/[Bpy]_0 = 1/1/3$;
[e]Polymerization conditions: $[MMA]_0 = 9.36M$, $[AIBN] = 0.1M$;
[f]Hatada, K. et al, Polym. J. 1987, 19, 413.

as initiator, catalyst, and ligand, respectively. Initiators which possess either inductive or resonance-stabilizing substituents (e.g., two or more halogen atoms in addition to the Cl transfer atom, CN, COOR, and/or aryl [Ph]) can serve as efficient mono- or bi-functional initiators (i.e, providing high initiator efficiency ["f">0.9] and narrow molecular weight distribution [e.g., $M_w/M_n$~1.25–1.5]).

In contrast, simple alkyl chlorides as butyl chloride, $C_4H_9Cl$, and dichloromethane, $CH_2Cl_2$, do not work well with St, giving uncontrolled polymers with unexpectedly high molecular weights and broad molecular weight distribution. These results are very similar to those obtained under similar conditions in the absence of initiator (see Table 3 below). These results indicate very poor efficiency of $C_4H_9Cl$ and $CH_2Cl_2$ as initiators for the ATRP of St.

The results shown in Table 3 may be tentatively correlated with the carbon-halide bond strength or bond dissociation energy (BDE). For initiators having a high BDE, such as $C_4H_9Cl$ and $CH_2Cl_2$ (see Wang et al, *Macromolecules,* 1993, 26, 5984; and Baumgarten et al, *Macromolecules,* 1991, 24, 353), the chloride atom transfer from the initiator to Cu(I)Cl appears to be very difficult because of the strong carbon-chlorine bonds. Introduction of an inductive or resonance-stabilizing substituent into the initiator reduces the BDE of the C—Cl bond (Wang et al and Baumgarten et al, supra), and the generation of initiating radicals by chlorine atom transfer becomes facile and efficient, resulting in a high initiator efficiency and narrow MWD in the ATRP of St.

TABLE 3

Styrene ATRP, Using Various Initiators in the
Presence of CuCl (1 molar equiv.) and Bpy (3 molar equiv.)[a]

| Initiator | $[In^*]_0$ ($10^3$M) | $M_{n,th}$[b] | $M_{n,SEC}$ | $M_w/M_n$ |
|---|---|---|---|---|
| — | — | — | 134,700 | 1.95 |
| $C_4H_9Cl$ | 0.082 | 10,000 | 111,500 | 1.75 |
| $CH_2Cl_2$ | 0.085 | 9,700 | 129,000 | 2.20 |
| $CHCl_3$ | 0.040 | 20,500 | 21,900 | 1.45 |
| $CCl_4$ | 0.047 | 17,600 | 15,500 | 1.30 |
| $CH_3CH(Cl)CN$ | 0.037 | 22,300 | 22,400 | 1.35 |
| $CH_3CH(Cl)CN$ | 0.35 | 2,280 | 2,100 | 1.25 |
| $CH_3CH(Cl)COOC_2H_5$ | 0.038 | 21,500 | 20,000 | 1.45 |

TABLE 3-continued

Styrene ATRP, Using Various Initiators in the
Presence of CuCl (1 molar equiv.) and Bpy (3 molar equiv.)[a]

| Initiator | $[In^*]_0$ ($10^3$M) | $M_{n,th}$[b] | $M_{n,SEC}$ | $M_w/M_n$ |
|---|---|---|---|---|
| $CH_3CH(Cl)COOC_2H_5$ | 0.65 | 1,210 | 1,290 | 1.35 |
| $C_6H_5CH_2Cl$ | 0.075 | 11,000 | 10,600 | 1.45 |
| $ClCH_2C_6H_4CH_2Cl$ | 0.12 | 6,890 | 6,600 | 1.45 |

[a]Conversion of the polymerization: 90%–100%
[b]calculated based on eq. 1
In*: Initiator It must be pointed out here that the same conclusions are observed for ATRP of other monomers, such as MA and MMA.

Figure 9:
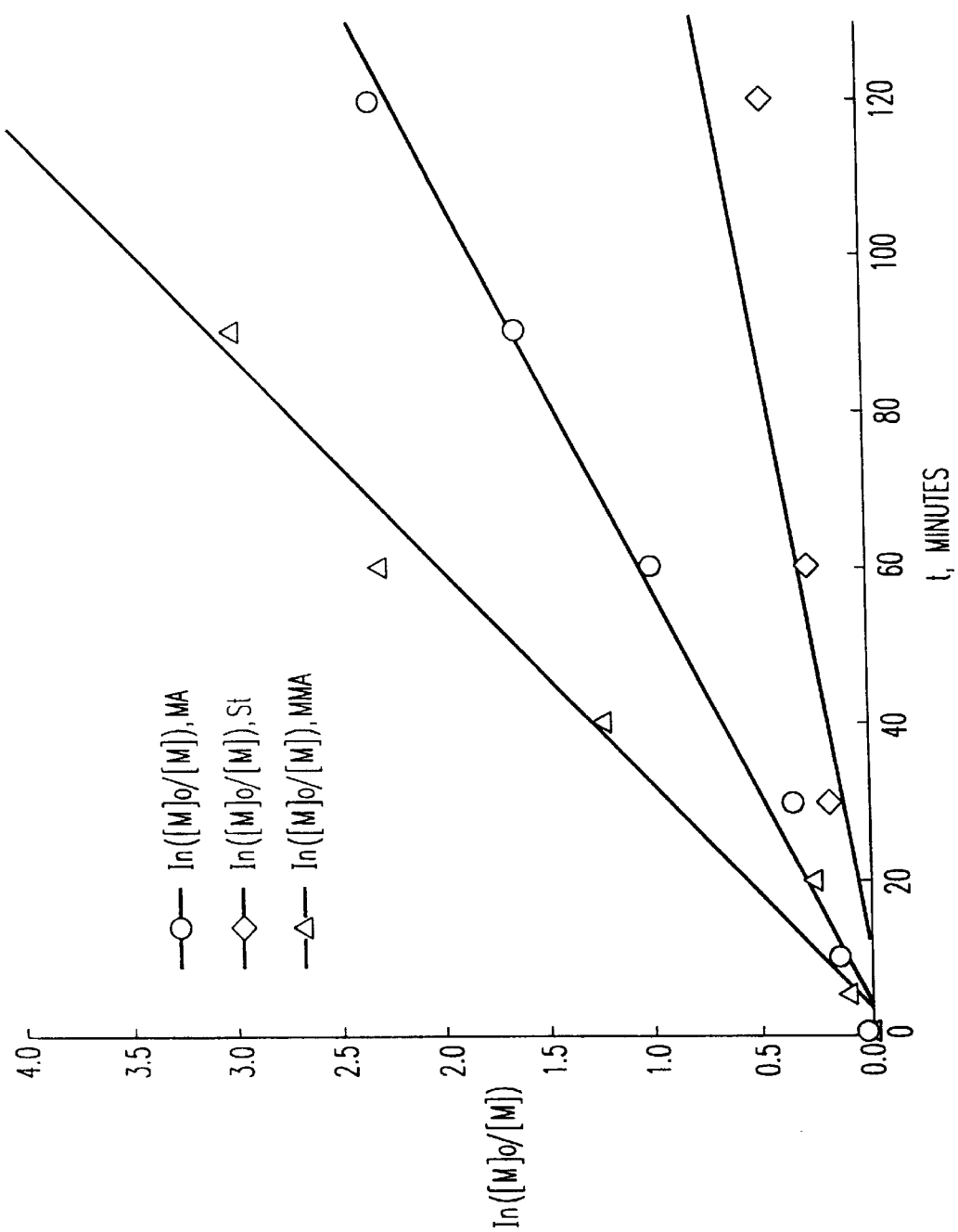
FIG. 9 shows the kinetic plots of the ATRP of three typical monomers (styrene, "St", methyl acrylate, "MA", and methyl methacrylate, "MMA") using the 1/1/3 1-PECl/CuCl/Bpy bulk, at 130° C.)

Effect of the Polymer Structure, $M_n$, and the Polymeric Halide, $M_n$—X', on Atom Transfer Radical Polymerization FIG. 9 illustrates the kinetic plots of the ATRP of three typical monomers, St, MA, and MMA, using the same initiator system 1-PECl/CuCl/Bpy (1/1/3), under the same experimental conditions, in bulk and at 130° C.

The slopes of the straight kinetic plots in FIG. 9 allow the calculation of the apparent propagation rate constants ($k_p^{app}$) in the ATRP of St, MA and MMA. Furthermore, knowing the corresponding thermodynamic parameters, $A_p$ and $E_p$, one can estimate the absolute propagation rate constants at various temperatures, $k_p^*$, and the stationary concentrations of growing radicals, $[P^*]_{st}$, according to equations (5) and (6), respectively:

$$R_p = -d[M]/dt = k_p^* \times [M] \times [P^*]_{st} \quad (2)$$

For each system described herein, $[P^*]_{st}$ can be considered constant. Therefore:

$$-d[M]/dt = k_p^* \times [M] \times [P^*]_{st} = k_p^{app} \times [M] \quad (3)$$

and $$\ln([M]_0/[M]) = k_p^{app} \times t \quad (4)$$

$$\ln(k_p^*) = \ln(A_p) - (E_p/RT) \quad (5)$$

$$[P^*]_{st} = k_p^{app}/k_p^* \quad (6)$$

Table 4 shows the kinetic data and estimated concentrations of growing radicals in bulk ATRP of St, MMA, and MA initiated with 1-PECl/CuCl/Bpy (1/1/3) at 130° C. The concentration of growing radicals decreases in the order $[P_i^*{}_{,MMA}]>[P_i^*{}_{,St}]\approx[P_i^*{}_{,MA}]$.

TABLE 4

Kinetic Data and Estimated Concentration of Growing Radicals [P⁻], for Bulk ATRP of St, MA, and MMA Initiated with 1-PECl/CuCl/Bpy (1/1/3) at 130° C.

| Monomer | MA | MMA | St |
|---|---|---|---|
| [1-PECl]₀ (mol/l) | 0.038 | 0.038 | 0.038 |
| [M]₀ (mol/l) | 11.1 | 9.36 | 8.7 |
| $k_p^-$, 130° C. (10³ mol/l s⁻¹) | 14.1[a] | 3.17[b] | 6.87[c] |
| $k_p^{app}$, 130° C. (10⁻⁴ s⁻¹) | 3.14 | 5.83 | 1.35 |
| [P⁻] (10⁻⁷ M) | 0.22 | 1.84 | 0.19 |

[a] ln $k_{p,MA}$ = 18.42 − (3574/T), see Odlan, G. Principles of Polymerization, Wiley-Interscience, New York, 1991;
[b] ln $k_{p,MMA}$ = 14.685 − (2669/T), see Hutchinson et al, Macromolecules, 1993, 26, 6410;
[c] ln $k_{p,St}$ = 16.786 − (3204/T), see Hutchinson et al, supra.

Effect of the Transfer Atom (Leaving Group), X', on Atom Transfer Radical Polymerization Since the atom transfer process reflects the strength of the bond breaking and bond forming in $M_n$—X', it is expected that the leaving group, X', will strongly affect control of the atom transfer reaction.

From Table 5, it can be noted that ATRP is essentially faster when X is bromine as compared to when X is chlorine. This can be explained by the presence of more growing radicals in the polymerization process when X is bromine as compared to when X is chlorine.

The effect of the leaving group, X, on the living character of the polymerization is also significant. For instance, in MA polymerizations at 100° C. using the same molar ratio of initiator/CuX'/Bpy and the same initiating radical, ethyl propionate, at high monomer conversions (e.g., >50%) the experimental molecular weight, $M_{n,SEC}$, is very close to the theoretical molecular weight, $M_{n,th}$, when X=X'=either Br or Cl. However, at relatively low conversions (e.g., <50%), the discrepancy between $M_{n,SEC}$ and $M_{n,th}$ is much larger when X=X'=Cl ("Cl ATRP") as compared to when X=X'=Br ("Br ATRP") (see FIGS. 10 and 11).

Figure 10:
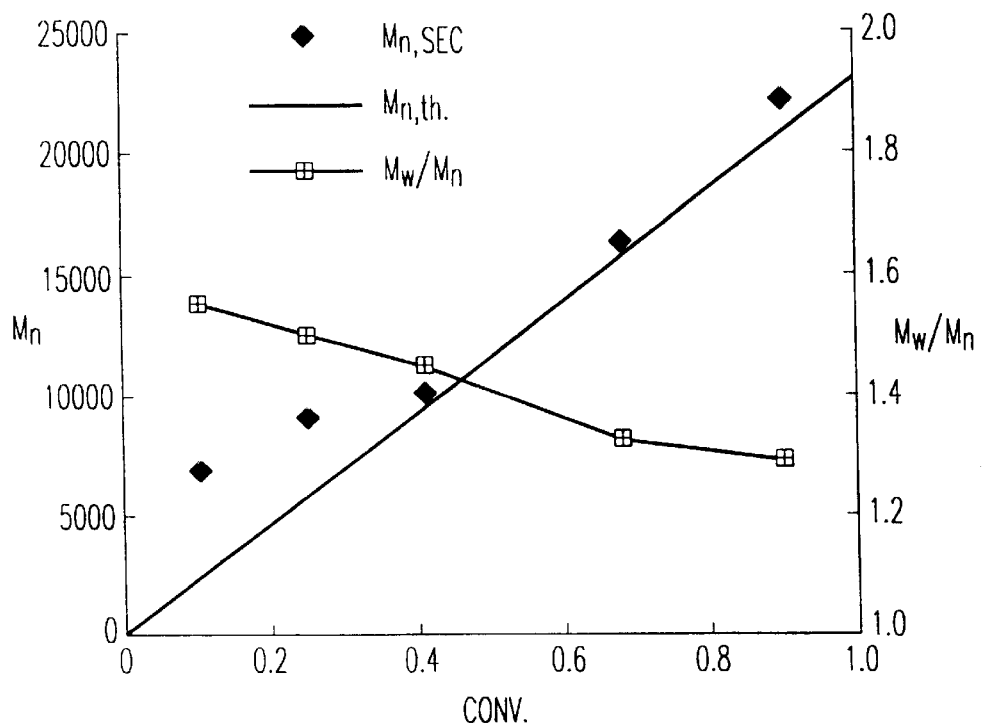
FIGS. 10 and 11 are graphs comparing the experimental molecular weight, $M_{n,SEC}$, with the theoretical molecular weight, $M_{n,th}$, and plotting the polydispersity, $M_w/M_n$, as a function of monomer conversion when X=X'=Cl ("Cl ATRP"
Figure 11:
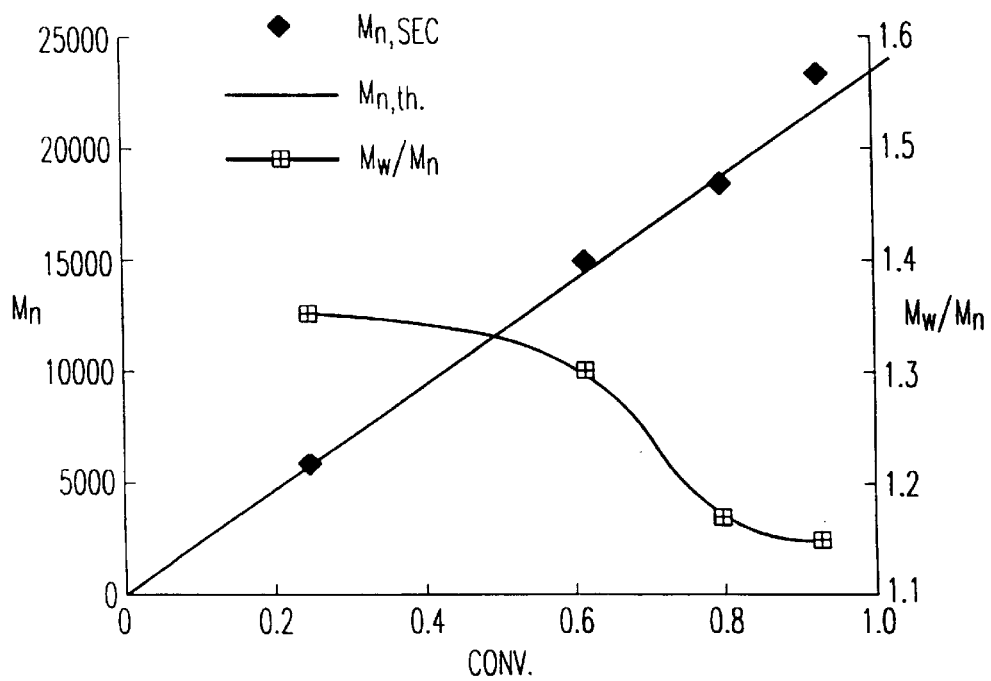

Moreover, the polydispersity of resulting polymers obtained by Cl ATRP is usually larger than the polydispersity obtained by Br ATRP (e.g., an $M_w/M_n$ of 1.15–1.35 vs. 1.30–1.50; see FIGS. 10 and 11).

TABLE 5

The Effect of the Leaving Group, X, on Kinetics of ATRP at Different Temperatures[a]

| Monomer | T, °C. | ATRP | $k_p^{app}$ 10⁻⁵ s⁻¹ | $k_p^-$ 10³ mol/l | [P⁻] 10⁻⁹ mol/l |
|---|---|---|---|---|---|
| MMA | 80 | Cl ATRP | ~1.71 | 1.24 | 13.8 |
|  |  | Br ATRP | ~3.52 | 1.24 | 28.4 |
| MA | 80 | Cl ATRP | b | 4.01 | — |
|  |  | Br ATRP | ~1.28 | 4.01 | 3.19 |
|  | 100 | Cl ATRP | 1.45 | 6.89 | 2.10 |
|  |  | Br ATRP | 3.47 | 6.89 | 5.02 |
| St | 80 | Cl ATRP | b | 2.23 | — |
|  |  | Br ATRP | ~1.45 | 2.23 | 6.50 |

[a] 1-PECl and 1-PEBr were used as initiators for Cl and Br ATRP, respectively, [1-PEX]₀ = 0.1M, and [1-PEX]₀/[CuX]₀/[Bpy]₀ = 1/1/3;
[b] no polymer can be detected in 40 hrs.

Effect of the Concentrations of the Components in Initiator System, R–X/CuX/Bpy, on Atom Transfer Radical Polymerization In order to gain a better understanding of the ATRP mechanism, the effects of the components in the initiator system compositions on the kinetics and the living character of polymerization were investigated.

As discussed in the previous sections, the slope of the kinetic semilogarithmic anamorphoses allows the calculation of apparent rate constant $k_p^{app}$, and thus the external orders in initiator, catalyst, and ligand, can be determined:

$$k_p^{app}=d(ln[M])/dt=k[RX]_0^x \times [CuX]_0^y \times [Bpy]_0^z \qquad (7)$$

and $$\ln(k_p^{app})=\ln(k)+x\ln([RX]_0)+y\ln([CuX]_0)+z\ln([Bpy]_0) \qquad (8)$$

Figure 12A:
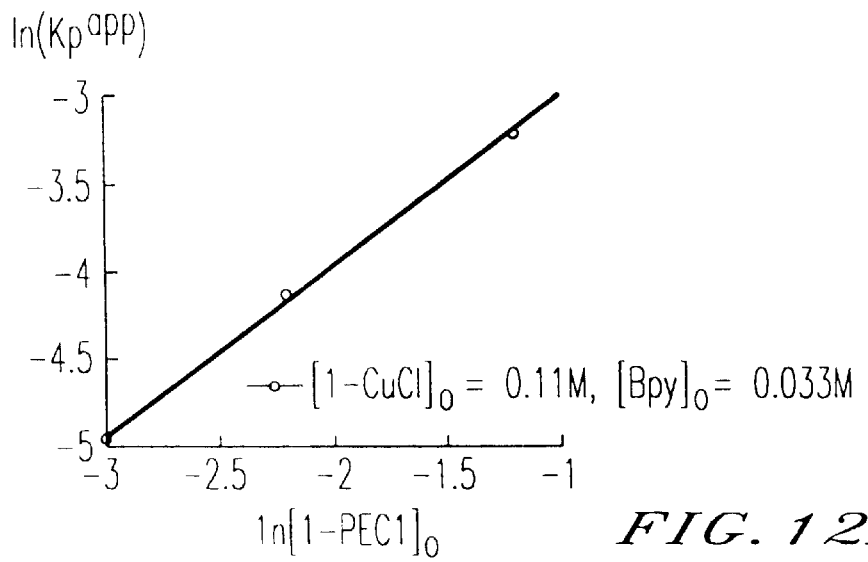
FIGS. 12A–C show plots of $\ln(k_p^{app})$ vs. $\ln([1\text{-PECl}]_0)$, $\ln(k_p^{app})$ vs. $\ln([\text{CuCl}]_0)$, and $\ln(k_p^{app})$ vs $\ln([\text{Bpy}]_0$ for St ATRP in bulk at 130° C.
Figure 12B:
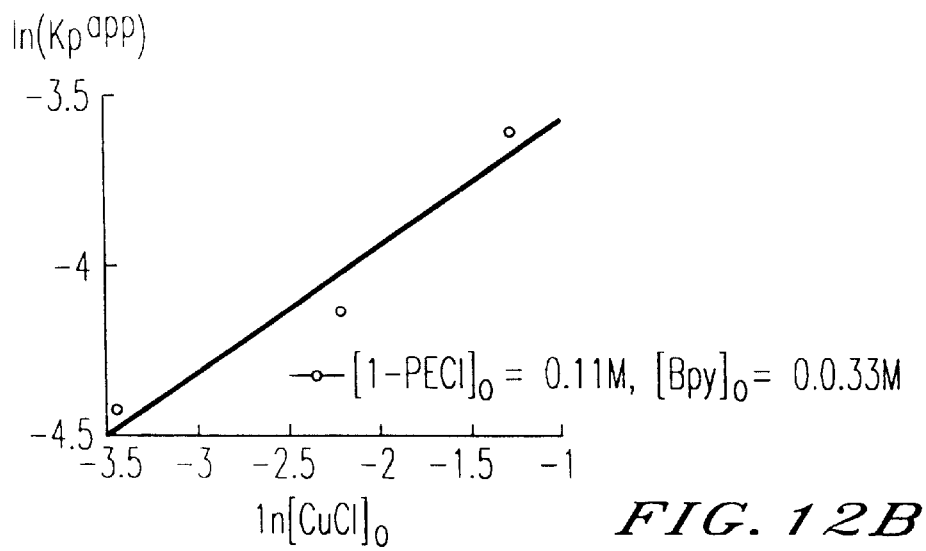
Figure 12C:
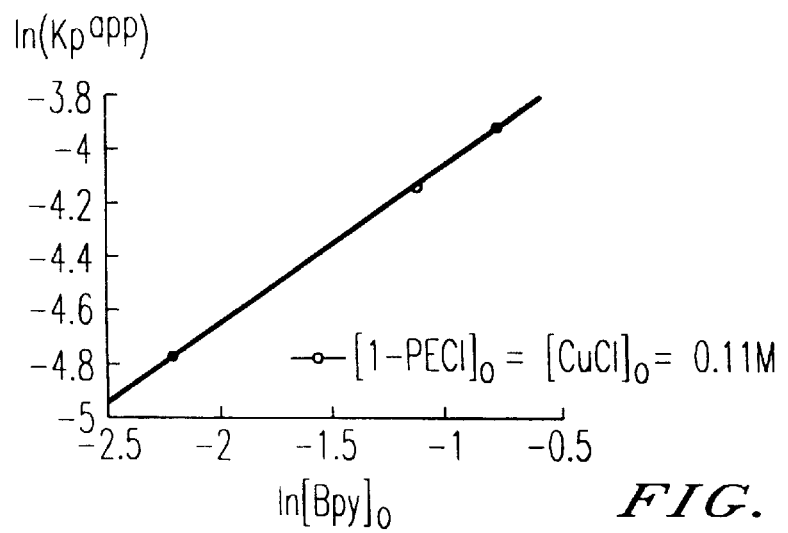

The plots of $\ln(k_p^{app})$ vs. $\ln([1\text{-PECl}]_0)$, $\ln(k_p^{app})$ vs. $\ln([CuCl]_0)$, and $\ln(k_p^{app})$ vs $\ln([Bpy]_0$ for St ATRP in bulk at 130° C. are given in FIGS. 12A–C. The fraction orders observed in these graphs are approximately 1, 0.4, and 0.6 for $[1\text{-PECl}]_0$, $[CuCl]_0$, and $[Bpy]_0$, respectively. The first order of $k_a^{app}$ in initiator, $[1\text{-PECl}]_0$, is expected. However, since the systems studied were heterogenous, it is difficult to give precise physical meanings for 0.4 and 0.6 orders in $[CuCl]_0$ and $[Bpy]_0$, respectively.

Figure 5:
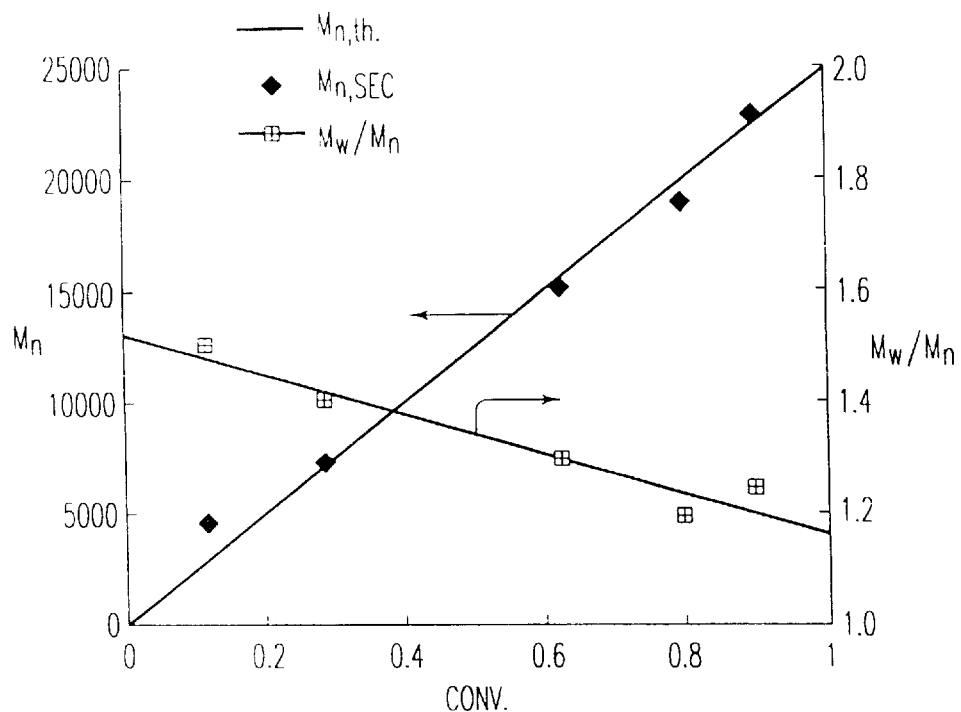
FIG. 5 is a graph showing that the experimental molecular weight, $M_{n,SEC}$, matches the theoretical molecular weight, $M_{n,th}$, and plotting the polydispersity, $M_w/M_n$, as a function of monomer conversion.
Figure 13A:
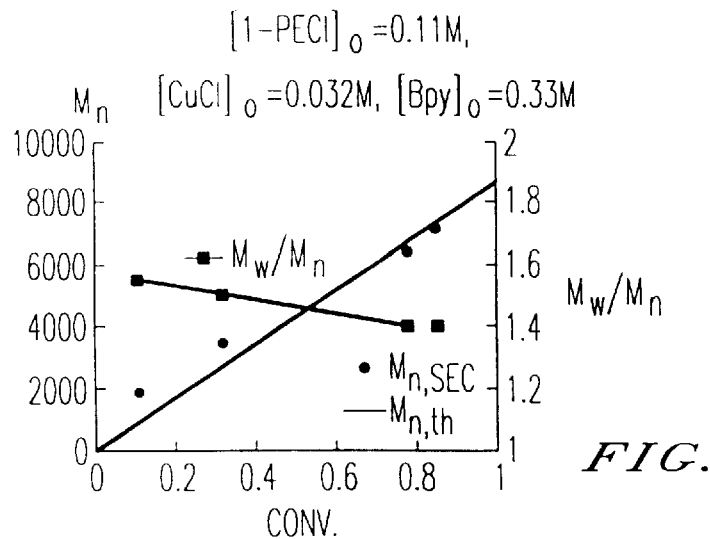
FIGS. 13A–C are graphs showing the effects of $[\text{CuCl}]_0$ on the initiator efficiency and the molecular weight distribution for St ATRP in bulk at 130° C.
Figure 13B:
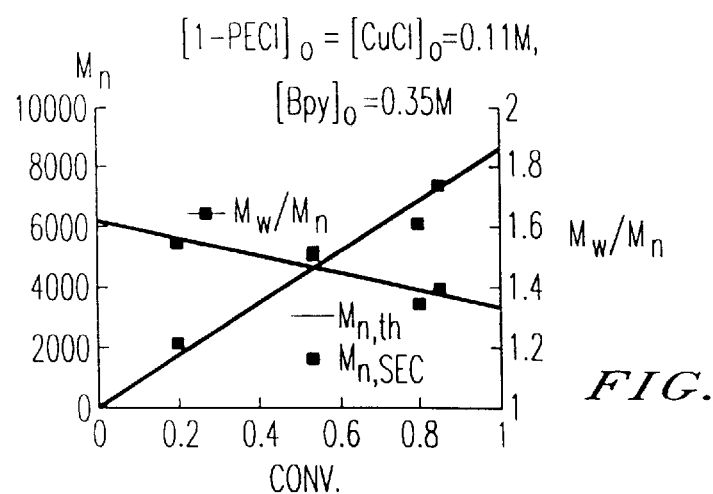
Figure 13C:
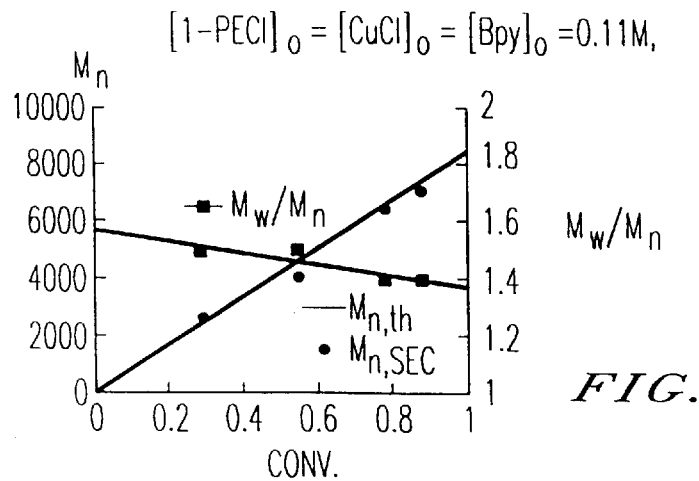
Figure 14A:
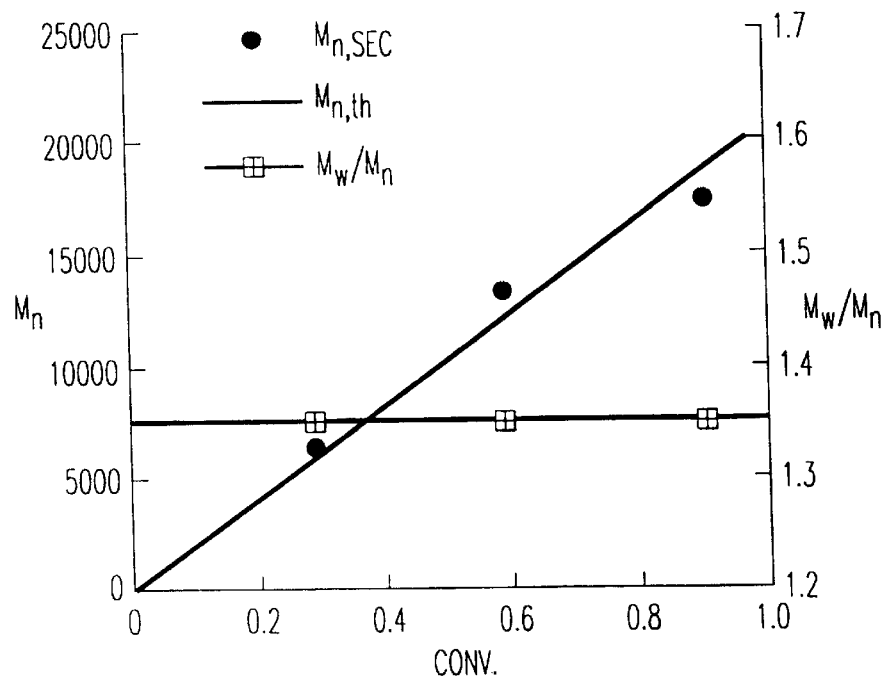
FIGS. 14A–B are graphs demonstrating similar results for MA ATRP.
Figure 14B:
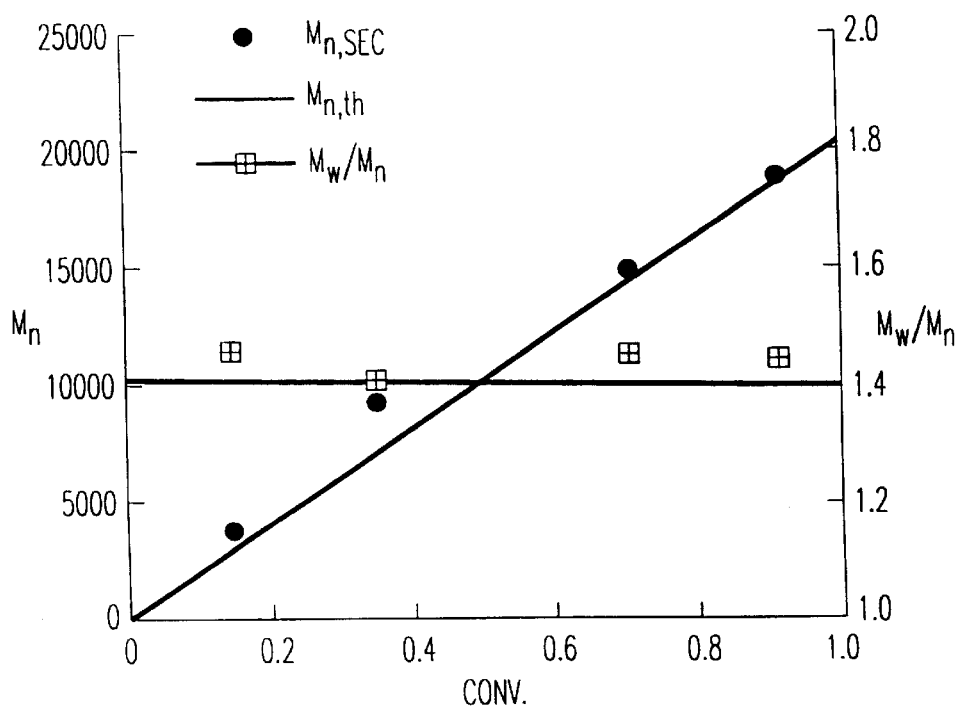

The effects of the compositions of the components in initiator system on the living character of the above-described ATRP of St reveal several important features. As seen from FIG. 13, there appear to be no significant effects of $[CuCl]_0$ on the initiator efficiency and the molecular weight distribution. Indeed, even in the presence of 0.3 molar equiv. of CuCl relative to 1-PECl, the experimental molecular weight, $M_{n,SEC}$, still linearly increases with monomer conversion and is close to the theoretical molecular weight obtained by means of eq. 1 (FIG. 13A). The similar results are also found for MA (FIGS. 5 and 14). These findings suggest that in ATRP, the CuX acts as a catalyst and the addition of catalytic amount of CuX complexed by Bpy is sufficient to promote a controlled ATRP, even in these heterogeneous systems.

Transition Metal Catalyzed-Atom Transfer Radical Addition and Transition Metal Catalyzed-Atom Transfer Radical Polymerization As described above, atom transfer radical polymerization, ATRP, can be considered as a succession of consecutive atom transfer radical additions, ATRA's. The prerequisite for a successful transformation of transition metal catalyzed-ATRA to transition metal catalyzed-ATRP is that a number of polymeric halides, $M_n$—X, can be effectively activated by $M_t^n$ (FIG. 2). Present work demonstrates that a Cu(I)/Cu(II)-based redox process in the presence of Bpy can achieve that goal.

Figure 1:
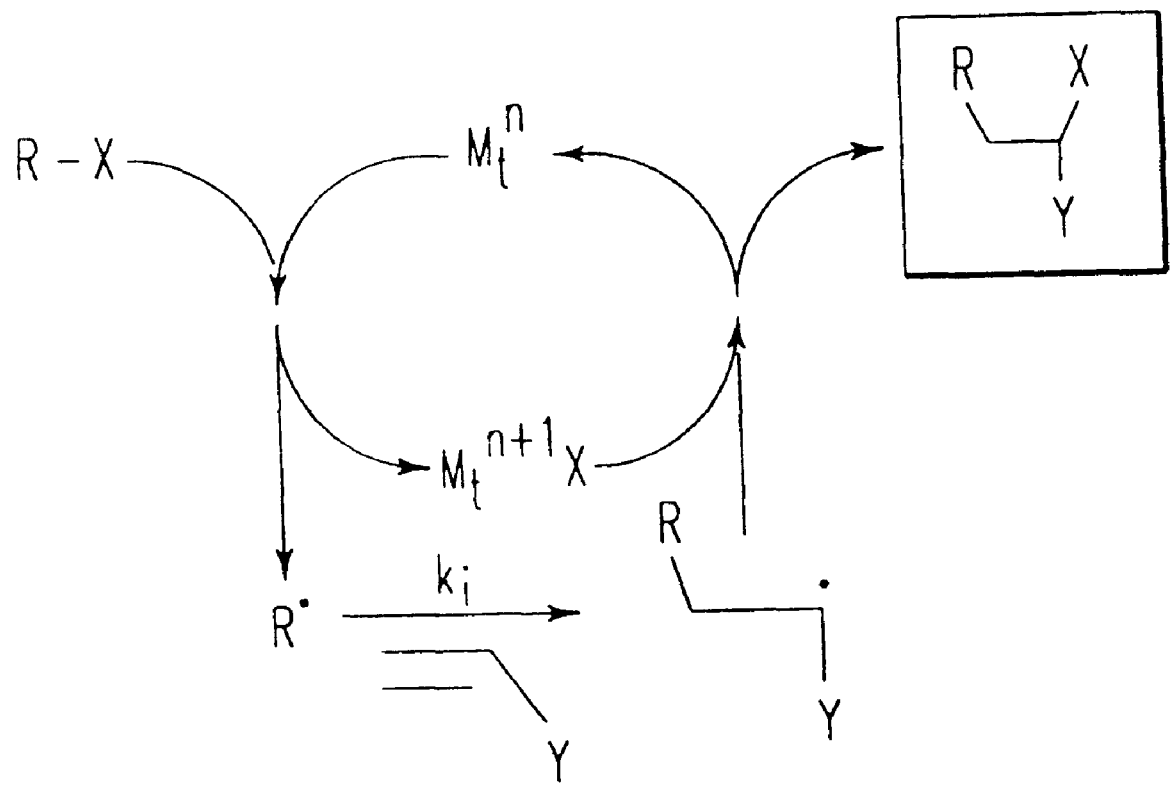
FIG. 1 shows an atom transfer method in which a catalytic amount of transition metal catalyst acts as a carrier of the halogen atom in a redox process.

Indeed, to prevent possible polymerization and to obtain the monomeric adduct, R—M—X, in good to excellent yields in the ATRA process, organic chemists often use either (1) activated organic halogens as radical sources, (2) terminal alkenes without resonance-stabilizing substituents or (3) both activated organic halogens as radical sources and terminal alkenes without resonance-stabilizing substituents (see (a) Bellus, D. *Pure & Appl. Chem.* 1985, 57, 1827; (b) Nagashima, H.; Ozaki, N.; Ishii, M.; Seki, K.; Washiyama, M.; Itoh, K. *J. Org. Chem.* 1993, 58, 464; (c) Udding, J. H.; Tuijp, K. J. M.; van Zanden, M. N. A.; Hiemstra, H.; Speckamp, W. N. *J. Org. Chem.* 1994, 59, 1993; (c) Seijas et al, *Tetrahedron*, 1992, 48(9), 1637; (d) Nagashima, H.; Wakamatsu, H.; Ozaki, N.; Ishii, T.; Watanabe, M.; Tajima, T.; Itoh, K. *J. Org. Chem.* 1992, 57, 1682; (e) Hayes, T. K.; Villani, R.; Weinreb, S. M. *J. Am. Chem. Soc.* 1988, 110, 5533; (f) Hirao et al, *Syn. Lett.,* 1990, 217; and (g) Hirao et al, *J. Synth. Org. Chem.* (Japan), 1994, 52(3), 197; (h) Iqbal, J; Bhatia, B.; Nayyar, N. K. *Chem. Rev.,* 94, 519 (1994)). Under such conditions, the further generation of free radicals, R—M*, is kinetically less favorable, since R—M—X is much less reactive than R—Y towards the transition metal species, $M_t^n$ (FIG. 1).

From the results described herein, the following parameters appear to be important to promote the successful transformation of ATRA to ATRP. First, the use of suitable ligands (e.g., Bpy, $P(OEt)_3$) increases the solubility of the transition metal compound (e.g., CuX) by coordination, can facilitate the abstraction of a halogen atom from the initiator, and more importantly, can facilitate abstraction of the transfer atom or group from the dormant polymeric halide, R—$M_n$—X, with the formation of initiating and growing radicals (FIG. 2). Secondly, as demonstrated in Table 3, the presence of either inductive or resonance stabilizing substituents in the initiator are beneficial for generating initiating radicals, R*, in growing PSt and PMMA chains. Finally, in practice, the use of a high polymerization temperature is beneficial, particularly for Cl ATRP (Table 5). In fact, many ATRA processes also appear to use rather high temperatures.

Prior to the present invention, $RuCl_2(PPh_3)_3$ was known to promote only the monomeric addition of $CCl_4$ to alkenes. Very recently, it was reported that $RuCl_2(PPh_3)_3$ induced the controlled radical polymerization of MMA at 60° C. in the presence of methylaluminum bis(2,4-di-tert-butylphenoxide) (Sawamoto et al, *Macromolecules,* 1995, 28, 1721). However, the present inventors observed that at high polymerization temperatures (e.g., 130° C., a number of radically polymerizable monomers undergo ATRP in the absence of methylaluminum bis(2,4-di-tert-butylphenoxide) or other such activators. As a result, one may increase polymerization temperature (rather than include methylaluminum bis(2,4-di-tert-butylphenoxide) or other activator) as a means to enhance the reactivity of less reactive monomeric or polymeric halides towards transition metal species with the formation of propagation radicals. Indeed, it is possible that an activator may lead to a change in the polymerization mechanism.

Radical Addition vs Coordination Insertion

Regarding the mechanism of ATRP, the important question to be answered is whether the ATRP really involves radical intermediates during polymerization.

The generation of radical intermediates by reacting some transition metal species, including salts and/or complexes of copper, ruthenium, iron, vanadium, niobium, and others, with alkyl halides, R—X, is well documented (see (a) Bellus, D. *Pure & Appl. Chem.* 1985, 57, 1827; (b) Nagashima, H.; Ozaki, N.; Ishii, M.; Seki, K.; Washiyama, M.; Itoh, K. *J. Org. Chem.* 1993, 58, 464; (c) Udding, J. H.; Tuijp, K. J. M.; van Zanden, M. N. A.; Hiemstra, H.; Speckamp, W. N. *J. Org. Chem.* 1994, 59, 1993; (c) Seijas et al, *Tetrahedron,* 1992, 48(9), 1637; (d) Nagashima, H.; Wakamatsu, H.; Ozaki, N.; Ishii, T.; Watanabe, M.; Tajima, T.; Itoh, K. *J. Org. Chem.* 1992, 57, 1682; (e) Hayes, T. K.; Villani, R.; Weinreb, S. M. *J. Am. Chem. Soc.* 1988, 110, 5533; (f) Hirao et al, *Syn. Lett.,* 1990, 217; and (g) Hirao et al, *J. Synth. Org. Chem. (Japan),* 1994, 52(3), 197; (h) Iqbal, J; Bhatia, B.; Nayyar, N. K. *Chem. Rev.,* 94, 519 (1994); and Kochi, J. K., *Organometallic Mechanisms and Catalysis,* Academic Press, New York, 1978, and references cited therein). Moreover, it is also known that R—X/transition metal species-based redox initiators, such as $Mo(CO)_6$/$CHCl_3$, $Cr(CO)_6/CCl_4$, $Co_4(CO)_{12}/CCl_4$, and $Ni[P(OPh)_3]_4/CCl_4$, promote radical polymerization (see Bamford, *Comprehensive Polymer Science,* Allen, G., Aggarwal, S. L., Russo, S., eds., Pergamon: Oxford, 1991, vol. 3, p. 123). The participation of free radicals in these redox initiator-promoted polymerizations was supported by end-group analysis and direct observation of radicals by ESR spectroscopy (see Bamford, *Proc. Roy. Soc.,* 1972, A, 326, 431).

However, different transition metal species may act in a different manner. They may induce an atom transfer reaction or provide a source of metal-complexed radicals or even initiate a catalytic cycle that does not involve radical intermediates (Curran et al, *J. Org. Chem.* and *J. Am. Chem. Soc.,* supra).

Figure 15:
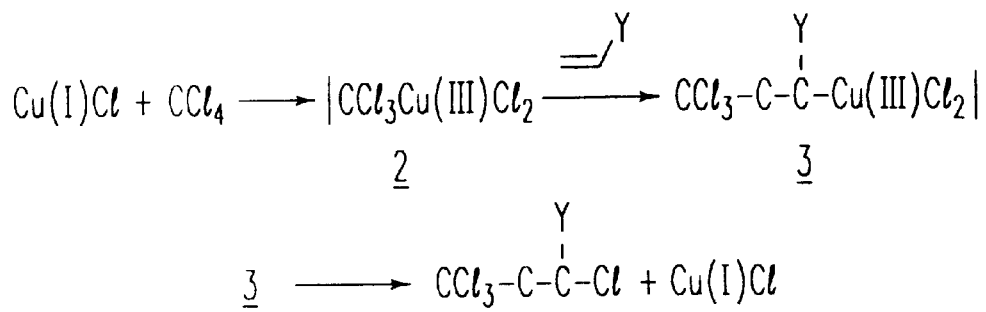
FIG. 15 is a scheme showing an overall two-electron change in which Cu(I)Cl cleaves a carbon-halogen bond to generate a Cu(III) species, followed by insertion of the alkene into the carbon-copper(III) σ-bond and halogen ligand transfer (reductive elimination)

In fact, several examples using additives such as CuX, a catalyst suitable for the present invention, reported previously showed that the reactions between some polyhaloalkanes, e.g., $CCl_4$, and alkenes exceptionally lead to exclusive 1:1 adducts in many cases (Bellus, supra). The authors argued that, if radical addition were the case, a considerable amount of telomer formation would be expected even at high organic polyhalide/alkene ratios. Thus, they questioned whether Cu(I)Cl cleaves the carbon-halogen bond by an atom transfer process to generate a carbon radical and a Cu(II) species (FIG. 2) or by an overall two-electron change to generate a Cu(III) species 2 (FIG. 15), followed by insertion of the alkene into the carbon-copper(III) σ-bond and halogen ligand transfer (reductive elimination) with a new Cu(III) species 3 formed.

In sharp contrast to previous observations, the present invention shows that the polymerization of alkenes occurs when halide initiators, including $CCl_4$, are used with CuX complexed by Bpy as a catalyst. The uncompleted CuX species may not be powerful enough to abstract the halogen atom from the 1:1 monomeric adduct to promote atom transfer radical polymerization. As described below, the polymerization of St initiated with 1-PECl/CuCl without ligand is an ill-controlled, thermally self-initiated polymerization.

Figure 16A:
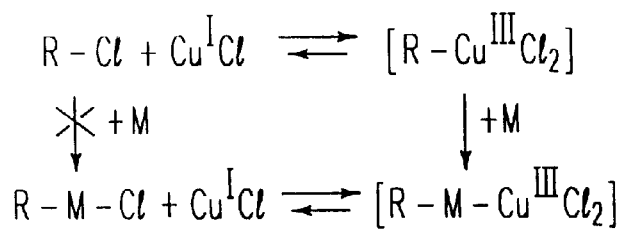
FIG. 16 shows a putative insertion process.
Figure 16B:
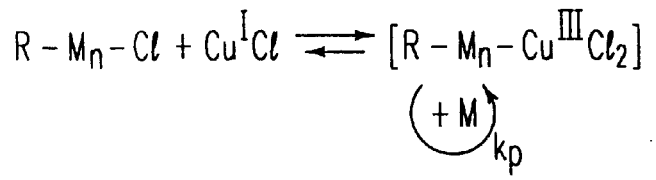
Figure 17A:
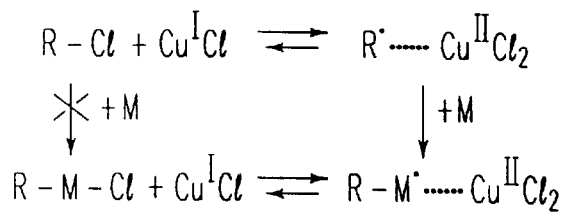
FIG. 17 shows a putative process involving metal coordinated radicals.
Figure 17B:
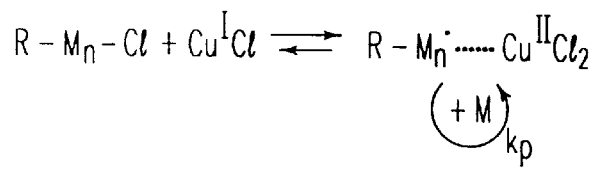

Moreover, the similarities in stereochemistry of the polymerizations of MMA initiated with classic radical initiators and various initiator/CuX/Bpy systems (Table 2) suggests that a putative insertion process (FIG. 16) can be rejected. Although metal coordinated radicals (FIG. 17) may be involved in the polymerizations of alkenes initiated with the R—X/CuX/Bpy system, a simple radical process is most probable (FIG. 2). The participation of the free radical intermediates is also supported by the observation that addition of 1.5 molar equiv. of galvinoxyl (relative to 1-PECl) effectively inhibits polymerization, and no styrene polymerization was initiated with 1-PECl/CuCl/Bpy (1/1/3) within 18 hours. Further evidence for the presence of radical intermediated in ATRP is the fact that the monomer reactivity ratios for ATRP random copolymerization resembles the monomer reactivity ratios for classical radical polymerization processes (i.e., $r_{MMA}=0.46/r_{St}=0.48$ for ATRP at 100° C. initiated with 2-EiBBr/CuBr/Bpy, and $r_{MMA}=0.46/r_{St}=0.52$ for radical polymerization initiated with BPO at 60° C.).

Atom Transfer Radical Polymerization vs. Redox Radical Telomerization

It is well known that radical telomerization can be initiated by a transition metal species-based redox catalyst. The mechanism is generally described as shown below:

Scheme 2

Initation:

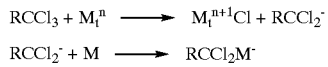

Propagation:

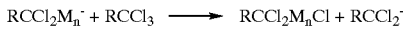

Chain Transfer:

$RCCl_2M_n^- + RCCl_3 \longrightarrow RCCl_2M_nCl + RCCl_2^-$

Termination:

The fundamental differences between ATRP and redox radical telomerization are as follows. In ATRP, the polymeric halides, R—$M_n$—X, behave as dormant species (FIG. 2). They can be repeatedly activated by transition metal species, $M_t^n$, to form the growing radicals, R—$M_n$*, and oxidized transition metal species, $M_t^{n+1}$, which can further react with R–$M_n$* to regenerate R—$M_n$—X and $M_t^n$, i.e., a reversible transfer process.

Contrary to ATRP, redox radical telomerization represents a degradative transfer process, in which the resulting polymeric halides, R—$M_n$—X, are dead chains (see Scheme 2 above). Consequently, the molecular weight obtained in redox radical telomerization does not increase with the monomer conversion, whereas the molecular weight increases linearly with increasing monomer conversion in ATRP.

Factors Affecting Atom Transfer Radical Polymerization (a) "Living"/Controlled Radical Polymerization To better describe controlled ATRP, a discussion of some general properties for "living"/controlled radical polymerization is in order.

Free radicals, which are the growing species in radical polymerization, are highly reactive species. Unlike anions or cations, they recombine and/or disproportionate at rates approaching the diffusion controlled limit (i.e., $k_t$ of about $10^{8-10}$ $M^{-1}$*$sec^{-1}$), which is much higher than the corresponding propagating rate constant (i.e., $k_p \sim 10^{2-4}$ $M^{-1}$*$sec^{-1}$). Moreover, initiation is incomplete due to slow decomposition of classic radical initiator (i.e., $k_d \sim 10^{-4--6}$ $sec^{-1}$). These are the kinetic reasons why classic radical polymerization yields ill-defined polymers with unpredictable molecular weight, broad molecular weight distribution, and uncontrolled structures.

Moreover, due to the same kinetic reasons, it is impossible to entirely suppress the termination reactions and to obtain a living radical polymerization, in which chain breaking (termination) reactions are absent (Szwarc, Nature, 1956, 176, 1168). Thus, for the sake of the accuracy, we propose the term controlled or "living" radical polymerization to describe the processes in which the side reactions are not significant. Consequently, structural parameters, such as molecular dimension, molecular weight distribution, composition, topology, functionality, etc., can be controlled to some extent.

The preparation of controlled polymers in a "living" radical process requires a low stationary concentration of growing radicals, $M_n$*, which are in a fast dynamic equilibrium with the dormant species, $M_n$–D:

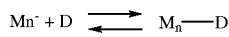

Termination is second order and propagation is first order in respect to growing radicals (eqs. (12) and (13)):

$$R_p = d(ln[M])/dt = k_p[M] \times [P^*] \quad (12)$$

$$R_t = -d[P^*]/dt = k_t \times [P^*]^2 \quad (13)$$

At low concentration of free radicals, the proportion of termination versus propagation is reduced. If the reversible exchange between growing radicals, $M_n$*, and dormant species, $M_n$–D, is fast, the polymerization degree can be predetermined by the ratio of the concentration of the consumed monomer to that of the dormant chains (eq. 14), and the molecular weight distribution may remain narrow.

$$DP_n = \Delta[M]/[M_n-D] = \Delta[M]/[I]_0 \quad (14)$$

Recent progress in controlled radical polymerization can be indeed related to the approach illustrated in the $M_n$–D reaction above, in which growing radicals, $M_n$*, react reversibly with species D, which may be carbon-, sulfur-, and oxygen-centered radicals (Otsu et al, Makromol. Chem, Rapid Commun., 1982, 127; Otsu at al, Macromolecules, 1992, 25, 5554; Bledzki et al, Makromol. Chem, 1983, 184, 745; Druliner, Macromolecules, 1991, 24, 6079; U.S. Pat. No. 4,581,429; and Georges et al, Macromolecules, 1993, 26, 2987), alkylaluminum complexes (Mardare et al, Macromolecules, 1994, 27, 645), and organocobalt porphyrin complexes (Wayland, B. B., Pszmik, G., Mukerjee, S. L., Fryd, M. J. Am. Chem. Soc., 1994, 116, 7943), in a reversible deactivated process. Another approach (discovered by the present inventors) is based on using alkyl iodides in a degenerative transfer.

The Significance of the Presence of the Low Concentration of Growing Radicals in Maintaining "Living" ATRP Since ATRP promoted by the Cu(I)/Cu(II) redox process resembles classic radical polymerization, termination reactions can not completely eliminated, which are second order in respect to growing radicals (eq. 13). As already discussed in the preceding section, if the concentration of growing radicals is kept low enough, and a fast and reversible equilibrium between growing radicals and dormant species is established (see Scheme 2 above), the proportion of termination in comparison to propagation can be minimized, resulting in a predictable molecular weight and a narrow molecular weight distribution. Indeed, this is the case for "living" ATRP.

Table 6 lists the estimated polymerization time for 90% monomer conversion, $t_{0.9}$, concentration of the dead polymer chains due to the spontaneous termination reactions at that time, $[P]_{d,0.9}$, concentration of the polymer chains due to self-initiation, $[P]_{self,0.9}$, and percentage of uncontrolled polymer chains generated by side reactions, "UC", in bulk ATRP of St, MMA, and MA initiated with 1-PECl/CuCl/Bpy at 130° C.:

$$ln([M]_0/[M]) = ln(10) = k_p^{app} \times t_{0.9} \quad (15)$$

$$[P]_{t,0.9} = R_t \times t_{0.9} \quad (16)$$

$$[P]_{self,0.9} = R_{i,self} \times t_{0.9} \quad (17)$$

$$"UC" = ([P]_{self,0.9} + [P]_{d,0.9})/\{[R-X]_0 + [P]_{self,0.9} + [P]_{d,0.9}\} \quad (18)$$

TABLE 6

Estimated [P⁻], $t_{0.9}$, $[P]_{self,0.9}$, $[P]_{d,0.9}$, and "UC" for Bulk ATRP of St, MMA and MA Initiated with 1-PECl/CuCl/Bpy (1/1/3) at 130° C.

| Monomer | MA | MMA | St |
|---|---|---|---|
| $[1\text{-PECl}]_0$ (mol/l) | 0.038 | 0.038 | 0.038 |
| $[M]_0$ (mol/l) | 11.1 | 9.36 | 8.7 |
| $k_{p^-,130°C}$ (M s$^{-1}$)$^a$ | 14,100 | 3170 | 6870 |
| $k_{t,130°C}$ (10$^7$ s$^{-1}$)$^b$ | 1.98 | 0.31 | 0.532 |
| $k_p^{app}{}_{,130°C}$ (10$^{-4}$ s$^{-1}$) | 3.14 | 5.83 | 1.35 |
| $[P^-]$ (10$^{-7}$M)$^a$ | 0.22 | 1.84 | 0.19 |
| $t_{0,90}$ (s$^{-1}$) | 7300 | 4000 | 17100 |
| $[P]_{d,0.90}$ (10$^{-4}$ mol/l) | 0.7 | 4.20 | 1.22 |
| $[P]_{self,0.90}$ (10$^{-3}$ mol/l) | — | — | 1.7 |
| "UC", % | 0.2 | 1.1 | 4.5 |

$^a$see Table 4;
$^b$Data from Odlan, G. Principles of Polymerization, Wiley-Interscience, John Wiley & Sons, New York, 1991;
ln $k_{t,MA}$ = 23.43 − (2671/T),
ln $k_{t,MMA}$ = 18.5 − (1432/T),
ln $k_{t,St}$ = 17.47 − (962/T).

As shown in Table 6, at 90% monomer conversion, the concentrations of uncontrolled polymer chains, "UC", are all less than 3% in ATRP's of St, MMA, and MA, when 1-PECl/CuCi/Bpy (1/1/3) is used as the initiator system at 130° C. This may be why ATRP proceeds in a "living" manner. Although the termination rate constant is larger in MA radical polymerization than in the or the two processes, ATRP of MA in better controlled than ATRPs of St and MMA. This appears to be due to a lower concentration of growing radicals in the ATRP of MA (Table 6).

The Significance of the Presence of Fast Exchange Between R-$M_n$-X and R-$M_n^*$ in Inducing Low Polydispersity in ATRP At a low concentration of radicals (Tables 4–6), ca. 10$^{-7}$ to about 10$^{-8}$ mol/l, polymers with very high and uncontrolled molecular weights are usually found. To cope with this problem, a reversible equilibrium between a minute amount of growing, radicals and a large amount of the dormant species needs to be established. Moreover, only if both (1) the initiation n reaction between initiating radicals and monomer and (2) the exchange reaction between the growing radicals and the dormant species are faster than (3) the propagation reaction between the growing radicals and the monomer, the molecular weight of the resulting polymers can be predicted by eq. (14), and low polydispersity polymers can be obtained.

Moreover, in a so-called "living" system with reversible dynamic exchange, there is evidence that the polydispersity of the resulting polymers largely depends on the ratio of the deactivation rate to the propagation rate (Matyjaszewski, K. Polym. Prep. (Am. Chem. Soc. Polym. Chem. Div.), 1995, 36(1), 541). On the other hand, it has been demonstrated that many transition metal species can be used as efficient retarders or inhibitors in radical polymerization (Bamford, Comprehensive Polymer Science, Allen, G., Aggarwal, S. L., Russo, S., eds., Pergamon: Oxford, 1991, p. 1). For example, the reaction rate constants between (1) PSt* and CuCl$_2$ and (2) PMMA* radicals and CuCl$_2$ are 10$^4$ and 10$^3$ times greater in comparison with the corresponding propagation rate constants, respectively. Therefore, the existence of a fast deactivation (scavenging) reaction can explain the low polydispersity obtained in ATRP.

Earlier, Otsu et al reported that an R—Cl/Ni(0) combined initiator system can induce a "living" radical polymerization of St and MMA at 60° C. (Chem. Express, 1990, 5(10), 801). However, the "living" character of the R—Cl/Ni(0) combined initiator of Otsu et al may not be entirely accurate, since (1) the molecular weight of the obtained polymers did not increase linearly with respect to monomer conversion, (2) the initiator efficiency is low (about 1% based on R—Cl), and (3) the molecular weight distribution is broad and bimodal. The same phenomena were also observed by the present inventors. Thus, it appears that the R—Cl/Ni(0) combined initiator of Otsu et al does not provide controlled polymers.

Based on the published evidence, the R—Cl/Ni(0) combined initiator of Otsu et al appears to act as a conventional redox initiator, similar to the initiators developed by Bamford (see Reactivity, Mechanism and Structure in Polymer Chemistry, Jenkins, A. D. and Ledwith, A., eds, John Wiley & Sons, London (1974), p. 52; and Comprehensive Polymer Science, Allen, G., Aggarwal, S. L., Russo, S., eds., Pergamon: Oxford, 1991, vol. 3, p. 123). The very low initiator efficiency and a broad, bimodal molecular weight distribution observed in the system of Otsu et al suggests that in that system, the small amount of initiating radicals were generated by a redox reaction between R—Cl and Ni(0), and the reversible deactivation of initiating radicals by oxidized Ni species is inefficient in comparison to propagation. This may support the idea that fast exchange between R—X and R* in transition metal promoted ATRP at the initial step is one of the key factors controlling initiator efficiency and molecular weight distribution.

The Factors Affecting the Concentrations of the Growing Radicals and the Exchange Rate Between R—$M_n$—X and R-$M_n^*$ in ATRP Based on the results shown herein, the factors affecting the concentrations of the growing (initiating) radicals and the exchange rate between R—$M_n$—X (R—X) and R-$M_n^*$ (R*) in ATRP can be qualitatively discussed.

The stationary concentration of growing radicals can be expressed as in eq. (20):

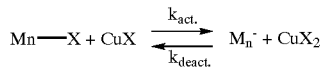

$$K = k_{act.}/k_{deact.} = ([M_n^-] \times [CuX_2])/([M_n\text{—}X] \times [CuX])$$

$$\approx [M_n^-]^2/([R\text{—}X]_0 \times [CuX]_0) \tag{19}$$

$$[M_n^-] = \{(k_{act.}/k_{deact.}) \times ([R\text{—}X]_0 \times [CuX]_0)\}^{1/2} \tag{20}$$

An increase in $[R—X]_0$ and $[CuX]_0$ results in an increase in the concentration of growing radicals, and subsequently, in the polymerization rate (FIG. 12).

As also seen from eq. (20), the concentration of growing (initiating) radicals is proportional and inversely proportional to the activation and deactivation rate constants, respectively, which strongly depend on the structure of the $R^{11}R^{12}R^{13}C$ group in the initiator, the structure of the repeating monomer units M in R—$M_n$—X, the leaving group X, and the polymerization temperature (see Tables 3, 4 and 5, FIG. 9).

In terms of polarity, the deactivation reaction between PMA* and CuCl$_2$ is usually 10 times slower than that between Pst* and CuCl$_2$ (i.e., $k_{deact.PSt^*/CuCl2} > k_{deact.PMA^*/CuCl2}$) (see Bamford, Comprehensive Polymer Science, Allen, G., Aggarwal, S. L., Russo, S., eds., Pergamon: Oxford, 1991, p. 1). Thus, the similar concentration of radicals found in the ATRP of St relative to the ATRP of MA indicates that the activation reaction between CuCl and PSt-Cl is faster than the one between PMA-Cl and CuCl (i.e., $k_{act.PSt-Cl} > k_{act.PMA-Cl}$). This is in good agreement with the lower bond dissociation energy in PSt-Cl as compared to PMA-Cl (see Danen, W. C., in *Methods in Free Radical Chemistry*, Huyser, E. L. S., ed., Dekker, N.Y., 1974, vol. 5, p.1; and Poutsma, supra). The higher concentration of growing radicals found in the ATRP of MMA as compared to the ATRP's of St and MA (see Table 4) implies that steric hindrance in both the polymeric halide PMMA-Cl and growing radical PMMA* may significantly affect deactivation and activation rates.

As noted in FIGS. 10 and 11, the polymerization is much faster in the Br-ATRP of MA than in the Cl-ATRP of MA, due to a higher stationary concentration of radicals in the former system as compared to the latter one. However, the polydispersity is much narrower in Br ATRP than in Cl-ATRP. According to the discussion in the preceding section, this suggests that deactivation of free radicals with $CuBr_2$ is faster in comparison to deactivation of free radicals with $CuCl_2$. Since the concentration of growing radicals in Br-ATRP is larger than in Cl-ATRP (see Table 5), the activation of PMA-Br by Br-containing Cu(I) species must be faster than the activation of PMA-Cl by Cl-containing Cu(I) species. This is also in accordance with the fact that the ease of the abstraction of X from R—X by CuX follows the order Br>Cl (i.e., the lower the bond dissociation energy in R—X, the easier to abstract an X atom; see Curran, Synthesis, in *Free Radicals in Synthesis and Biology*, and in *Comprehensive Organic synthesis*; Danen: and Poutsma, all supra).

Halogen Atom Transfer (Abstraction) vs. Outer-Sphere Electron Transfer

Figure 18A:
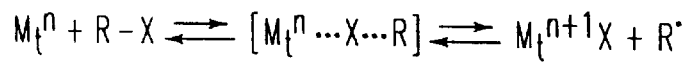
FIGS. 18A and 18B show two different mechanisms for the generation of free radicals by reacting an organic halide with a transition metal compound, involving either halogen atom transfer (FIG. 18A) or outer-sphere electron transfer (FIG. 18B).
Figure 18B:
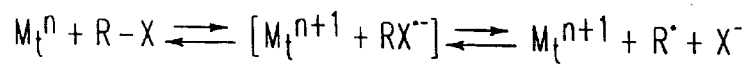

The generation of free radicals by reacting an organic halide with a transition metal compound may involve two different mechanisms: either halogen atom transfer (FIG. 18A) or outer-sphere electron transfer (FIG. 18B). The former process depends on the carbon-halogen bond dissociation energy, whereas the latter is a function of the electrode potential for the reaction of the organic halide (i.e., $RX + e^- \rightarrow R^* + X^*$).

The outer sphere electron transfer process is usually less sensitive than halogen atom transfer to the leaving atom X in R—X and to temperature (Howes et al, *Inorg. Chem.* 1988, 27, 3147; and references therein). As discussed before, the results presented herein show that transition metal-mediated ATRP has a strong dependence on the leaving group X in R—X, as well as on the reaction temperature. Thus, the results herein suggest that ATRP involves a direct atom transfer process.

Alternatively, the reversible conversion of the radicals $R^*$ and $R—M_n^*$ to organic halides R—X and $R—M_n—X$ may involve direct atom transfer (see Kochi, J. K., *Organometallic Mechanisms and Catalysis*, Academic Press, New York, 1978, and references cited therein; Asscher, M., Vofsi, D. *J. Chem. Soc., Perkin II.* 1968, 947; and Cohen, H., Meyerstein, D. *Inorg. Chem.* 1974, 13, 2434) or oxidative addition/reductive elimination with the formation of organocopper(III) intermediates (see Kochi, supra; Orochov, A., Asscher, M., Vofsi D. *J. Chem. Soc., Perkin II.* 1973, 1000; and Mitani, M., Kato, L., Koyama, K. *J. Am. Chem. Soc.* 1983, 105, 6719). Generally, it is difficult to distinguish between these two mechanisms. Nevertheless, the organocopper(III) species, if they exist, probably do not react directly with monomer. Otherwise, some effect on tacticity would be observed.

Thus a successful extension of atom transfer radical addition, ATRA, to atom transfer radical polymerization, ATRP has been demonstrated in a Cu(I)/Cu(II) model redox process. The present process opens a new pathway to conduct a "living" or controlled radical polymerization of alkenes. The controlled process found in ATRP results from two important contributions: (1) a low stationary concentration of growing radicals and (2) a fast and reversible equilibrium between the growing radicals and the dormant species. Many parameters, such as the nature of transition metals, the structure and property of ligands, the polymerization conditions, etc, may affect the course of "living" ATRP. On the other hand, it is anticipated that, like other controlled polymerizations, ATRP will provide a powerful tool for producing various tailor-made polymers.

Other features of the present invention will become apparent in the course of the following descriptions of exemplary embodiments which are given for illustration of the invention, and are not intended to be limiting thereof.

EXAMPLES

Example 1

An aralkyl chloride, 1-phenylethyl chloride, 1-PECl, is an efficient initiator, and a transition metal halide, CuCl, complexed by 2,2'-bipyridine, bpy, is an efficient chlorine atom transfer promoter. This model initiating system affords controlled polymers with predicted molecular weight and narrower molecular weight distribution, $M_w/M_n<1.5$, than obtained by conventional free radical polymerization.

Phenylethyl chloride, 1-PECl, was prepared according to a literature procedure (Landini, D.; Rolla, F. *J. Org. Chem.*, 1980, 45, 3527).

A typical polymerization was carried out by heating a reddish brown solution of styrene (St), 1-PECl (0.01 molar equiv. relative to monomer), CuCl (1 molar equiv. relative to 1-PECl), and bpy (3 molar equiv. relative to CuCl), in a glass tube sealed under vacuum at 130° C. (The reddish brown color of a slightly heterogeneous solution was formed within 30 seconds at 130° C.) The formed polymer was then dissolved in THF and precipitated in MeOH (three times), filtered and dried at 60° C. under vacuum for 48 hr. Yield, 95%. A linear increase in the number average molecular weight, $M_{n,SEC}$, versus monomer conversions up to 95% was found for PMA. $M_{n,SEC}$ values were determined by size exclusive chromatography, and were calibrated using polystyrene standards.

The $M_{n,Sec}$ is very close to the theoretical one, $M_{n,th}$, calculated by the following equation (21):

$$M_{n,th.} = ([M]_0/[1\text{-PECl}]_0) \times (MW)_0 \times \text{conversion} \qquad (21)$$

$[M]_0$ and $[1\text{-PECl}]_0$ represent the initial concentrations of monomer (St) and 1-PECl, respectively, and $(MW)_0$ is the molecular weight of monomer. These results indicate that 1-PECl acts as an efficient initiator, and that the number of the chains is constant. The molecular weight distribution is fairly narrow ($M_w/M_n=1.3–1.45$). The linear plot of $\ln([M]_0/[M])$ versus polymerization time (e.g., FIG. 3) implies that the concentration of growing radicals remains constant during propagation, and that termination is not significant. Both of these results suggest a "living" polymerization process with a negligible amount of transfer and termination.

Additionally, a series of experiments has been carried out at 130° C., using various $[M]_0/[1\text{-PECl}]_0$ ratios and a constant $[1\text{-PECl}]_0/[CuCl]_0/[bpy]_0$ ratio of 1:1:3. Similar to FIG. 5, a graph was prepared which compares the $M_{nSEC}$ and calculated $M_{n,th}$, based on equation (21) above.

A linear plot is observed in the molecular weight range from $3.8 \times 10^3$ to $1.05 \times 10^5$ g/mol. The slope of the straight line is 0.93, indicating a high initiator efficiency. The polydispersities of all the polymers obtained also remain low and are smaller than in a conventional radical polymerization i.e., $M_w/M_n<1.5$. These results again support a "living" polymerization process initiated with 1-PECl/CuCl/Bpy system.

Table 7 summarizes the results of styrene polymerization under various experimental conditions. In the absence of 1-PECl, CuCl or bpy, the polymers obtained are ill-controlled with unpredictable molecular weights and with broad molecular weight distributions.

TABLE 7

Results of Styrene Bulk Polymerization at 130° C.

| $[St]_o$ (mmol) | Conv. (%) | $[1\text{-PECl}]_o$ (mmol) | $[CuCl]_o$ (mmol) | $[byp]_o$ (mmol) | $M_{n,th}{}^a$ | $M_{o,SEC}$ | $M_w/M_n$ |
|---|---|---|---|---|---|---|---|
| 4.375 | 15 | 0 | 0 | 0 | 0 | 132,100 | 1.76 |
| 4.375 | 52 | 0 | 0.182 | 0.54 | 0 | 134,700 | 1.95 |
| 4.375 | 40 | 0.0528 | 0.0455 | 0 | 3,400 | 68,700 | 3.10 |
| 4.40 | 45 | 0.0528 | 0 | 0.135 | 4,100 | 76,500 | 2.10 |

$^a$calculated based on eq. 21

Example 2

The same initiating system, 1-PECl/CuCl/Bpy (1/1/3), can be also used for the controlled polymerization of acrylic monomers, such as methyl methacrylate, MMA, methyl acrylate, MA, and butyl acrylate, BA. Block copolymers of St and MA have been produced using the same technique as described in Example 1 for homopolymerization of styrene (see the Examples below). Heating of chlorine atom end-capped polystyrene (0.5 g, $M_n$=4000, $M_w/M_n$=1.45) and a two-fold excess of MA (1.0 g) in the presence of 1 molar equiv. of CuCl and 3 molar equiv. of bpy (both relative to polystyrene) at 130° C. results in MA block polymerization to form the desired PSt-b-PMA block copolymer (yield: 95%, $M_n$=13,000, $M_w/M_n$=1.35).

Discussion

By analogy with transition metal catalyzed atom transfer radical addition reactions (ATRA), used in organic synthesis, the results presented herein can be explained by the mechanism shown in FIG. 2. The present process appears to involve a succession of ATRA processes, and therefore, can be called atom transfer radical polymerization, ATRP.

The model catalyst $Cu^ICl$ acts as a carrier of the chlorine atom in a redox reaction between Cu(I) and Cu(II), The coordination of the bidentate nitrogen ligand to $Cu^ICl$ increases the solubility of the inorganic salt and can also affect the position of the redox equilibrium, so as to facilitate the abstraction of a chlorine from the initiator, 1-PECl, and the dormant species, $P_i$—Cl, with the formation of initiating and growing radicals, respectively, The reversible conversion of radicals, R* and $P_i^*$, to the corresponding halides, R—Cl and $P_i$—Cl, may involve a direct atom transfer reaction (Kochi, J. K. *Organometallic Mechanisms and Catalysis*, Academic Press: New York, 1978, and references therein; Asscher, M., Vofsi, D. *J. Chem. Soc., Perkin II*. 1968, 947; Cohen, H., Meyerstein, D. *Inorg. Chem.* 1974, 13, 2434) or oxidative addition/reductive elimination with the formation of the organocopper (III) intermediates (Kochi, supra; Orochov, A., Asscher, M., Vofsi D. *J. Chem. Soc., Perkin II*. 1973, 1000; Mitani, M., Kato, L., Koyama, K. *J. Am. Chem. Soc.* 1983, 105, 6719). If the concentration of growing radicals is low and the redox reaction is fast compared to bimolecular reactions of the radicals, the extent of the termination reactions is minimized, resulting in a "living" process. Moreover, if the rate of reversible exchange between $P_i$—Cl and $P_i^*$ is comparable to that of propagation, the number average molecular weight should be defined by eq. (21), and the molecular weight distribution should remain narrow.

Two observations support the participation of free radicals in ATRP. First, the tacticity of the polymers is similar to those synthesized by typical radical initiators. For example, the tacticity of poly(methyl methacrylate) $M_n$= 35,400, $M_w/M_n$=1.40) synthesized using a 1-PECl/CuCl/Bpy initiator system (in a 1:1:3 molar ratio) at 130° C. is rr/mr(rm)/mm: 53/38/9. These values are very close to those of PMMA prepared using a typical radical initiator, BPO, at the same temperature. Therefore, the organocuprate(III) species, if it exists, probably does not react directly with monomer, otherwise some effect on tacticity would be expected. Secondly, addition of 1.5 molar equiv. of galvinoxyl (relative to 1-PECl) effectively inhibits the polymerization. In the presence of galvinoxyl, no styrene polymerization was found within 18 hours.

The low proportion of termination, despite the relatively rapid polymerization, may be explained by stabilizing interactions between radicals $P_i^*$ and $CuCl_2$. It may be possible that the monomer reacts with a radical $P_i^*$ within a solvent cage, in which the ratio of rate constants of propagation to termination is higher than for uncomplexed radicals in solution.

At 130° C., styrene may polymerize thermally by self-initiation. (Moad, G., Rizzardo, E., Solomon, D. H. *Polym. Bull.*, 1982, 6, 589). The contribution of this reaction in ATRP is rather small, because (1) ATRP is fast and (2) the relative rate of self-initiation is further reduced with the progress of the reaction. However, the small contribution of self-initiation may enhance polydispersities to the range of $M_w/M_n \approx 1.4$, and may reduce molecular weights to slightly lower values than theoretically predicted.

It must be stressed that the present transition-metal promoted ATRP, in which the molecular weight linearly increases with monomer conversion, is very different from typical redox radical telomerization promoted by transition metal species in which the molecular weight does not increase with conversion (Boutevin, B., Pietrasant, Y., in *Comprehensive Polymer Science*, Allen, G., Aggarwal, S. L., Russo, S., eds., Pergamon: Oxford, 1991, vol. 3. p 185; Bamford, C. H., in *Comprehensive Polymer Science (First Supplement)*, Allen, G., Aggarwal, S. L., Russo, S., eds., Pergamon: Oxford, 1991, p. 1).

In conclusion, the model alkyl chloride initiator, 1-PECl, and model transition metal complex CuCl/bpy polymerize styrene by repetitive atom transfer radical additions to give well-defined high molecular weight polymers with narrow molecular weight distributions.

For examples 3–22, the polymers were isolated by either of two procedures:

(1) The polymer was dissolved in THF and precipitated in MeOH (three times), filtered and dried under vacuum; or (2) The heterogeneous reaction solution was filtered, and the solvent was removed under vacuum. Removal of solvent or drying can optionally be conducted using mild heat (e.g., 25–60° C.). The same polymeric product is obtained, regardless of the isolation procedure.

Monomers, and ethyl acetate were vacuum-distilled over $CaH_2$ before use. CuCl and CuBr were purified according to the known procedures (see Nagashima, H.; Ozaki, N.; Ishii, M.; Seki, K.; Washiyama, M.; Itoh, K. *J. Org. Chem.* 1993, 58, 464; (c) Udding, J. H.; Tuijp, K. J. M.; van Zanden, M. N. A.; Hiemstra, H.; Speckamp, W. N. *J. Orq. Chem.* 1994, 59, 1993; (c) Seijas et al, *Tetrahedron,* 1992, 48(9), 1637; (d) Nagashima, H.; Wakamatsu, H.; Ozaki, N.; Ishii, T.; Watanabe, M.; Tajima, T.; Itoh, K. *J. Org. Chem.* 1992, 57, 1682).

Example 3

Polystyrene was prepared by heating styrene (0.9 g), 1-phenylethyl chloride (1 µL, 7.54×10⁻⁶ mol), Cu(I)Cl (7.54×10⁻⁶ mol) and 2,2'-bipyridine (Bpy; 2.26×10⁻⁵ mol) at 130° in a sealed tube for 21.5 h. The polymerization reaction mixture was then dissolved in THF, and precipitated in methanol. The precipitated polymer was filtered, and the dissolving, precipitating and filtering steps were repeated two additional times. The obtained polymer was dried at 60° C. under vacuum for 48 h.

The dried polymer had a number average molecular weight as measured by size exclusion chromatography (SEC), $M_{n,SEC}$, of 95,000, in good agreement with the theoretical number average molecular weight, $M_{n,th.}$, of 102,000. The dried polymer was obtained in 85% yield. The polydispersity, $M_w/M_n$, was 1.45.

Example 4

Polystyrene was prepared according to the procedure described in Example 3, except polymerization was conducted at 100° C. for 88 h. The polymer was obtained in 80% yield. The $M_{n,SEC}$ of 93,300 was in excellent agreement with the $M_{n,th.}$ of 97,000. The $M_w/M_n$ of the obtained polymer was 1.50.

Example 5

The procedure of Example 3 was repeated, except that 0.45 g of styrene and 2.5 µL (1.89×10⁻⁵ mol) of 1-PECl were employed, Ni(0) (2.73×10⁻⁵ mol) was used as the transition metal in place of Cu(I)Cl, and $PPh_3$ (1.41×10⁻⁴ mol) was used as the ligand in place of Bpy. The reaction was conducted at 130° C. for 12 h.

The polymer was obtained in 85% yield. The $M_{n,SEC}$ of the obtained polymer was 189,000 ($M_{n,th.}$=17,600), and the $M_w/M_n$=1.70.

Example 6

Polystyrene was prepared according to the procedure of Example 3, except that the concentration of 1-PECl was 2.26×10⁻⁵ mol (amount=3 µL), $RuCl_2$ (2.26×10⁻⁵ mol) was used in place of Cu(I)Cl, and $PPh_3$ (6.78×10⁻⁵ mol) was used in place of Bpy. The polymerization was conducted at 130° C. for 13.5 h. The polymer was obtained in 90% yield. The $M_{n,SEC}$ of 18,300 was in excellent agreement with the $M_{n,th.}$ of 17,900. The obtained polymer had an $M_w/M_n$ of 2.0.

Example 7

Polystyrene was prepared according to the procedure of Example 3, except that AIBN (1.7×10⁻⁵ mol) was used in place of 1-PECl, $Cu(II)Cl_2$ (3×10⁻⁵ mol) was used in place of CU(I)CI, and Bpy was present in a molar amount of 7×10⁻⁵ mol. The polymerization was conducted at 130° C. for 5 h. The polymer was obtained in 90% yield. The $M_{n,SEC}$ of 18,500 was in agreement with the $M_{n,th.}$ of 25,000. The obtained polymer had an $M_w/M_n$ of 1.7.

Example 8

Polystyrene was prepared according to the procedure of Example 3, except that 2-chloropropionitrile (3.75×10⁻⁶ mol) was used in place of 1-PECl; Cu(I)Cl and $Cu(II)Cl_2$ were used in an equimolar mixture (3.76×10⁻⁶ Mol of each) in place of Cu(I)Cl alone; and Bpy was present in a molar amount of 1.9×10⁻⁵ mol. The polymerization was conducted at 130° C. for 33 h. The polymer was obtained in 80% yield. The $M_{n,SEC}$ of 81,500 was in good agreement with the $M_{n,th.}$ of 95,500. The obtained polymer had an $M_w/M_n$ of 1.4.

Example 9

Polystyrene was prepared according to the procedure of Example 3, except that benzyl chloride (3.75×10⁻⁵ mol) was used in place of 1-PECl, $FeCl_2$ (3.75×10⁻⁵ mol) was used in place of Cu(I)Cl, and $(EtO)_3P$ (1.15×10⁻⁴ mol) was used in place of Bpy. The polymerization was conducted at 130° C. for 5.5 h. The polymer was obtained in 85% yield. The $M_{n,SEC}$ of 19,300 was in good agreement with the $M_{n,th.}$ of 21,100. The obtained polymer had an $M_w/M_n$ of 3.0.

Example 10

Poly(methyl acrylate), PMA, was prepared according to the procedure of Example 3, except that 1.45 grams of MA were used, α,α'-dibromoxylene (4.4×10⁻⁵ mol) was used in place of 1-PECI, Cu(I)Br (8×10⁻⁵ mol) was used in place of Cu(I)Cl, and Bpy was present in a molar amount of 2.5×10⁻⁴ mol. The polymerization was conducted at 80° C. for 36 h. The polymer was obtained in 90% yield. The $M_{n,SEC}$ of 31,000 was in very good agreement with the $M_{n,th.}$ of 29,500, The obtained polymer had an $M_w/M_n$ of 1.2.

Example 11

Poly(methyl acrylate) was prepared according to the procedure of Example 10, except that 0.48 g of MA were used, 2-methylbromopropionate (1.47×10⁻⁵ mol) was used in place of α,α'-dibromoxylene, Cu(I)Br was used in an amount of 1.47× 10⁻⁵ mol, and Bpy was present in a molar amount of 4.5×10⁻⁵ mol. The polymerization was conducted at 100° C. for 15 h. The polymer was obtained in 95% yield. The $M_{n,SEC}$ of 29,500 was in very good agreement with the $M_{n,th.}$ of 31,000. The obtained polymer had an $M_w/M_n$ of 1.15.

Example 12

Poly(methyl methacrylate), PMMA, was prepared according to the procedure of Example 3, except that 0.5 g of MMA were used, 0.5 ml of ethyl acetate was employed as a solvent, 2-ethyl bromoisobutyrate ($2.5\times10^{-5}$ mol) was used in place of 1-PECl, Cu(I)Br ($1.5\times10^{-5}$ mol) was used in place of Cu(I)Cl, and Bpy was present in a molar amount of $4.5\times10^{-5}$ mol. The polymerization was conducted at 100° C. for 1.5 h. The polymer was obtained in 95% yield. The $M_{n,SEC}$ of 20,500 was in excellent agreement with the $M_{n,th.}$ of 19,000. The obtained polymer had an $M_w/M_n$ of 1.40.

Example 13

Polyisoprene was prepared according to the procedure of Example 3, except that 0.45 g of isoprene was used in place of St, $3.77\times10^{-5}$ mol of 1-PECl was used, $3.9\times10^{-5}$ mol of Cu(I)Cl was used, and Bpy was present in a molar amount of $1.2\times10^{-4}$ mol. The polymerization was conducted dt 130° C. for 45 h. The polymer was obtained in 80% yield. The $M_{n,SEC}$ of 12,700 was in agreement with the $M_{n,th.}$ of 9,500. The obtained polymer had an $M_w/M_n$ of 2.0.

Example 14

A PSt-b-PMA block copolymer was produced according to the procedure of Example 3, except that 0.5 g of PSt–Cl ($M_n$=4,000, $M_w/M_n$=1.45) was used in place of 1-PECl as the initiator, 1.0 g of MA was used as the monomer, Cu(I)Cl was present in a molar amount of $1.25\times10^{-4}$ mol and Bpy was present in a molar amount of $3.75\times10^{-4}$ mol. The polymerization was conducted at 130° C. for 5 h. The polymer was obtained in 95% yield. The $M_{n,SEC}$ of 13,000 was in good agreement with the $M_{n,th.}$ of 11,600. The obtained polymer had an $M_w/M_n$ of 1.35.

Example 15

A PSt-b-PMA-b-PSt triblock copolymer was produced as follows. To a flask equipped with a water condenser and a magnetic stirring bar, the initiator α,α'-dibromoxylene ($1\times10^{-4}$ mol), CuBr ($2\times10^{-4}$ mol), Bpy ($6\times10^{-4}$ mol), MA (3 g) and EtOAc (10 ml) were added. Argon was then bubbled through the solution, and the solution was heated at 100° C. for 18 h. One ml of solution was withdrawn using a syringe and was analyzed by gas chromatography (GC) and SEC to determine the monomer conversion and $M_n$, respectively. PMA was obtained in 100% yield. The $M_{n,SEC}$ of 30,500 was in excellent agreement with the $M_{n,th.}$ of 30,000, and the $M_w/M_n$ of the PMA was 1.3.

Styrene (1 g) was added to the PMA reaction solution, and the mixture was heated at 100° C. for 18 h. The triblock polymer was obtained in 100% yield. The $M_{n,SEC}$ of 42,000 was in excellent agreement with the $M_{n,th.}$ of 40,000, and the triblock polymer had an $M_w/M_n$ of 1.45.

Example 16

A PMA-b-PSt block copolymer was prepared according to the procedure of Example 3, except that 0.5 g of PMA–Cl ($M_n$=2,000, $M_w/M_n$=1.30) was used in place of 1-PECl as the initiator, 1.0 g of MA was used as the monomer, Cu(I)Cl was present in a molar amount of $2.5\times10^{-4}$ mol and Bpy was present in a molar amount of $7.5\times10^{-4}$ mol. The polymerization was conducted at 130° C. for 10 h. The polymer was obtained in 90% yield. The $M_{n,SEC}$ of 11,500 was in excellent agreement with the $M_{n,th.}$ of 11,000. The obtained polymer had an $M_w/M_n$ of 1.29.

Example 17

A random P(St-co-MA) copolymer was prepared according to the procedure of Example 3, except that mixture of MA (0.48 g) and St (0.45 g) was used as comonomers, 1-PECl was used in an amount of 3 μL ($2.26\times10^{-5}$ mol), Cu(I)Cl was used in an amount of $2.22\times10^{-5}$ mol and Bpy was present in a molar amount of $6.5\times10^{-5}$ mol. The polymerization was conducted at 130° C. for 5 h. The polymer was obtained in 95% yield. The $M_{n,SEC}$ of 39,000 was in excellent agreement with the $M_{n,th.}$ of 39,100. The obtained polymer had an $M_w/M_n$ of 1.45.

The composition as determined by $^1$H NMR contained 48% MA, and 52% St.

Example 18

A random P(St-co-MMA) copolymer was prepared according to the procedure of Example 17, except that mixture of MMA (0.45 g) and St (0.45 g) was used as comonomers, 1-PEBr (3 μL, $2.2\times10^{-5}$ mol) was used in place of 1-PECl, Cu(I)Br ($2.0\times10^{-5}$ mol) was used in place of Cu(I)Cl and Bpy was present in a molar amount of $4.5\times10^{-5}$ mol. The polymerization was conducted at 100° C. for 14 h. The polymer was obtained in 90% yield. The $M_{n,SEC}$ of 38,000 was in excellent agreement with the $M_{n,th.}$ of 36,900. The obtained polymer had an $M_w/M_n$ n of 1.55.

Example 19

A six arm star PMA polymer was prepared according to the procedure of Example 3, except that $C_6(CH_2Br)_6$ ($1\times10^{-4}$ mol) was used in place of 1-PECl, MA (1 ml, 0.96 g) was used as the monomer, CuBr ($1.8\times10^{-4}$ mol) was used in place of Cu(I)Cl, and Bpy was present in a molar amount of $5.8\times10^{-4}$ mol. The polymerization was conducted at 110° C. for 45 h. The polymer was obtained in 100% yield. The $M_{n,SEC}$ of 9,600 was in perfect agreement with the $M_{n,th.}$ of 9,600. The obtained polymer had an $M_w/M_n$ of 2.0.

Example 20

A six-arm star PSt polymer was prepared according to the procedure of Example 3, except that $1.53\times10^{-5}$ mol of $C_6(CH_2Br)_6$ was used in place of 1-PECl. The polymer was obtained in 90% yield. The $M_{n,SEC}$ of 24,100 was in close agreement with the $M_{n,th.}$ of 26,800. The obtained polymer had an $M_w/M_n$ of 1.25.

Example 21

An end-functional Pst having a COOH end group was prepared according to the procedure of Example 3, except that 2-chloropropionic acid ($1.74\times10^{-5}$ mol) was used in place of 1-PECl, and the reaction was conducted for 14 h. The polymer was obtained in 50% yield, and had an $M_{n,SEC}$=39,600 and an $M_w/M_n$=1.45.

Example 22

A telechelic PMMA with two Br end groups was prepared at 100° C. in ethyl acetate according to the procedure of Example 3, except that $1.00 \times 10^{-4}$ mol of $C_6H_4(CH_2Br)_2$ was used in place of 1-PECl, 0.5 g of MMA was used, $2.00 \times 10^{-4}$ mol of CuCl was used, and $5.2 \times 10^{-4}$ mol of Bpy was present. The polymer was obtained in 100% yield after 8 h. The $M_{n,SEC}$ of 4,800 was in close agreement with the $M_{n,th.}$ of 5,000. The obtained polymer had an $M_w/M_n$ of 1.35.

Example 23

HBr abstraction (by known methods) of the Br-functional PMMA produced in Example 22 can lead to a telechelic (co)polymer with olefinic end groups, from which a telechelic (co)polymer with primary alcohol end groups can be formed by sequential hydroboration/oxidation (by known methods). Nitration/reduction (by known methods) gives the corresponding amine-ended telechelic (co)polymer.

A Br-ended telechelic (co)polymer ("Br—$P_n$—Br") can be converted to other groups in one or two step as follows:

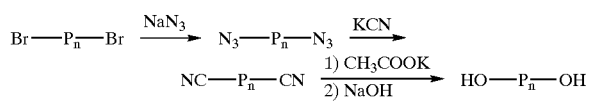

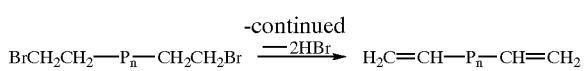

Example 24

An end-functional and in-chain functional PSt with two Br end groups and two central Br groups was prepared at 100° C. according to the procedure of Example 3, except that $0.900 \times 10^{-4}$ mol of $CBr_4$ was used in place of 1-PECl 0.5 g of St was used, $1.5 \times 10^{-4}$ mol of CuCl was used, and $3.2 \times 10^{-4}$ mol of Bpy was present. The polymer was obtained in 90% yield after 20 h. The $M_{n,SEC}$ of 4,500 was in agreement with the $M_{n,th.}$ of 5,000. The obtained polymer had an $M_w/M_n$ of 1.45. The obtained polymer can be converted to any of the other four functional PSt's according to the procedures described in Example 23.

A number of ATRP's of styrene using transition metal complexes other than CuCl/Bpy are summarized in Table 8, and a number of ATRP's of methyl methacrylate using transition metal complexes other than CuCl/Bpy are summarized in Table 9.

TABLE 8

St ATRP in the Presence of Other Transition Metal Complexes Other Than CuCl/Bpy

| Initiator M | Mt M | L M | Temp. °C. | time h | conv. | Mn, th | Mn, SEC | Mw/Mn |
|---|---|---|---|---|---|---|---|---|
| AIBN 0.11M | CuCl2 0.076M | Bpy 0.38 | 130 | 3.5 h | 0.85 | 7500 | 6100 | 2.7 |
| 1-PECl 0.075M | FeCl2 0.075 | (EtO)3P 0.375 | 130 | 5.5 | 0.85 | 21100 | 19300 | 3.1 |
| 1-PECl 0.0075M | CuCl/CuCl2 0.0075M/" | Bpy 0.038M | 130 | 21 | 0.80 | 95500 | 72500 | 1.45 |
| AIBN 0.034M | CuCl2 0.06 | bpy 0.14 | 130 | 21 | 0.90 | 25000 | 18500 | 1.8 |
| AIBN 0.034 | | | 130 | 21 | 0.6 | | 544000 | 4.50 |
| 1-PECl 0.044M | RuCl2(PPh3)3 0.037M | | 130 | 13 | 0.9 | 18400 | 18300 | 2.2 |

TABLE 9

MMA ATRP in the Presence of Other Transition Metal Complexes Other Than CuCl/Bpy

| Initiator (M) | Mt (M) | L (M) | Temp. (° C.) | time hr | conv. | Mn, th | Mn, SEC | Mw/Mn |
|---|---|---|---|---|---|---|---|---|
| 2-ClEPN 0.047M | FeCl2 0.021M | PPh3 0.073 | 130 | 5 | 0.85 | 8460 | 63100 | 2.1 |
| 2-ClEPN 0.047M | FeCl2 0.042 | PPh3 0.14 | 130 | 5 | 0.80 | 8000 | 65100 | 1.8 |
| 2-ClEPN 0.047M | FeCl2 0.047 | PPh3 0.28 | 130 | 5 | 0.85 | 8500 | 38600 | 1.76 |
| 2-ClEPN 0.047M | FeCl2 0.084 | PPh3 0.3 | 130 | 5 | 0.90 | 8700 | 71700 | 2.1 |

What is claimed is:
1. A(co)polymer, comprising:
   one or more free radically (co)polymerizable monomers, wherein the polymer exhibits a stereochemistry and microstructure, as defined by tacticity and sequence distribution, of a material formed by a free radical polymerization process, and displays a molecular weight distribution of less than 2.0;

a residue of an initiator, wherein the residue is not a residue of a carbon tetrachloride initiator;

a thermally stable end group selected from the group consisting of a halogen, Cl, Br, I, OH, CN, $N_3$, $OR^{10}$, $SR^{14}$, $SeR^{14}$, $OC(=O)R^{14}$, $OP(=O)R^{14}$, $OP(=O)(OR^{14})_2$, $O-N(R^{14})_2$, carboxylic acid halide, H, $NH_2$, COOH, and olefinic end groups, where $R^{14}$ is aryl or a straight or branched $C_1-C_{20}$ alkyl group or where an $N(R^{14})_2$ group is present, the two $R^{14}$ groups may be joined to form a 5-, 6- or 7-member heterocyclic ring, and $R^{10}$ is an alkyl of from 1 to 20 carbon atoms or an alkyl of from 1 to 20 carbon atoms in which each of the hydrogen atoms may be replaced by a halide, alkenyl of from 2 to 20 carbon atoms, alkynyl of from 2 to 10 carbon atoms, phenyl, phenyl substituted with from 1 to 5 halogen atoms or alkyl groups with from 1 to 4 carbon atoms, aralkyl, aryl, aryl substituted alkyl, in which the aryl group is phenyl or substituted phenyl and the alkyl group is from 1 to 6 carbon atoms;

a molecular weight in excess of two monomer units.

2. The polymer of claim 1, wherein at least one of the residue and end group comprise a functional group.

3. The polymer of claim 1, wherein the residue and end groups can be modified to be used in subsequent chemical reactions.

4. A block copolymer comprising two or more blocks of units obtained form free radically (co)polymerizable monomers, wherein the block copolymer has a residue from an initiator at one chain end and, at the other end of the polymer chain, a member selected from the group consisting of radically transferable atoms, radically transferable groups, halogen, Cl, Br, I, OH, CN, $N_3$, $OR^{10}$, $SR^{14}$, $SeR^{14}$, $OC(=O)R^{14}$, $OP(O)R^{14}$, $OP(=O)(OR^{14})_2$, $O-N(R^{14})_2$, carboxylic acid halide, H, $NH_2$, COOH, and olefinic end groups, where $R^{14}$ is aryl or a straight or branched $C_1-C_{20}$ alkyl group or where an $N(R^{14})_2$ group is present, the two $R^{14}$ groups may be joined to form a 5-, 6- or 7-member heterocyclic ring, and $R^{10}$ is an alkyl of from 1 to 20 carbon atoms or an alkyl of from 1 to 20 carbon atoms in which each of the hydrogen atoms may be replaced by a halide, alkenyl of from 2 to 20 carbon atoms, alkynyl of from 2 to 10 carbon atoms, phenyl, phenyl substituted with from 1 to 5 halogen atoms or alkyl groups with from 1 to 4 carbon atoms, aralkyl, aryl, aryl substituted alkyl, in which the aryl group is phenyl or substituted phenyl and the alkyl group is from 1 to 6 carbon atoms.

5. The block copolymer as claimed in claim 4, wherein said radically (co)polymerizable monomers are selected from the group consisting of polar and non-polar monomers.

6. A block copolymer, comprising:

at least two units obtained from one or more radically (co)polymerizable monomers, wherein each unit is substantially similar in microstructure and length such that the molecular weight distribution is less than 2; and a residue from an initiator in the copolymer connecting the units; and a member selected from the group consisting of radically transferable atoms, radically transferable groups, halogen, Cl, Br, I, OH, CN, $N_3$, $OR^{10}$, $SR^{14}$, $SeR^{14}$, $OC(=O)R^{14}$, $OP(=O)R^{14}$, $OP(=O)(OR^{14})_2$, $O-N(R^{14})_2$, carboxylic acid halide, H, $NH_2$, COOH, and olefinic end groups, where $R^{14}$ is aryl or a straight or branched $C_1-C_{20}$ alkyl group or where an $N(R^{14})_2$ group is present, the two $R^{14}$ groups may be joined to form a 5-, 6- or 7-member heterocyclic ring, and $R^{10}$ is an alkyl of from 1 to 20 carbon atoms or an alkyl of from 1 to 20 carbon atoms in which each of the hydrogen atoms may be replaced by a halide, alkenyl of from 2 to 20 carbon atoms, alkynyl of from 2 to 10 carbon atoms, phenyl, phenyl substituted with from 1 to 5 halogen atoms or alkyl groups with from 1 to 4 carbon atoms, aralkyl, aryl, aryl substituted alkyl, in which the aryl group is phenyl or substituted phenyl and the alkyl group is from 1 to 6 carbon atoms attached to the units.

7. A copolymer comprising:

units obtained from free radically (co)polymerizable monomers, wherein the copolymer is formed by coupling two polymer chains, such that substantially each polymer chain has a residue of an initiator present on substantially each polymer chain end, wherein the polymer has a molecular weight distribution of less than 2.

8. A copolymer comprising units obtained from two or more free radically (co)polymerizable monomers, wherein the copolymer is a statistical, periodic, or sequential copolymer and exhibits a molecular weight distribution of less than 2.0 and thermally stable functionality on predominantly each of the polymer chain ends.

9. A copolymer comprising units obtained from one or more free radically (co)polymerizable monomers and formed by using an initiator having more than two radically transferable atoms or groups, wherein the copolymer has three or more polymer chains emanating from a residue of the initiator contained in the copolymer and each of these polymer chains has at the polymer chain end a member selected from the group consisting of radically transferable atoms, radically transferable groups, groups formed by conventional chemistry from said radically transferable atoms and groups formed by conventional chemistry from said radically transferable groups.

10. A copolymer comprising units obtained from two or more radically (co)polymerizable monomers wherein the copolymer has a composition that varies along the length of the polymer chain from terminus to terminus based on the relative reactivity ratios of the monomers and instantaneous concentrations of the monomers during polymerization.

11. The (co)polymer as claimed in claim 1, wherein said (co)polymer is selected from the group consisting of polystyrene, poly(methacrylate), poly(butylacrylate), poly(methylmethacrylate) and polyisoprene having a residue from a free radical initiator at one end of each polymer chain and a radically transferable group at the other end of each polymer chain end.

12. The block copolymer as claimed in claim 4, wherein said block copolymer is a poly(styrene-block-methyl acrylate) or a poly(methyl acrylate-block-styrene) (co)polymer.

13. The block copolymer as claimed in claim 6, wherein the block copolymer is a poly(styrene-block-acrylate-block-styrene) copolymer having a radically transferable atom or group at each polymer chain end.

14. The (co)polymer as claimed in claim 1, herein said (co)polymer is selected from the group consisting of linear, monofunctional, star and telechelic polystyrenes, linear and star poly(methyl acrylate)s, poly(butyl acrylate)s, poly (methyl methacrylate)s, and polyisoprenes, wherein the (co) polymer displays a tacticity of a polymer prepared by free radical polymerization.

15. The (co)polymer claimed in claim 8, prepared by (co)polymerizing styrene and a monomer selected from methyl acrylate and methyl methacrylate to yield polymers in which the (co)polymer has a composition that varies along the length of the (co)polymer based on the relative reactivity ratios of the monomers and the instantaneous concentrations of the monomers during the polymerization.

16. The (co)polymer claimed in claim 10, prepared by (co)polymerizing styrene and a monomer selected from methyl acrylate and methyl methacrylate to yield polymers in which the (co)polymer has a composition that changes in a predictable manner along the (co)polymer based on the relative reactivity ratios of the monomers and a ratio of instantaneous concentrations of the monomers.

17. A (co)polymer, exhibiting a stereochemistry and microstructure, as defined by tacticity and sequence distribution, of a polymer formed by a free radical polymerization process and displaying a molecular weight distribution of less than 2.0 and calculable number average molecular weight, having the formula:

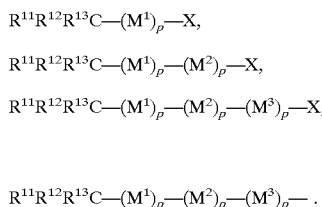

or

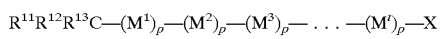

wherein X is selected from the group consisting of Cl, Br, I, $OR^{10}$, $SR^{14}$, $SeR^{14}$, $O—N(R^{14})_2$, $S—C(=S)N(R^{14})_2$, H, OH, $N_3$, $NH_2$, COOH, $CONH_2$, halogen, $OC(=O)R^{14}$, $OP(=O)R^{14}$, $OP(=O)(OR^{14})_2$, carboxylic acid halide, and olefinic end groups, where $R^{14}$ is aryl or a straight or branched $C_1$–$C_{20}$ alkyl group or where an $N(R^{14})_2$ group is present, the two $R^{14}$ groups may be joined to form a 5-, 6- or 7-member heterocyclic ring, and $R^{10}$ is an alkyl of from 1 to 20 carbon atoms or an alkyl of from 1 to 20 carbon atoms in which each of the hydrogen atoms may be replaced by a halide, alkenyl of from 2 to 20 carbon atoms, alkynyl of from 2 to 10 carbon atoms, phenyl, phenyl substituted with from 1 to 5 halogen atoms or alkyl groups with from 1 to 4 carbon atoms, aralkyl, aryl, aryl substituted alkyl, in which the aryl group is phenyl or substituted phenyl and the alkyl group is from 1 to 6 carbon atoms, where $R^{10}$ is an alkyl of from 1 to 20 carbon atoms in which each of the hydrogen atoms may be independently replaced by halide, $R^{14}$ is aryl or a straight or branched $C_1$–$C_{20}$ alkyl group, and where an $N(R^{14})_2$ group is present, the two $R^{14}$ groups may be joined to form a 5- or 6-membered heterocyclic ring, $R^{11}$, $R^{12}$ and $R^{13}$ are each independently selected from the group consisting of H, halogen, $C_1$–$C_{20}$ alkyl, $C_3$–$C_8$ cycloalkyl, $C(=Y)R^5$, $C(=Y)NR^6R^7$, COCl, OH, CN, $C_2$–$C_{20}$ alkenyl, $C_2$–$C_{20}$ alkynyl oxiranyl, glycidyl, aryl, heterocyclyl, aralkyl, aralkenyl, $C_1$–$C_6$ alkyl in which from 1 to all of the hydrogen atoms are replaced with halogen and $C_1$–$C_6$ alkyl substituted with from 1 to 3 substituents selected from the group consisting of $C_1$–$C_4$ alkoxy, aryl, heterocyclyl, $C(=Y)R^5$, $C(=Y)NR^6R^7$, oxiranyl and glycidyl, where Y is $NR^8$, S or O;

where $R^5$ is an aryl or an alkyl of from 1 to 20 carbon atoms, alkoxy of from 1 to 20 carbon atoms, aryloxy or heterocyclyloxy; and $R^6$ and $R^7$ are independently H or alkyl of from 1 to 20 carbon atoms, or $R^6$ and $R^7$ may be joined together to form an alkylene group of from 2 to 5 carbon atoms, thus forming a 3- to 6-membered ring, such that no more than two of $R^{11}$, $R^{12}$ and $R^{13}$ are H, and $R^8$ is H, a straight or branched $C_1$–$C_{20}$ alkyl or aryl, and $M^1$, $M^2$, $M^3$, ... up to $M^t$ are each monomer units derived from radically (co)polymerizable monomer selected such that the monomers units in adjacent blocks are not identical, and t is an integer greater than 3; p is an average degree of polymerization for each block is independently selected such that the number average molecular weight of each block is up to 250,000 g/mol; the following formulas:

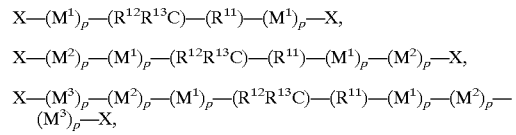

or

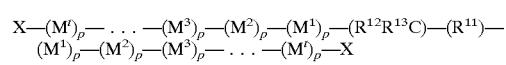

wherein $R^{11}$, $R^{12}$, $R^{13}$, X, $M^1$, $M^2$, $M^3$, ... up to $M^t$, t, and p are as defined above, with the provisio that $R^{11}$ has a polymer chain as indicated attached thereto;

of the formulas:

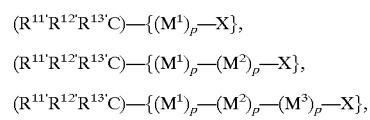

or

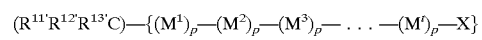

wherein $\{(M^1)_p—X\}$, $\{(M^1)_p—(M^2)_p—X\}$, $\{(M^1)_p—(M^2)_p—(M^3)_p—X\}$, and $\{(M^1)_p—(M^2)_p—(M^3)_p— ... —(M^t)_p—X\}$ are polymer chains, $R^{11'}$, $R^{12'}$ and $R^{13'}$ are the same as $R^{11}$, $R^{12}$ and $R^{13}$ as previously defined with the proviso that $R^{11'}$, $R^{12'}$ and $R^{13'}$ together comprise an additional 2 to 5 of the polymer chains, where X is as defined above;

$M^1$, $M^2$, $M^3$, ... $M^t$, p, and t are as defined above; and and copolymers comprising a block or graft with the above composition; and of the formula:

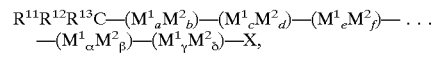

or

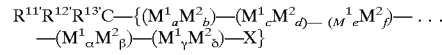

wherein $\{(M^1_\alpha M^2_\beta)—(M^1_c M^2_d)—(M^1_e M^2_f)— ... —(M^1_\alpha M^2_\beta)—(M^1_\gamma M^2_\delta)—X\}$ is a polymer chain, $R^{11}$, $R^{12}$, $R^{13}$ are as defined above, $M^1$ and $M^2$ are as defined above and where $R^{11'}$, $R^{12'}$ and $R^{13'}$ are the same as $R^{11}$, $R^{12}$ and $R^{13}$ with the proviso that $R^{11'}$, $R^{12'}$ and $R^{13'}$ together comprise an additional 1 to 5 of the polymer chains, and a, b, c, d, e, f, $\alpha$, $\beta$, $\gamma$, $\delta$ and such parameters for any intervening blocks are molar percentages of monomer in each block and are independently selected such that a+b=c+d=100%, and any or all of (e+f), ($\alpha$+$\beta$) and ($\gamma$+$\delta$)=100% or 0, wherein the a:b ratio is from 100:0 to 0:100, the c:d ratio is from 95:5 to 5:95, such that c<a and d>b, and where applicable, the e:f ratio is from 90:10 to 10:90, such that e<c and f>d, and the endpoints of the molar ratio ranges of first monomer to second monomer in successive blocks progressively decrease or increase such that the e:f ratio is from 5:95 to 95:5, such that e≠c and f≠d, and the $\gamma$:$\delta$ ratio is from 0:100 to 100:0, such that $\gamma$≠e and $\delta$≠f.

18. The (co)polymer of claim 17, having a formula:

$(R^{11'}R^{12'}R^{13'}C)-\{(M^1)_p-X\}$, $(R^{11'}R^{12'}R^{13'}C)-\{(M^1)_p-(M^2)_p-X\}$, $(R^{11'}R^{12'}R^{13'}C)-\{(M^1)_p-(M^2)_p-(M^3)_p-X\}$, or $(R^{11'}R^{12'}R^{13'}C)-\{(M^1)_p-(M^2)_p-(M^3)_p-\ldots-(M^t)_p-X\}$ wherein $\{(M^1)_p-X\}$, $\{(M^1)_p-(M^2)_p-X\}$, $\{(M^1)_p-(M^2)_p-(M^3)_p-X\}$, and $\{(M^1)_p-(M^2)_p-(M^3)_p-\ldots-(M^t)_p-X\}$ are polymer chains, $R^{11'}$, $R^{12'}$ and $R^{13'}$ are the same as $R^{11}$, $R^{12}$ and $R^{13}$ as previously defined with the proviso that $R^{11'}$, $R^{12'}$ and $R^{13'}$ together comprise an additional 2 to 5 of the polymer chains, where X is as defined above;

$M^1$, $M^2$, $M^3$, $M^t$, p and t are as defined above, and copolymers comprising a block or graft with the above composition.

19. The (co)polymer of claim 17, having the formulae:

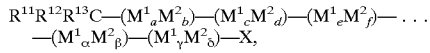

or

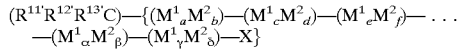

where $R^{11}$, $R^{12}$, $R^{13}$, and X are as previously defined, and where $R^{11'}$, $R^{12'}$ and $R^{13'}$ are the same as $R^{11}$, $R^{12}$ and $R^{13}$ with the proviso that $R^{11'}$, $R^{12'}$ and $R^{13'}$ comprise an additional 1 to 5 of the polymer chains enclosed in square brackets, $M^1$ and $M^2$ are monomer units derived from different radically (co)polymerizable monomers, and a, b, c, d, e, f, $\alpha$, $\beta$, $\gamma$, $\delta$ and such parameters for any intervening blocks are molar percentages of monomer in each block and are independently selected such that a+b=c+d=100%, and any or all of (e+f), ($\alpha$+$\beta$) and ($\gamma$+$\delta$)=100% or 0, wherein the a:b ratio is from 100:0 to 0:100, the c:d ratio is from 95:5 to 5:95, such that c<a and d>b, and where e:≠0 and f≠0, the e:f ratio is from 90:10 to 10:90, such that e<c and f>d, and the endpoints of the molar ratio ranges of first monomer to second monomer in successive blocks progressively decrease or increase such that the e:f ratio is from 5:95 to 95:5, such that e≠c and f≠d, and the $\gamma$:$\delta$ ratio is from 0:100 to 100:0, such that $\gamma$≠e and $\delta$≠f.

20. A polymer, comprising:

one or more free radically (co)polymerizable monomers, wherein the (co)polymer exhibits a stereochemistry and microstructure, as defined by tacticity and sequence distribution, of a material formed by a free radical polymerization process;

a molecular weight distribution of less than 2.0;

residues of a polymerization initiator at each polymer end; and a number average molecular weight in excess 20,000 g/mol.

21. The polymer of claim 20, wherein the residues comprise functional groups.

22. The polymer of claim 20, wherein the polymer is selected from the group consisting of poly(methacrylate), poly(butylacrylate), poly(methylmethacrylate) and polyisoprene having a residue from a free radical initiator at one end of each polymer chain and a radically transferable group at the other end of each polymer chain end.

23. The polymer of claim 20, wherein the polymer is a solvent-resistant ABA block copolymer comprising a monomer which contributes oleophobic properties to the polymer.

24. The polymer of claim 23, wherein the monomer is selected from the group consisting of (meth)acrylate and meth)acrylonitrile monomers.

25. The polymer of claims 20, wherein the polymer is a ABA random copolymer, wherein the A block comprises a monomer which contributes oleophobic properties to the polymer.

26. The polymer of claim 25, wherein the monomer is selected from the group consisting of (meth)acrylate and (meth)acrylonitrile monomers.

27. The polymer of claim 20, wherein the polymer displays a molecular weight distribution of less than 1.5.

28. A solvent resistant ABA block (co)polymer, comprising:

one or more free radically (co)polymerizable monomers, wherein the polymer exhibits a stereochemistry and microstructure, as defined by tacticity and sequence distribution, of a material formed by a free radical polymerization process, displays a molecular weight distribution of less than 2.0, and thermally stable residues of a polymerization initiator at each polymer end which will not thermally dissociate from the (co)polymer at temperatures below 150° C. in the absence of a catalyst at predominantly each polymer chain end and a molecular weight in excess of two monomer units, wherein the A block comprises a monomer which contributes oleophobic properties to the (co)polymer.

29. The solvent resistant ABA block (co)polymer of claim 28, wherein the monomer which contribute oleophobic properties to the (co)polymer is selected from the group consisting of (meth)acrylate and (meth)acrylonitrile monomers.

30. An solvent resistant ABA random (co)polymer, comprising:

one or more free radically (co)polymerizable monomers, wherein the polymer exhibits a stereochemistry and microstructure, as defined by tacticity and sequence distribution, of a material formed by a free radical polymerization process, displays a molecular weight distribution of less than 2.0, and thermally stable residues of a polymerization initiator at each polymer end which will not thermally dissociate from the (co)polymer at temperatures below 150° C. in the absence of a catalyst at predominantly each polymer chain end and a molecular weight in excess of two monomer units, wherein the A block comprises a monomer which contributes oleophobic properties to the (co)polymer.

31. The (co)polymer of claim 30, wherein the monomer which contributes oleophobic properties to the (co)polymer is selected from the group consisting of (meth)acrylate and (meth)acrylonitrile monomers.

32. A block copolymer, comprising:
at least two units obtained from one or more radically (co)polymerizable monomers, wherein each unit is substantially similar in microstructure and similar in microstructure and length such that the molecular weight distribution is less than 2; and
a residue from an initiator in the copolymer; and
a radically transferable atom or group at each polymer chain end, wherein the block copolymer is a poly (styrene-block-acrylate-block-styrene) copolymer having a radically transferable atom or group at each polymer chain end.

33. The (co)polymer of claim 17, having a formula:

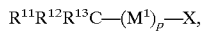

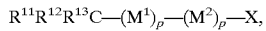

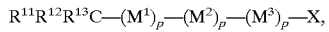

or

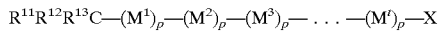

wherein X is selected from the group consisting of Cl, Br, I, $OR^{10}$, $SR^{14}$, $SeR^{14}$, $O-N(R^{14})_2$, $S-C(=S)N(R^{14})_2$, H, OH, $N_3$, $NH_2$, COOH, $CONH_2$, halogen, $OC(=O)R^{14}$, $OP(=O)R^{14}$, $OP(=O)(OR^{14})_2$, $O-N(R^{14})_2$, carboxylic acid halide, and olefinic end groups, where $R^{14}$ is aryl or a straight or branched $C_1-C_{20}$ alkyl group or where an $N(R^{14})_2$ group is present, the two $R^{14}$ groups may be joined to form a 5-, 6- or 7-member heterocyclic ring, and $R^{10}$ is an alkyl of from 1 to 20 carbon atoms or an alkyl of from 1 to 20 carbon atoms in which each of the hydrogen atoms may be replaced by a halide, alkenyl of from 2 to 20 carbon atoms, alkynyl of from 2 to 10 carbon atoms, phenyl, phenyl substituted with from 1 to 5 halogen atoms or alkyl groups with from 1 to 4 carbon atoms, aralkyl, aryl, aryl substituted alkyl, in which the aryl group is phenyl or substituted phenyl and the alkyl group is from 1 to 6 carbon atoms; and where $R^{10}$ is an alkyl of from 1 to 20 carbon atoms in which each of the hydrogen atoms may be independently replaced by halide, $R^{14}$ is aryl or a straight or branched $C_1-C_{20}$ alkyl group, and where an $N(R^{14})_2$ group is present, the two $R^{14}$ groups may be joined to form a 5- or 6-membered heterocyclic ring,
$R^{11}$, $R^{12}$ and $R^{13}$ are each independently selected from the group consisting of H, halogen, $C_1-C_{20}$ alkyl, $C_3-C_8$ cycloalkyl, $C(=Y)R^5$, $C(=Y)NR^6R^7$, COCl, OH, CN, $C_2-C_{20}$ alkenyl, $C_2-C_{20}$ alkynyl oxiranyl, glycidyl, aryl, heterocyclyl, aralkyl, aralkenyl, $C_1-C_6$ alkyl in which from 1 to all of the hydrogen atoms are replaced with halogen and $C_1-C_6$ alkyl substituted with from 1 to 3 substituents selected from the group consisting of $C_1-C_4$ alkoxy, aryl, heterocyclyl, $C(=Y)R^5$, $C(=Y)NR^6R^7$, oxiranyl and glycidyl,
where Y is $NR^8$, S or O,
where $R^5$ is an aryl or an alkyl of from 1 to 20 carbon atoms, alkoxy of from 1 to 20 carbon atoms, aryloxy or heterocyclyloxy; and $R^6$ and $R^7$ are independently H or alkyl of from 1 to 20 carbon atoms, or $R^6$ and $R^7$ may be joined together to form an alkylene group of from 2 to 5 carbon atoms, thus forming a 3- to 6-membered ring, such that no more than two of $R^{11}$, $R^{12}$, $R^{13}$ are H,
$R^8$ is H, a straight or branched $C_1-C_{20}$ alkyl or aryl, and $M^1$, $M^2$, $M^3$, ... up to $M^t$ are each a radically (co)polymerizable monomer selected such that the monomers in adjacent blocks are not identical, and p is an average degree of polymerization for each monomer and is independently selected such that the number average molecular weight of each block is from 1000 to 250,000 g/mol, and
t is an integer greater than 3.

34. The (co)polymer of claim 17, having a formula:

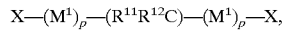

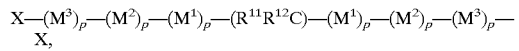

or

X—(M$^t$)$_p$— ... —(M$^3$)$_p$—(M$^2$)$_p$—(M$^1$)$_p$—(R$^{11}$R$^{12}$C)—(M$^1$)$_p$—(M$^2$)$_p$—(M$^3$)$_p$— ... —(M$^t$)$_p$—X wherein $R^{11}$, $R^{12}$, X, $M^1$, $M^2$, $M^3$, ... up to $M^t$, t, and p are as defined above.

35. A graft or comb shaped copolymer comprising backbone and graft polymer segments wherein at least one of the backbone and graft polymer segments comprise radically (co)polymerizable monomers, wherein the polymer segments comprising radically polymerizable monomers comprises an average molecular weight dependent on the number of segments and the molecular weight and moles of the monomers in the segments and a molecular weight distribution of the segments of less than 2.

36. A hyperbranched, dendritic copolymer prepared by a free radical polymerization process.

37. A polymer of the formula:

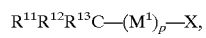

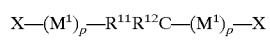

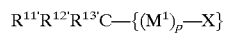

wherein $\{(M^1)_p-X\}$ is a polymer chain where $M^1$ is a radically polymerizable monomer and each p is an average degree of polymerization for each block and is independently selected such that the number average molecular weight of the polymer is up to 1,000,000 g/mol,
X is selected from the group consisting of Cl, Br, I, $OR^{10}$, $SR^{14}$, $O-N(R^{14})_2$, $S-C(=S)N(R^{14})_2$, H, OH, $N_3$, $NH_2$, COOH and $CONH_2$, where
$R^{10}$ is an aryl or an alkyl of from 1 to 20 carbon atoms in which each of the hydrogen atoms may be independently replaced by halide, $R^{14}$ is aryl or a straight or branched $C_1-C_{20}$, alkyl group, and where an $N(R^{14})_2$ group is present, the two $R^{14}$ groups may be joined to form a 5- or 6-membered heterocyclic ring, $R^{11}$, $R^{12}$ and $R^{13}$ are each independently selected from the group consisting of H, halogen, $C_1$–$C_{20}$ alkyl, $C_3$–$C_8$ cycloalkyl, $C(=Y)R^5$, $C(=Y)R^5$, $C(=Y)NR^6R^7$, COCl, OH, CN, $C_2$–$C_{20}$ alkenyl, $C_2$–$C_{20}$ alkynyl oxiranyl, glycidyl, aryl, heterocyclyl, aralkyl, aralkenyl, $C_1$–$C_6$ alkyl in which from 1 to all of the hydrogen atoms are replaced with halogen and $C_1$–$C_6$ alkyl substituted with from 1 to 3 substituents selected from the group consisting of $C_1$–$C_4$ alkoxy, aryl, heterocyclyl, $C(=Y)R^5$, $C(=Y)NR^6R^7$, oxiranyl and glycidyl, where Y is $NR^8$,S or O;

$R^8$ is H, straight or branched C1–C20 alkyl or aryl;

$R^{11'}$, $R^{12'}$ and $R^{13'}$ are the same as $R^{11}$, $R^{12}$ and $R^{13}$ with the proviso that $R^{11'}$, $R^{12'}$ and $R^{13'}$ together comprise an additional 2 to 5 of the polymer chains;

$R^5$ is aryl, alkyl of from 1 to 20 carbon atoms, alkoxy of from 1 to 20 carbon atoms, aryloxy or heterocyclyloxy; and $R^6$ and $R^7$ are independently H or alkyl of from 1 to 20 carbon atoms, or $R^6$ and $R^7$ may be joined together to form an alkylene group of from 2 to 5 carbon atoms, thus forming a 3- to 6-membered ring, such that no more than two of $R^{11}$, $R^{12}$ and $R^{13}$ are H, and, the polymer exhibits a stereochemistry characteristic of a free radical polymerized material in conjunction with a molecular weight distribution of less than 2.0.

38. The (co)polymer as claimed in claim 1, wherein said (co)polymer is a polymer selected from the group consisting of polystyrene, poly(butylacrylate), polyisoprene, poly (methacrylate), and poly(methyl methacrylate).

39. The (co)polymer of claim 1, wherein the (co)polymer is a solvent-resistant ABA block copolymer comprising a monomer which contributes oleophobic properties to the (co)polymer.

40. The (co)polymer of claim 39, wherein the monomer which contributes oleophobic properties to the (co)polymer is selected from the group consisting of (meth)acrylate and (meth)acrylonitrile monomers.

41. The (co)polymer of claim 1, wherein the (co)polymer is a ABA random copolymer comprising a monomer which contributes oleophobic properties to the (co)polymer.

42. The (co)polymer of claim 41, wherein the monomer which contributes oleophobic properties to the (co)polymer is selected from the group consisting of (meth)acrylate and (meth)acrylonitrile monomer.

43. The (co)polymer of claim 1, wherein the (co)polymer displays a molecular weight distribution of less than 1.5.

44. The copolymer of claim 8, wherein the copolymer displays a molecular weight distribution of less than 1.5.

* * * * *

UNITED STATES PATENT AND TRADEMARK OFFICE
CERTIFICATE OF CORRECTION

PATENT NO. : 6,407,187 B1  
DATED : June 18, 2002  
INVENTOR(S) : Matyjaszewski et al.

It is certified that error appears in the above-identified patent and that said Letters Patent is hereby corrected as shown below:

Column 28,  
Line 38, add -- be -- after "not".

Column 43,  
Lines 56-61, delete "$R^{10}$ is an alkyl of from 1 to 20 carbon atoms in which each of the hydrogen atoms my be independently replaced by halide, $R^{14}$ is aryl or a straight or branched $C_1$-$C_{20}$ alkyl group, and where an $N(R^{14})_2$ group is present, the two $R^{14}$ groups may be joined to form a 5- or 6-membered heterocyclic ring."

Column 47,  
Lines 55-60, delete "$R^{10}$ is an alkyl of from 1 to 20 carbon atoms in which each of the hydrogen atoms my be independently replace by halide, $R^{14}$ is aryl or a straight or branched $C_1$-$C_{20}$ alkyl group, and where an $N(R^{14})_2$ group is present, the two $R^{14}$ groups may be joined to form a 5- or 6-membered heterocyclic ring."

Signed and Sealed this

First Day of April, 2003

JAMES E. ROGAN  
*Director of the United States Patent and Trademark Office*